(12) United States Patent
Pucci et al.

(10) Patent No.: US 9,079,339 B2
(45) Date of Patent: Jul. 14, 2015

(54) COMPRESSION MOULDING APPARATUSES AND METHODS

(71) Applicants: Fabrizio Pucci, Castel Guelfo di Bologna (IT); Fiorenzo Parrinello, Medicina (IT); Alessandro Balboni, Granarolo dell'Emilia (IT); Mats Qvarford, Lund (SE)

(72) Inventors: Fabrizio Pucci, Castel Guelfo di Bologna (IT); Fiorenzo Parrinello, Medicina (IT); Alessandro Balboni, Granarolo dell'Emilia (IT); Mats Qvarford, Lund (SE)

(73) Assignee: Sacmi Cooperativa Meccanici Imola Societa' Cooperativa (IT)

( * ) Notice: Subject to any disclaimer, the term of this patent is extended or adjusted under 35 U.S.C. 154(b) by 6 days.

(21) Appl. No.: 13/930,436

(22) Filed: Jun. 28, 2013

(65) Prior Publication Data
US 2014/0015167 A1  Jan. 16, 2014

Related U.S. Application Data

(63) Continuation of application No. 12/808,584, filed as application No. PCT/IB2008/003500 on Dec. 16, 2008, now abandoned.

(30) Foreign Application Priority Data

Dec. 20, 2007  (IT) .............................. MO2007A0399

(51) Int. Cl.
| | | |
|---|---|---|
| *B29C 43/34* | (2006.01) | |
| *B29C 43/36* | (2006.01) | |
| *B29C 45/14* | (2006.01) | |
| *B29C 31/00* | (2006.01) | |
| *B29C 43/08* | (2006.01) | |
| *B29C 43/18* | (2006.01) | |
| *B29L 1/00* | (2006.01) | |
| *B29L 31/00* | (2006.01) | |

(52) U.S. Cl.
CPC ......... *B29C 45/14008* (2013.01); *B29C 31/008* (2013.01); *B29C 43/08* (2013.01); *B29C 43/18* (2013.01); *B29L 2001/00* (2013.01); *B29L 2031/712* (2013.01)

(58) Field of Classification Search
CPC ...... B29C 43/08; B29C 43/18; B29C 31/008; B29C 45/14008; B29L 2001/00; B29L 2031/712
USPC ............ 264/263, 296; 425/125, 126.1, 129.1, 425/553, 809, 123, 119, 407, 520
See application file for complete search history.

(56) References Cited

U.S. PATENT DOCUMENTS

| | | | | |
|---|---|---|---|---|
| 2,840,854 | A | * 7/1958 | Sherman | ........................ 264/263 |
| 3,313,875 | A | 4/1967 | Magerle | |
| 3,438,086 | A | 4/1969 | Valyi | |
| 4,492,548 | A | 1/1985 | Hubert | |

(Continued)

FOREIGN PATENT DOCUMENTS

| | | |
|---|---|---|
| CH | 456128 A | 5/1968 |
| CN | 1993213 A | 7/2007 |

(Continued)

*Primary Examiner* — Joseph S Del Sole
*Assistant Examiner* — Thukhanh T Nguyen
(74) *Attorney, Agent, or Firm* — Laubscher, Spendlove & Laubscher, P.C.

(57) ABSTRACT

An apparatus includes a first mold part suitable for receiving an object, a die arrangement arranged for surrounding a zone of the object and a second mold part cooperating with the die arrangement and with the first mold part in order to compression-mold plastics on the object in the zone.

7 Claims, 62 Drawing Sheets

(56) References Cited

U.S. PATENT DOCUMENTS

| | | |
|---|---|---|
| 6,210,621 B1 | 4/2001 | Usen et al. |
| 6,257,866 B1 | 7/2001 | Fritz et al. |
| 6,401,587 B1 | 6/2002 | Beltrandi |
| 6,428,737 B1 | 8/2002 | Collette et al. |
| 6,435,857 B1 | 8/2002 | Mitteregger et al. |
| 6,634,877 B2 | 10/2003 | Sicilia et al. |
| 7,766,643 B2 | 8/2010 | Zuffa |
| 7,934,922 B2 * | 5/2011 | Hanot ............... 425/466 |
| 2004/0036195 A1 | 2/2004 | Fillmore |
| 2004/0061256 A1 | 4/2004 | Bosshardt et al. |
| 2005/0051928 A1 | 3/2005 | Gruau et al. |
| 2007/0292554 A1 | 12/2007 | Zuffa |

FOREIGN PATENT DOCUMENTS

| | | |
|---|---|---|
| JP | 2002122909 A | 4/2002 |
| JP | 2002192546 A | 7/2002 |
| JP | 2002-225057 A | 8/2002 |
| WO | 2006092239 A | 9/2006 |
| WO | 2007043198 A1 | 4/2007 |

* cited by examiner

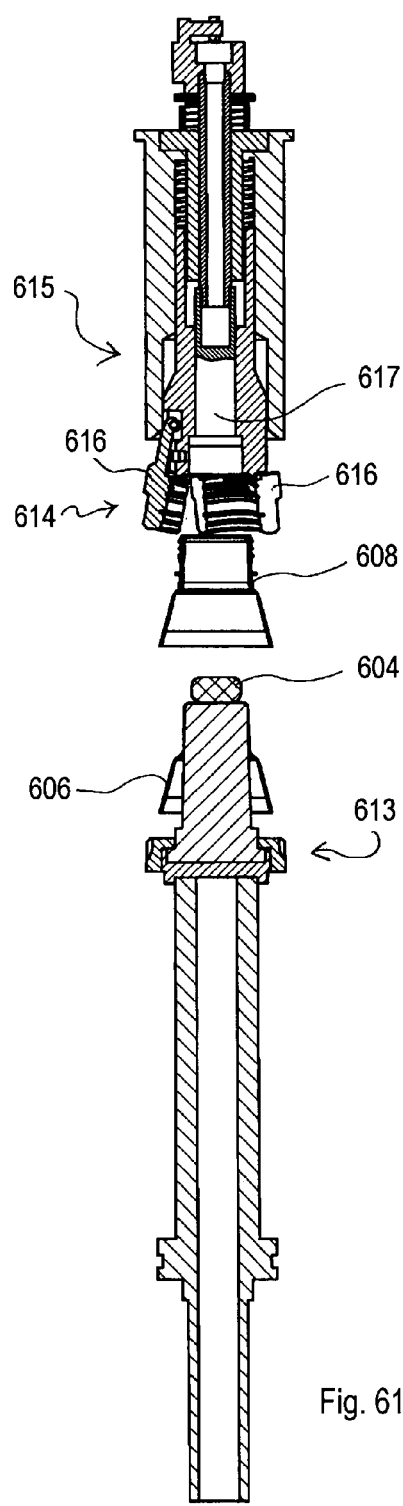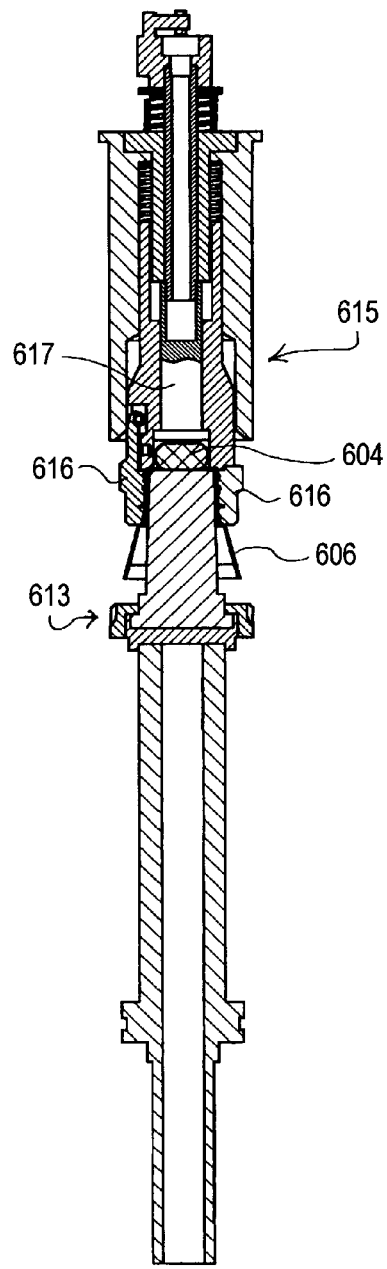
Fig. 61
Fig. 62

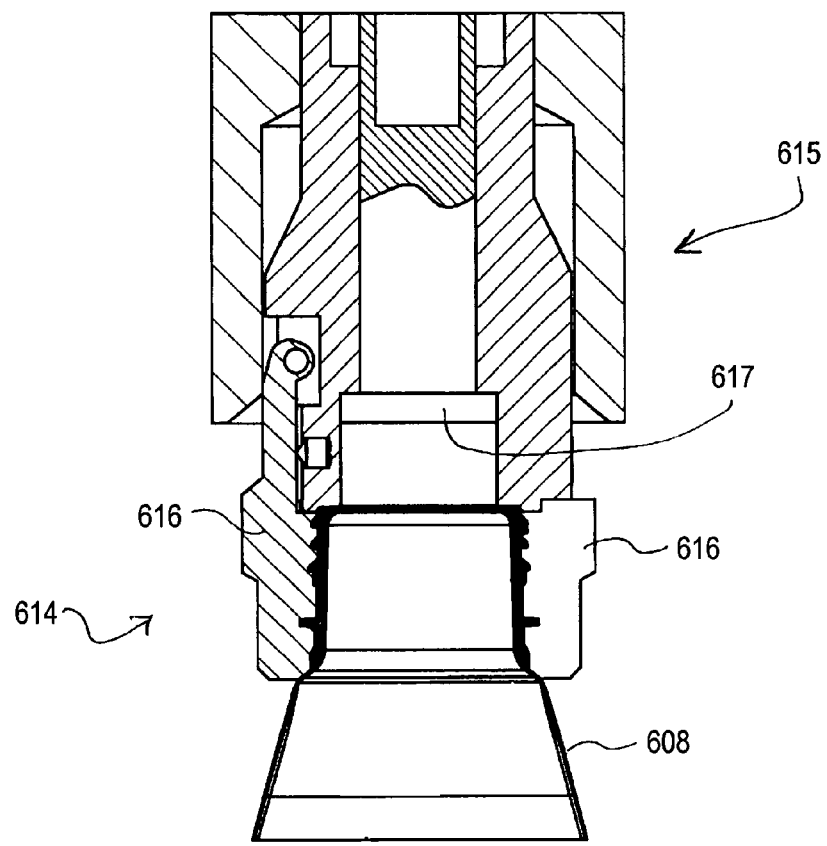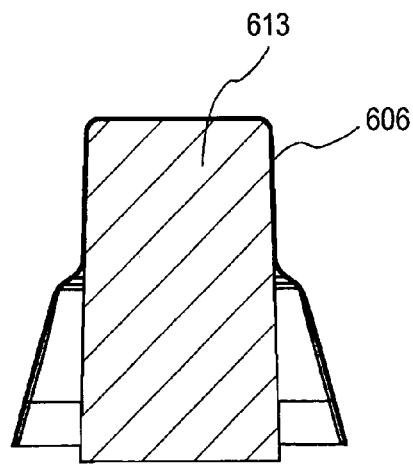
Fig. 64

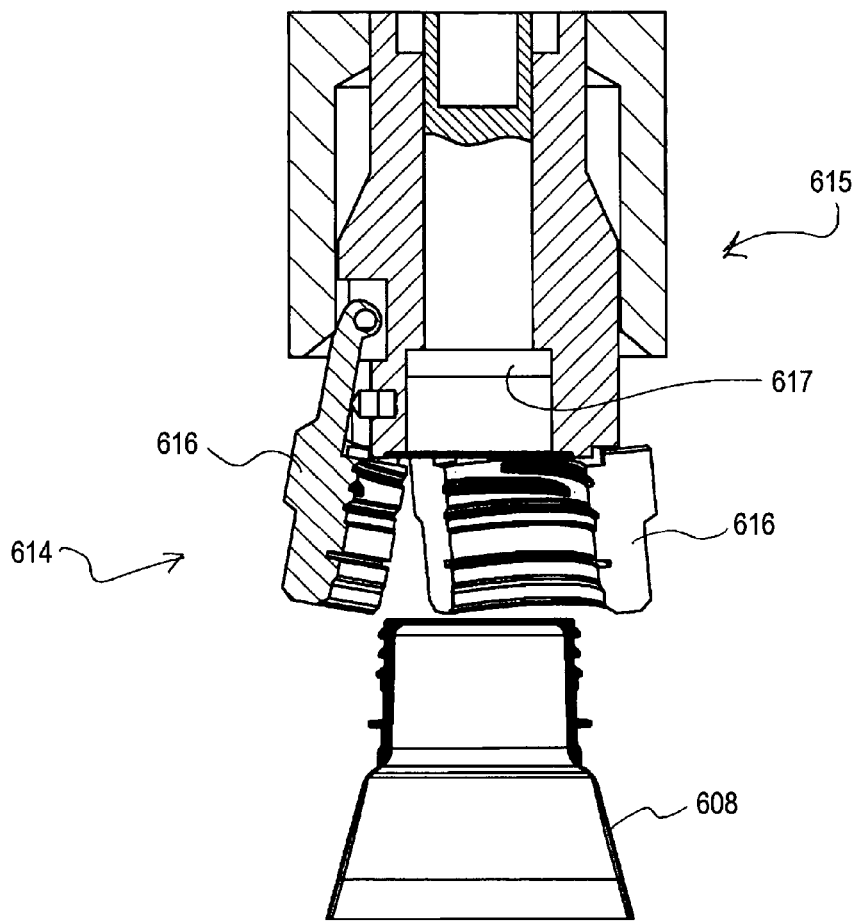
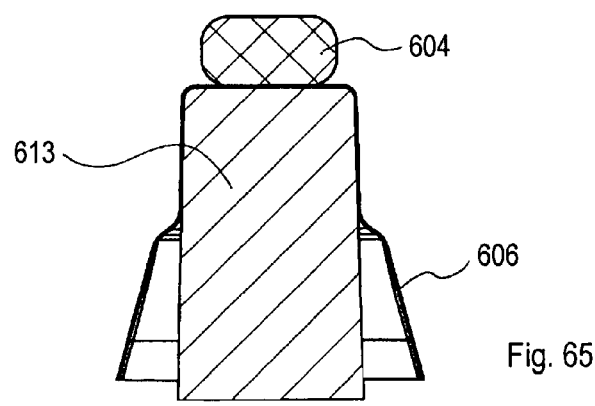
Fig. 65

COMPRESSION MOULDING APPARATUSES AND METHODS

This application is a continuation of U.S. application Ser. No. 12/808,584 filed Jun. 16, 2010 which was a national phase of PCT International Application No. PCT/IB2008/003500 filed Dec. 16, 2008. PCT/IB2008/003500 claims priority to IT Application No. MO2007A000399 filed Dec. 20, 2007. The entire contents of these applications are incorporated herein by reference.

BACKGROUND OF THE INVENTION

The invention relates to apparatuses and methods for compression-moulding plastics on objects, in particular for compression-moulding a threaded portion on a dispensing element with which domes associable with containers are provided.

BRIEF DESCRIPTION OF THE PRIOR ART

Containers are known that are made of cardboard or of cardboard associated with one or several layers made of plastics and/or of metal, at an end of which a dome comprising a dispensing element is fixed.

The dispensing element has an end in which an opening is made through which a product contained inside the containers can be dispensed.

Alternatively, this opening can be defined only after a closing portion of the aforesaid end has been removed from the dispensing element.

In this case, the aforesaid end can be provided with a weakening line that enables the aforesaid closing portion to be removed from the dispensing element.

The dome is made of plastics and may comprise one or more layers of material that constitutes a barrier to gases and/or to light, in such a way that the products contained in the containers are maintained whole.

The dome is obtained through injection-moulding of plastics.

A drawback of known domes is that injection-moulding entails lengthy manufacturing and therefore low productivity of the forming apparatuses, as all the plastics that form a dome have to be injected through the same forming mould orifice, this orifice having very reduced dimensions.

In addition, if the dome is provided with a barrier layer, it is very difficult to inject simultaneously the material that forms an internal wall and an external wall of the dome and the material that forms the barrier layer.

The dome is still more difficult to make if several barrier layers are provided that are obtained from different materials and if the internal wall and the external wall of the containers are made of materials that are different from one another.

Examples of injection molding apparatus and methods according to the prior art are set forth in U.S. Pat. Nos. 3,313,875; 4,492,548, and 6,210,621 and in U.S. patent application publication Nos. 2005/051,928 and 2004/061,256.

SUMMARY OF THE INVENTION

An object of the invention is to facilitate manufacturing of objects made of plastics.

A further object is to facilitate manufacturing of objects comprising a portion having a complex shape and provided with a layer that acts as a barrier to light and/or to gases.

In a first aspect of the invention, an apparatus is provided comprising a first mould part suitable for receiving an object, a die arrangement arranged for surrounding a zone of said object and a second mould part cooperating with said die arrangement and with said first mould part so as to compression-mould plastics on said object in said zone.

In a second aspect of the invention, an apparatus is provided comprising a punch arranged for engaging a hollow portion of an object, a supporting and retaining arrangement arranged for clamping said object against said punch and a mould cavity arrangement arranged for receiving a dose of plastics, said punch and said mould cavity arrangement cooperating mutually for compression-moulding said dose of plastics on said object. Owing to these aspects of the invention, it is possible to make an object and subsequently compression-mould a portion having a complex shape in a desired zone of the object.

The apparatus according to the invention is provided with great productivity, inasmuch as a dose of plastics intended for forming the portion with a complex shape is received between the second mould part and the die arrangement, or between the punch and the mould cavity arrangement, and does not have to be injected through orifices of small dimensions, as occurs in the prior art.

In other words, with the apparatus according to the invention it is possible to obtain a portion with a complex shape on an object by means of a work cycle that is much shorter than a work cycle of known injection-moulding machines.

In particular, in the case of closing devices associable with containers and provided with a layer of material having barrier properties to gases and/or to light, it is possible to manufacture a substantially planar multilayered laminar element, for example by co-extrusion, thermoforming, for example through drawing and/or blowing, the laminar element to obtain domes provided with a dispensing element devoid of a threaded portion and subsequently form plastics directly on the dispensing element to obtain the threaded portion.

This enables the difficulties to be avoided that are connected with co-injection of different materials to obtain an object with an articulated shape, such as a dome provided with a threaded portion.

In a third aspect of the invention, a method is provided, comprising delivering to a mould a container part provided with a dispensing element and plastics in a pasty state and pressing together said container part and said plastics for compression-moulding said plastics on said container part.

In an embodiment, said compression-moulding comprises making a container neck element with said plastics—in particular a container neck element provided with threading—on said dispensing element.

In a further embodiment, said compression-moulding comprises making a layer with said plastics that covers, at least partially, an external surface of said object and a container neck element—in particular a container neck element provided with threading—on said dispensing element.

The container part may comprise a layer of barrier material to gases and/or to light.

The container part may be obtained by thermoforming, for example through drawing and/or blowing, a substantially planar multilayered laminar element.

Owing to this aspect of the invention, it is possible to make a container part and subsequently compression-moulding a container neck element, i.e. a portion having a complex shape, on a dispensing element, i.e. on a desired zone, of the container part.

In an embodiment, the plastics that have to be compression-moulded comprise scraps of material used for manufacturing the container part, the aforesaid scraps being ground and heated before being delivered to the mould.

In particular, in the case of thermoforming, a substantially planar laminar element is deformed to obtain a plurality of container parts that are alongside one another and connected by non-deformed portions of the laminar element. Subsequently, the container parts are separated from the non-deformed portions of the laminar element and these latter are scrapped.

Owing to the invention, the non-deformed portions of the laminar element can be used to form on the dispensing element of a container part a container neck element, and possibly an external layer of the container part.

The non-deformed portions of the laminar element can be recycled, with clear economic advantages, even if the laminar element comprises a barrier material layer.

The barrier material, once it has been ground and heated, loses the barrier properties to gases and/or to light. However, this does not constitute a drawback as the plastics obtained by grinding and heating the scraps have to be applied to a container part that in turn comprises a barrier material layer.

In a fourth aspect of the invention, a method is provided, comprising delivering to a mould a sheet of plastics and plastics in a pasty state and pressing together said sheet and said plastics for obtaining from said sheet a container part provided with a dispensing element and for compression-moulding said plastics on said container part.

In an embodiment, said compression-moulding comprises making with said plastics a container neck element—in particular a container neck element provided with threading—on said dispensing element.

In a further embodiment, said compression-moulding comprises making with said plastics a layer that covers, at least partially, an external surface of said object and a container neck element—in particular a container neck element provided with threading—on said dispensing element.

The sheet of plastics may comprise a layer of material having barrier properties to gases and/or to light.

Owing to this aspect of the invention, it is possible to make a container part and simultaneously compression-moulding a container neck element, i.e. a portion having a complex shape, on a dispensing element, i.e. on a desired zone of the container part. Owing to this aspect of the invention, it is not necessary to manufacture separately the container part, for example through thermoforming.

In an embodiment, the plastics that have to be compression-moulded comprise scraps of the sheet of plastics, the aforesaid scraps being ground and heated before being delivered to the mould.

In this way, it is possible to recycle wastes of material that would otherwise have to be scrapped.

This is particularly advantageous in the case of a sheet of plastics provided with a layer of barrier material to gases and/or to light, which is very costly.

In a fifth aspect of the invention, a method is made available that comprises placing a dose of plastics on an object housed on a first mould part, moving the object carried by the first mould part towards a second mould part with the dose adhering to the object, and at least partially surrounding the object with a die arrangement so as to define a forming cavity in which the dose is compression-moulded around the object, the aforesaid moving-towards operation being performed at least partially before said surrounding operation.

Owing to this aspect of the invention, it is possible to simplify and accelerate compression-overmoulding, exploiting the capacity of the dose of plastics to adhere in pasty state to the object to be overmoulded.

BRIEF DESCRIPTION OF THE FIGURES

The invention can be better understood and implemented with reference to the attached drawings, which illustrate some embodiments thereof by way of non-limiting example, in which:

FIGS. 59 to 62 show four steps of the operation of a single moulding apparatus of the moulding machine in FIG. 54;

FIGS. 63 to 66 show four enlargements of the Figures, respectively from 59 to 62.

DETAILED DESCRIPTION

Figure 1:
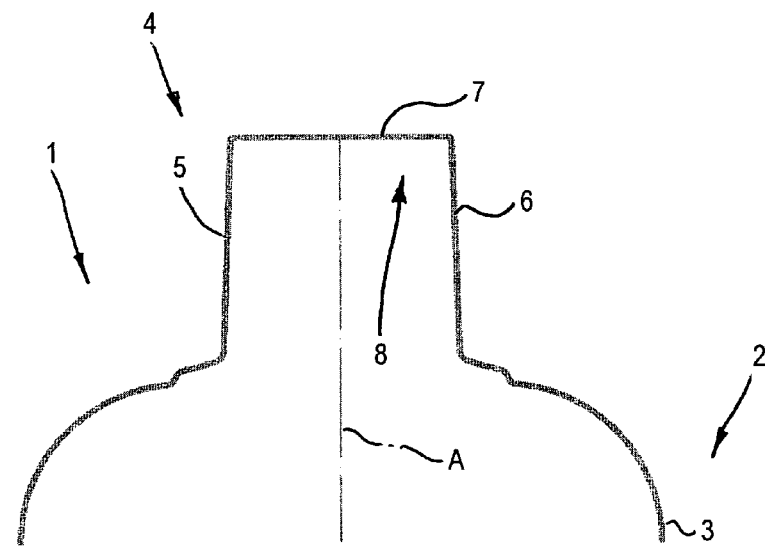
FIG. 1 is a longitudinal section of a dome that is associable with a container and provided with a dispensing element.
Figure 2:
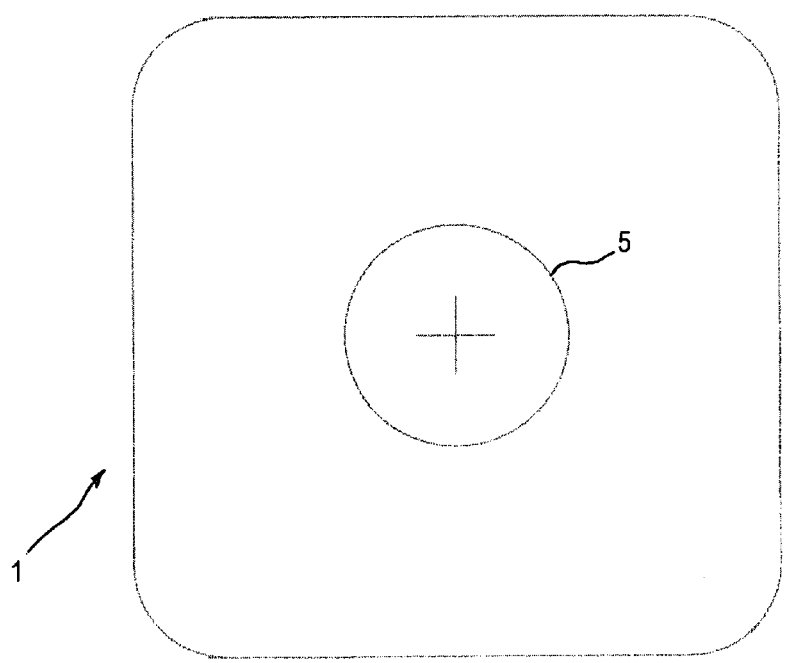
FIG. 2 is a plan view of the dome in FIG. 1.

With reference to FIGS. 1 to 6, a dome 1 is shown that is associable with a container, for example made of cardboard, or made of a multilayered laminar element obtained by associating one or more sheets of cardboard with one or more sheets of plastics and/or metallic material.

The cardboard—or the multilayered laminar element—is folded in such a way as to define a casing—for example with a substantially parallelepipedon shape—at an open end of which the dome 1 is fixed.

The dome 1 is made of plastics.

The dome 1 can be made through thermoforming a sheet material.

Thermoforming may comprise drawing and/or forming by blowing.

The sheet material may comprise one or more layers that are made of a material having barrier properties to light and/or to gases.

The sheet material can be obtained through co-extrusion.

The dome 1 comprises a first end 2 in which a connecting zone 3 is defined intended for being fixed to a container, and a second end 4, opposite the first end 2, in which a dispensing body 5 is defined.

The dispensing body 5 comprises a side wall 6—for example with a cylindrical or conical shape—and an end wall 7 connected removably to the side wall 6.

The end wall 7 is intended to be removed from the side wall 6 during a first opening of the container in such a way that in the dispensing body 5 there is defined a dispensing opening 8 through which a product contained inside the container can be dispensed. Between the end wall 7 and the side wall 6 a line of intended separation 9 extends, the line of intended separation 9 being made, for example, by a cutting tool, an ultrasonic device, a laser device, and the like.

Alternatively, the dispensing body 5 may be devoid of the end wall 7.

With the dispensing body 5 there is associated a container neck element 10 comprising a threaded portion 11. The container neck element 10 may further comprise an annular bead 12 arranged for interacting with an opening indicating device of a cap associable with the container neck element 10 and an annular ridge 13.

The container neck element 10 is obtained by compression-moulding plastics on the dispensing body 5—as will be disclosed in greater detail below—in such a way that the container neck element 10 surrounds, at least partially, the side wall 5.

Figure 3:
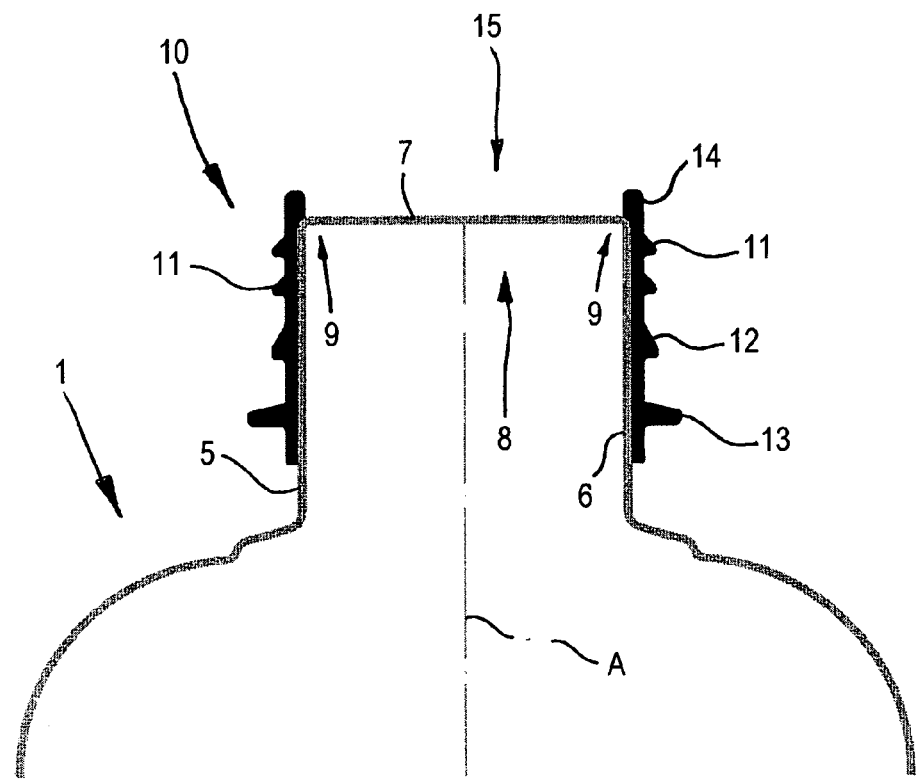
FIG. 3 is a section like that in FIG. 1 showing a dome on the dispensing element of which a threaded portion has been compression-moulded.

The container neck element 10 comprises an end zone 14 that defines in the container neck element 10 a further dispensing opening 15 that is substantially superimposed on the dispensing opening 8 to enable the product contained inside the container to be dispensed. As shown in FIG. 3, the end zone 14 extends substantially parallelly to the side wall 6 and constitutes a prolongation of the side wall 6. In particular, the end zone 14 is shaped in such a way as to receive the mouth of a user.

The further dispensing opening 15 has a diameter which is substantially the same as the diameter of the dispensing opening 8.

Figure 4:
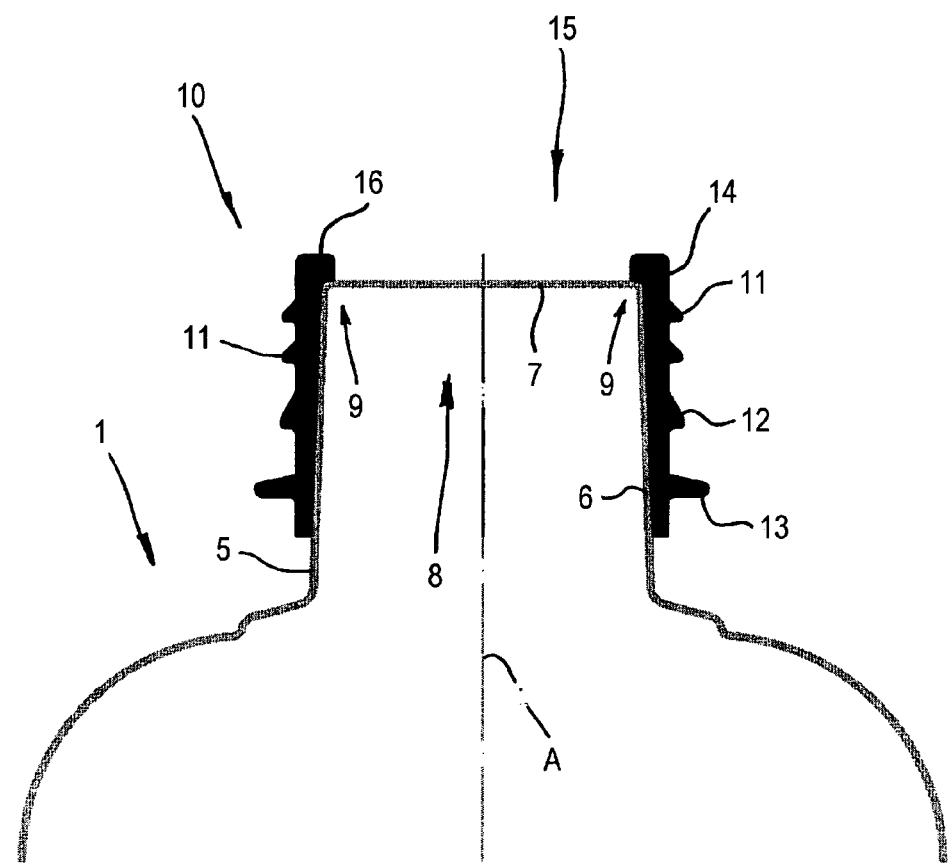
FIG. 4 is a section like that in FIG. 3 showing a threaded portion made according to a version.

As shown in FIG. 4, the end zone 14 comprises an annular appendage 16 that extends towards a longitudinal axis A of the dome 1 in such a way as to partially cover the end wall 7. In particular, the end zone 14 is shaped in such a way as to receive the mouth of a user.

The further dispensing opening 15 has a diameter which is less than the diameter of the dispensing opening 8.

Figure 5:
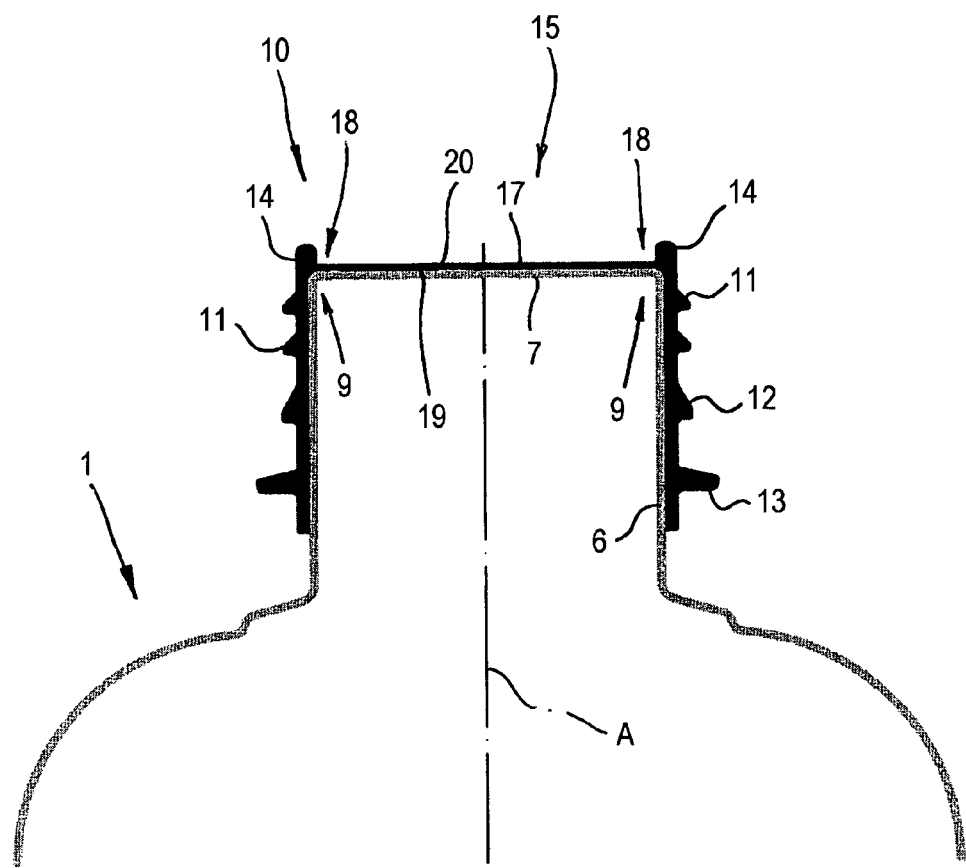
FIG. 5 is a section like that in FIG. 3 showing a threaded portion made according to a further version.

As shown in FIG. 5, the container neck element 10 comprises a further end wall 17 connected in a removable manner to the end zone 14.

The further end wall 17 is intended to be removed from the end zone 14 during a first opening of the container in such a way that in the dispensing body 5 the further dispensing opening 15 is defined.

Between the further end wall 17 and the end zone 14 a further line of intended separation 18 extends, the further line of intended separation 18 being made, for example, by a cutting tool, an ultrasonic device, a laser device, or directly during forming of the container neck element 10, as will be disclosed in greater detail below.

The further end wall 17 extends substantially parallelly to the end wall 7.

The further end wall 17 has a substantially constant thickness.

The further end wall 17 comprises a first face 19 that can be fixed to the end wall 7 and a second face 20 that can be fixed, for example through ultrasonic welding, to a cap associated with the container neck element 10, for example to a cap screwed onto the threaded portion 11.

When the cap is unscrewed from the threaded portion 11, the container neck element 10 breaks at the further line of intended separation 18 in such a way that the further end wall 17 separates from the container neck element 10, making the further dispensing opening 15 accessible.

Similarly, the dome 1 breaks at the line of intended separation 9, in such a way that the end wall 7 separates from the dispensing body 5, making the dispensing opening 8 accessible.

Figure 6:
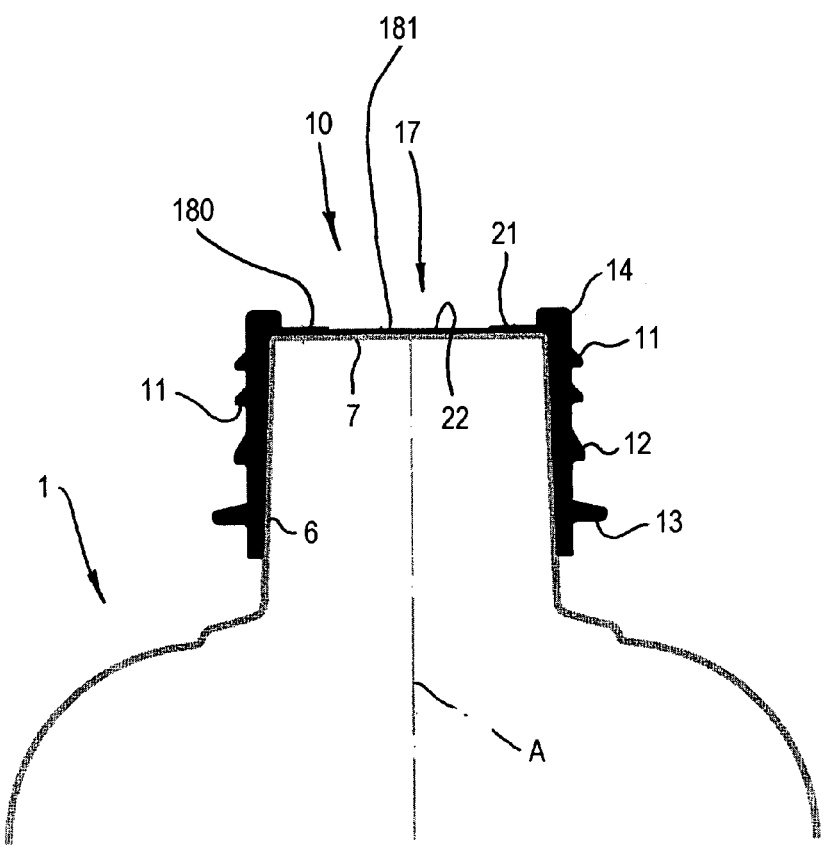
FIG. 6 is a section like that in FIG. 3 showing a threaded portion made according to a still further version.
Figure 7:
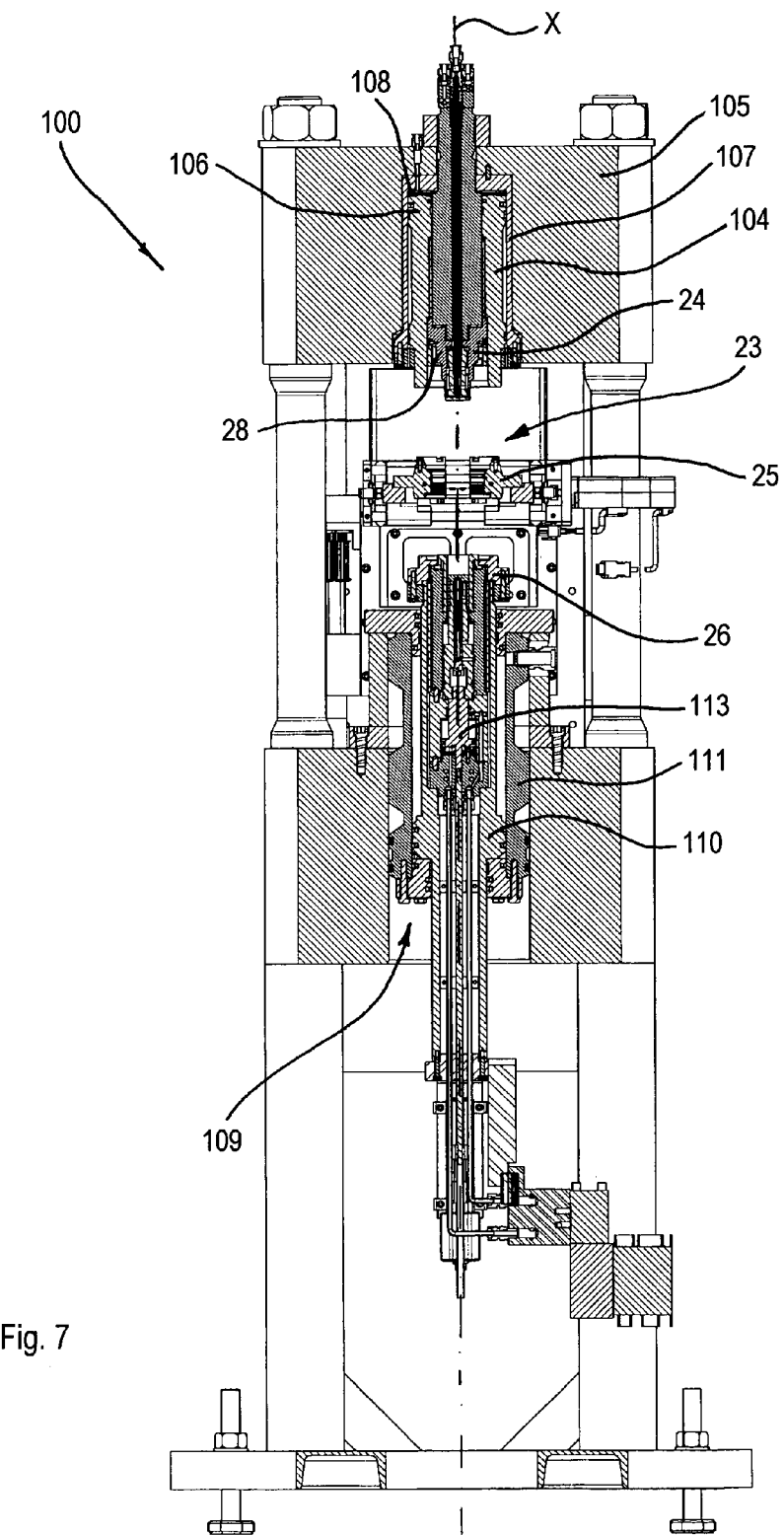
FIG. 7 is a longitudinal section of an apparatus for compression-moulding plastics on an object.

As shown in FIG. 6, the further end wall 17 comprises a first zone 21, which is nearer the end zone 14, and a second zone 22, which is further from the end zone 14. The first zone 21 has a substantially annular shape whilst the second zone 22 has a substantially circular shape, the first zone 21 surrounding the second zone 22. The first zone 21 has a different thickness from the thickness of the second zone 22.

With reference to FIGS. 7 to 21 there is shown an apparatus 100 for compression-moulding plastics on objects, in particular an apparatus for compression-moulding a container neck element 10—provided with a threaded portion 11—on a dome 1.

The apparatus 100 comprises a mould 23 provided with a first mould part 24 arranged for receiving a dome 1 on which a container neck element 10 has to be compression-moulded, a compression-moulding die arrangement 25 and a second mould part 26.

The second mould part 26, the compression-moulding die arrangement 25 and the first mould part 24 cooperate mutually so as to shape a dose 27 of plastics in a pasty state to obtain the container neck element 10.

The first mould part 24, the compression-moulding die arrangement 25 and the second mould part 26 are substantially aligned along a longitudinal axis X of the mould 23.

In particular, the first mould part 24 is arranged above the compression-moulding die arrangement 25 and the compression-moulding die arrangement 25 is arranged above the second mould part 26.

The first mould part 24 comprises a supporting body 28 provided with an abutting surface 29 arranged for restingly receiving a dome 1.

The supporting body 28 is fixed to an upper frame 105 of the apparatus 100 and is maintained in a fixed position during operation of the apparatus 100.

The abutting surface 29 is shaped in such a way as to interact in a shapingly coupled manner with a corresponding internal surface 30 of the dome 1.

The supporting body 28 comprises a protuberance 57 arranged for penetrating inside the dispensing body 5, when the internal surface 30 rests on the abutting surface 29.

When the dome 1 is positioned on the supporting body 28, the dispensing body 5 faces downwards and is arranged at a lower height than the connecting zone 3.

The supporting body 28 is crossed by a conduit 31 through which air can be sucked, in such a way that the dome 1 is made to adhere to the supporting body 28.

In addition, air can be blown through the conduit 31 in such a way that the dome 1—after a container neck element 10 has been compression-moulded thereupon—is induced to disengage from the supporting body 28.

Alternatively, in the supporting body 28 a first conduit and a second conduit can be provided that are distinct from one another, the first conduit being arranged for sucking air and the second conduit being arranged for blowing air.

The protuberance 57 can be subjected to surface treatment by means of which on the abutting surface 29 roughness—or grooves—are made, defining channels that promote evacuation of the air when the dome 1 is fitted on the supporting body 28.

In addition to sucking air—or instead of sucking air—the dome 1 can be retained on the supporting body 28 through mechanical interference.

The compression-moulding die arrangement 25 comprises a first half mould 32 and a second half mould 33.

The mould 23 comprises a driving arrangement 101, for example pneumatic or hydraulic cylinders, arranged for moving the first half mould 32 and the second half mould 33 towards and away from one another transversely to the longitudinal axis X.

Figure 8:
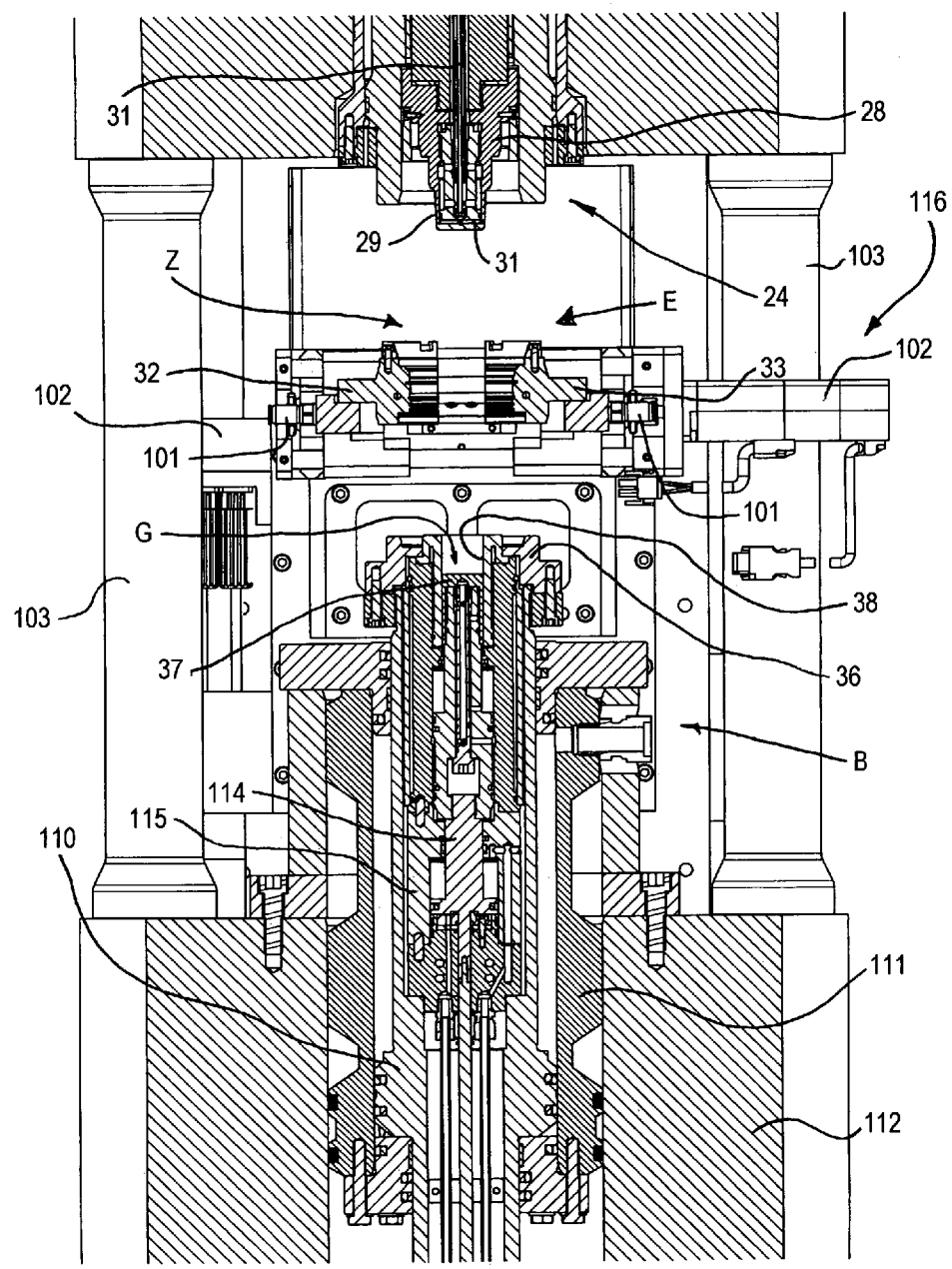
FIGS. 8 to 21 are fragmentary longitudinal sections showing subsequent steps of an operating cycle of the apparatus in FIG. 7.
Figure 20:
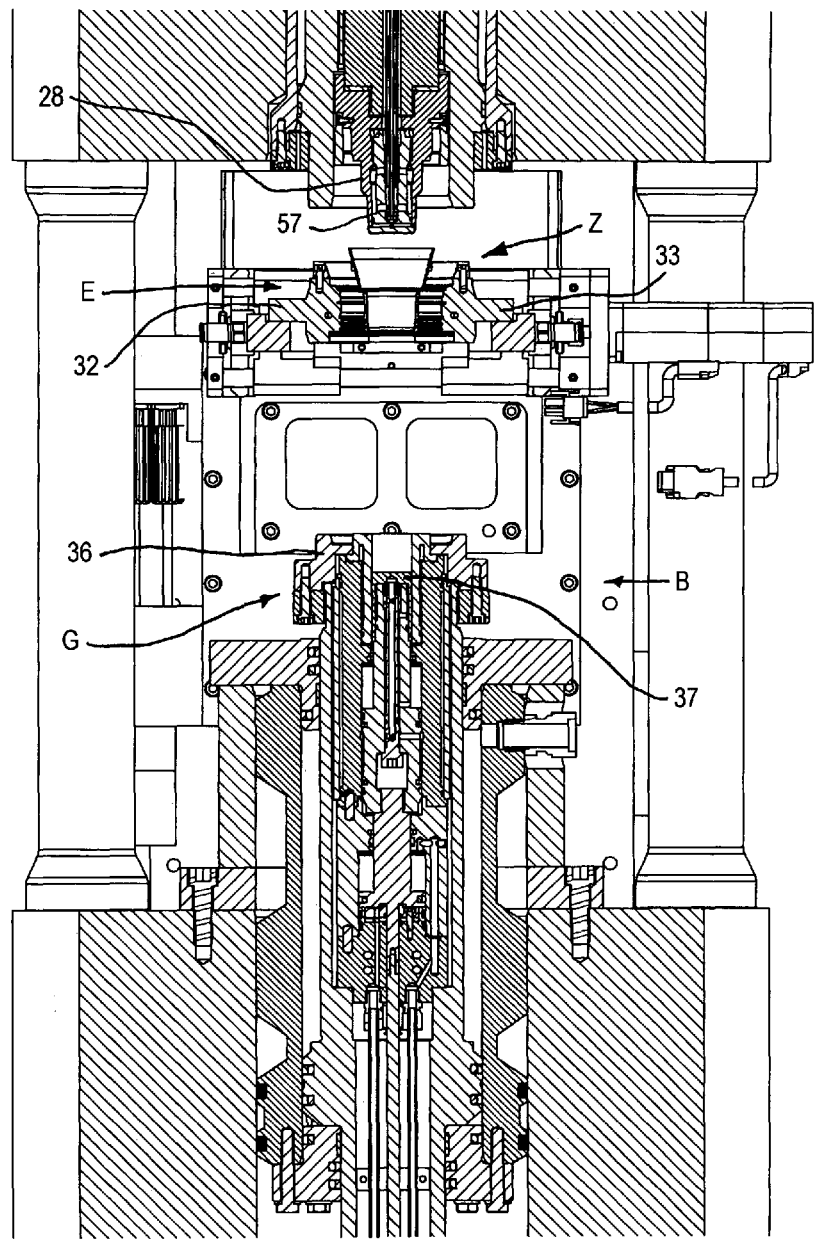
Figure 21:
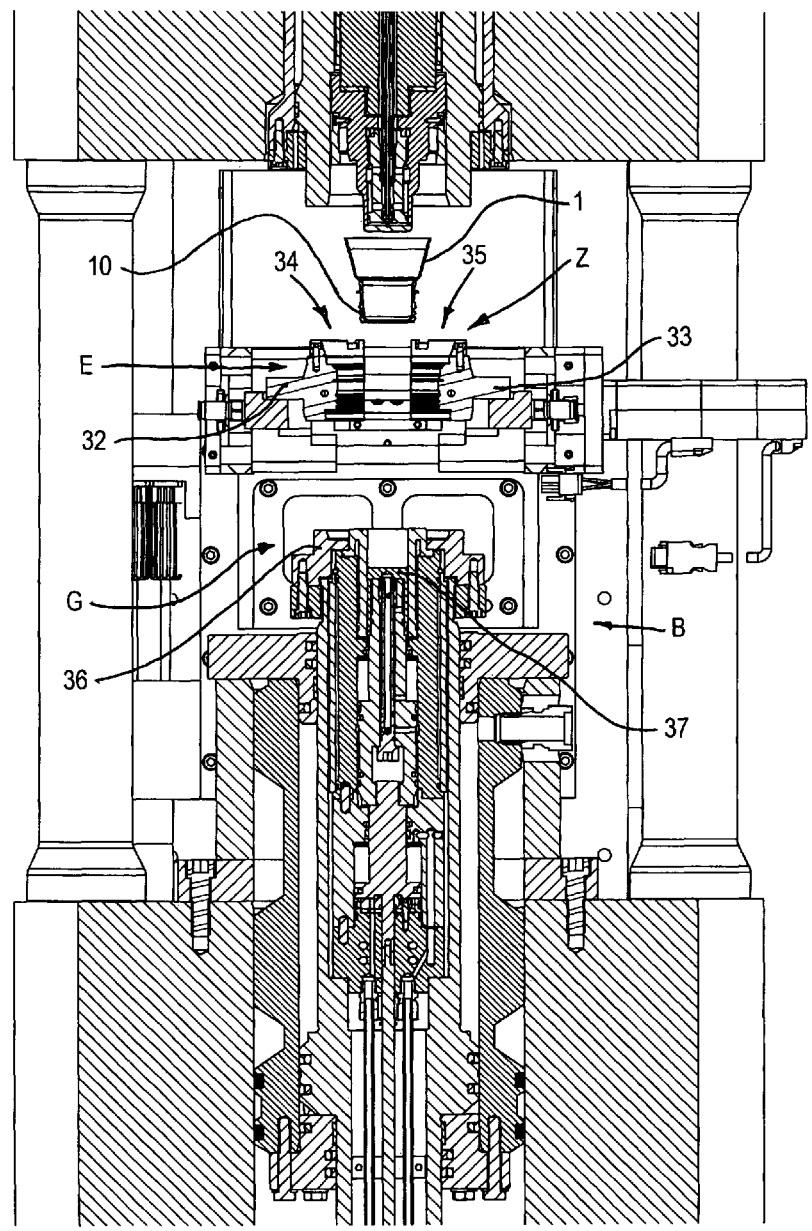

The first half mould 32 and the second half mould 33 are movable between a closed configuration W, shown in FIGS. 9 to 17, in which the first half mould 32 and the second half mould 33 are placed in mutual contact, and an open configuration Z, shown in FIGS. 8, 20 and 21, in which the first half mould 32 and the second half mould 33 are mutually spaced apart to enable a dome 1 on which a container neck element 10 has been compression-moulded to be extracted.

When the first half mould 32 and the second half mould 33 are in the closed configuration W, in a first zone 59a of the compression-moulding die arrangement 25 a first opening 59 is defined that faces the first mould part 24 and in a second zone 58a of the compression-moulding die arrangement 25, opposite the first zone 59a, a second opening 58 is defined that faces the first mould part 24.

The first opening 59 enables the protuberance 57 to penetrate inside the compression-moulding die arrangement 25.

Similarly, the second opening 58 enables a forming element 37 of the second mould part 26 to press the dose 27 inside the compression-moulding die arrangement 25. In particular, a protruding portion 117 of the base body 36 is received in a lower zone 118 of the second opening 58. In addition, the second opening 58 enables the forming element 37 to penetrate inside the compression-moulding die arrangement 25.

The first half mould 32 comprises a first moulding cavity 34 and the second half mould 33 comprises a second moulding cavity 35.

Figure 22:
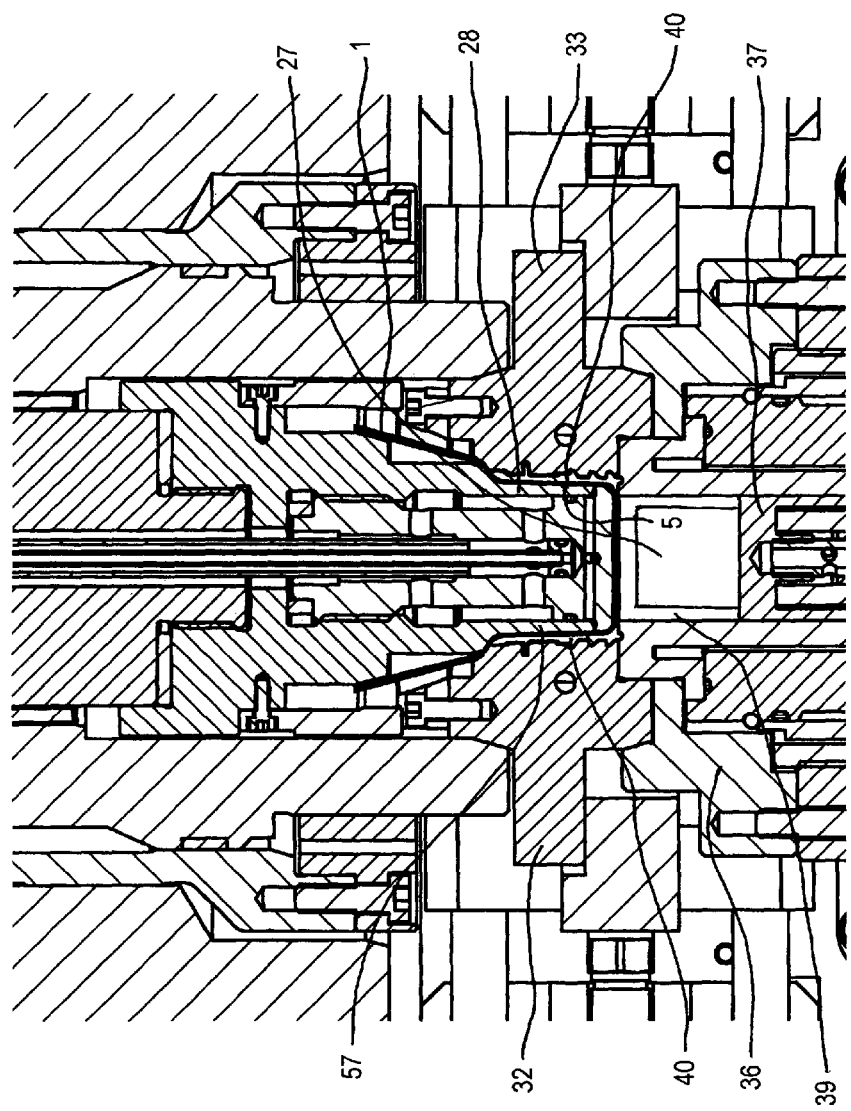
FIG. 22 is a fragmentary longitudinal section of the apparatus in FIG. 7, showing a forming chamber arranged for receiving plastics.

When the first half mould 32 and the second half mould 33 are in the closed configuration W, the first moulding cavity 34 and the second moulding cavity 35 cooperate with the dispensing body 5 to define a forming chamber 40, shown in FIG. 22, inside which a dose 27 is given the shape of the container neck element 10.

The mould 23 further comprises a moving arrangement 116 arranged for moving the compression-moulding die arrangement 25 along the longitudinal axis X. The moving arrangement 116 comprises a carriage 102 supporting the first half mould 32 and the second half mould 33—and the driving arrangement 101- and slidable on guiding columns 103. The moving arrangement 116 further comprises a linear guiding device provided with a driving motor.

The compression-moulding die arrangement 25 comprises a closure promoting arrangement 41 arranged for maintaining the first half mould 32 and the second half mould 33 in the closed configuration W.

The closure promoting arrangement 41 comprises a first conical surface element 42 obtained in an end zone 43 of the first half mould 32 and of the second half mould 33 and arranged for cooperating with a further first conical surface element 44 obtained in a closing element 104 of the first mould part 24. The closing element 104 has the shape of a sleeve extending around the supporting body 28 and is shaped in such a way as to prevent the first half mould 32 and the second half mould 33 from moving away from one another when the pressure of the plastics increases inside the forming chamber 40. The closing element 104 is movable along the longitudinal axis X. The closing element 104 comprises a piston body 106 received in a cylinder 107 fixed to the upper frame 105.

Between the cylinder 107 and the piston body 106 there is defined a chamber 108 arranged for receiving an operating fluid, for example pressurised air.

The cylinder 107 and the piston body 106—and the operating fluid interposed therebetween—define a gas spring that pushes the closing element 104 towards the compression-moulding die arrangement 25 and towards the second mould part 26.

The closure promoting arrangement 41 further comprises a second conical surface element 45 obtained in a further end zone 46 of the first half mould 32 and of the second half mould 33, opposite the end zone 43, and arranged for cooperating with a further second conical surface element 47 obtained in a base body 36 of the second mould part 26 arranged for interacting with the compression-moulding die arrangement 25.

The base body 36 is provided with a seat 38 in which the forming element 37 is slidable. The apparatus 100 comprises a main actuator 109, for example a hydraulic actuator, arranged for moving the second mould part 26 along the longitudinal axis X. The main actuator 109 comprises a main piston 110 that is slidable in a main cylinder 111 provided in a lower frame 112 of the apparatus 100. In particular, the base body 36 is fixed to an end of the main piston 110.

Figure 12:
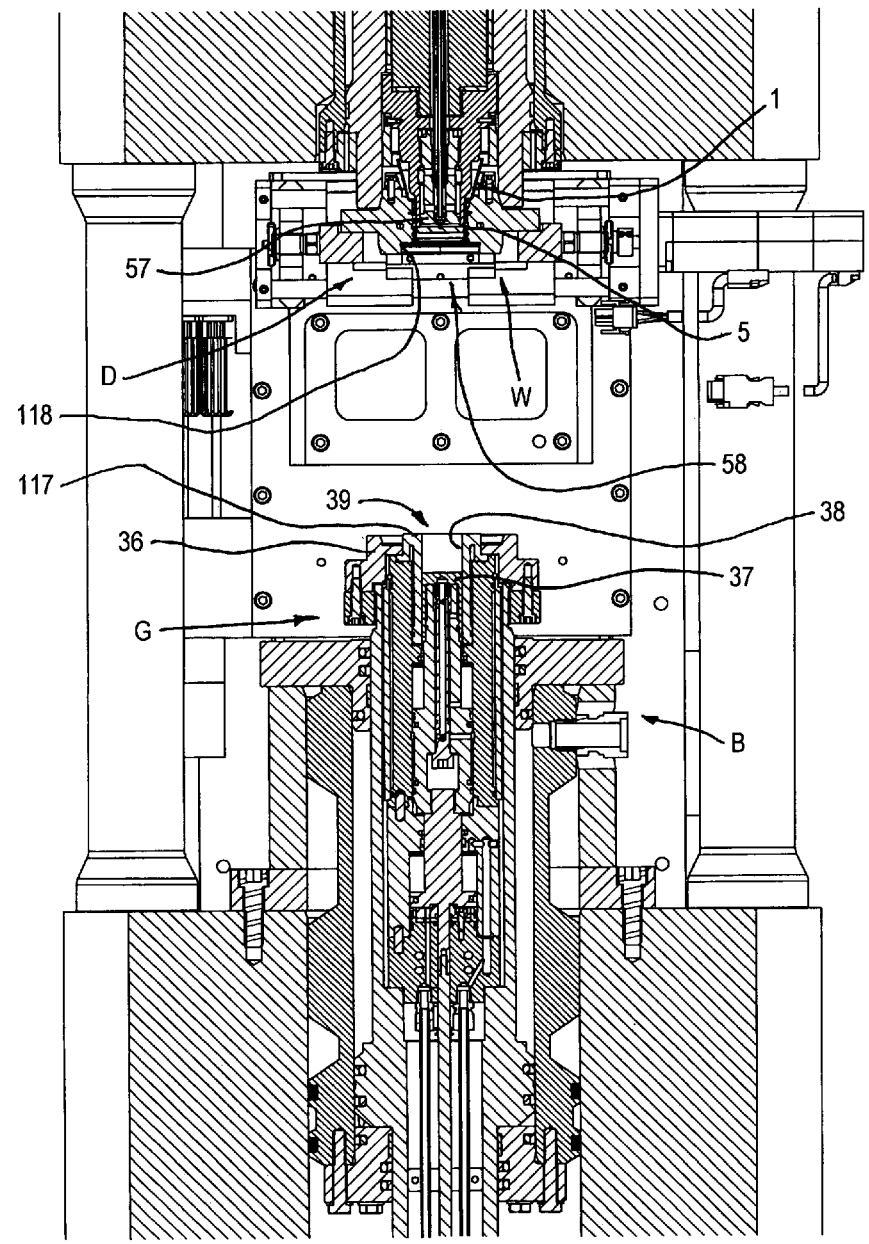
Figure 13:
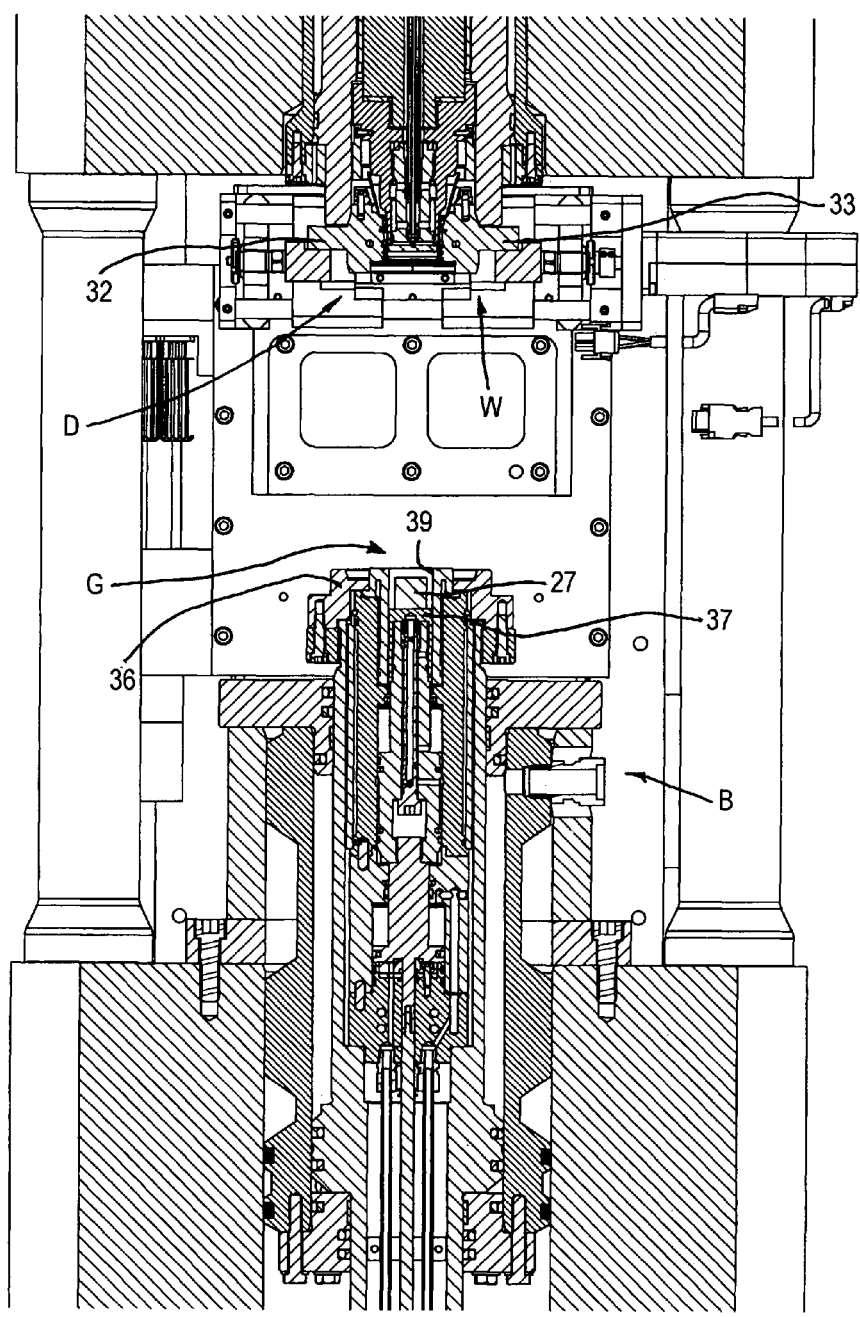
Figure 14:
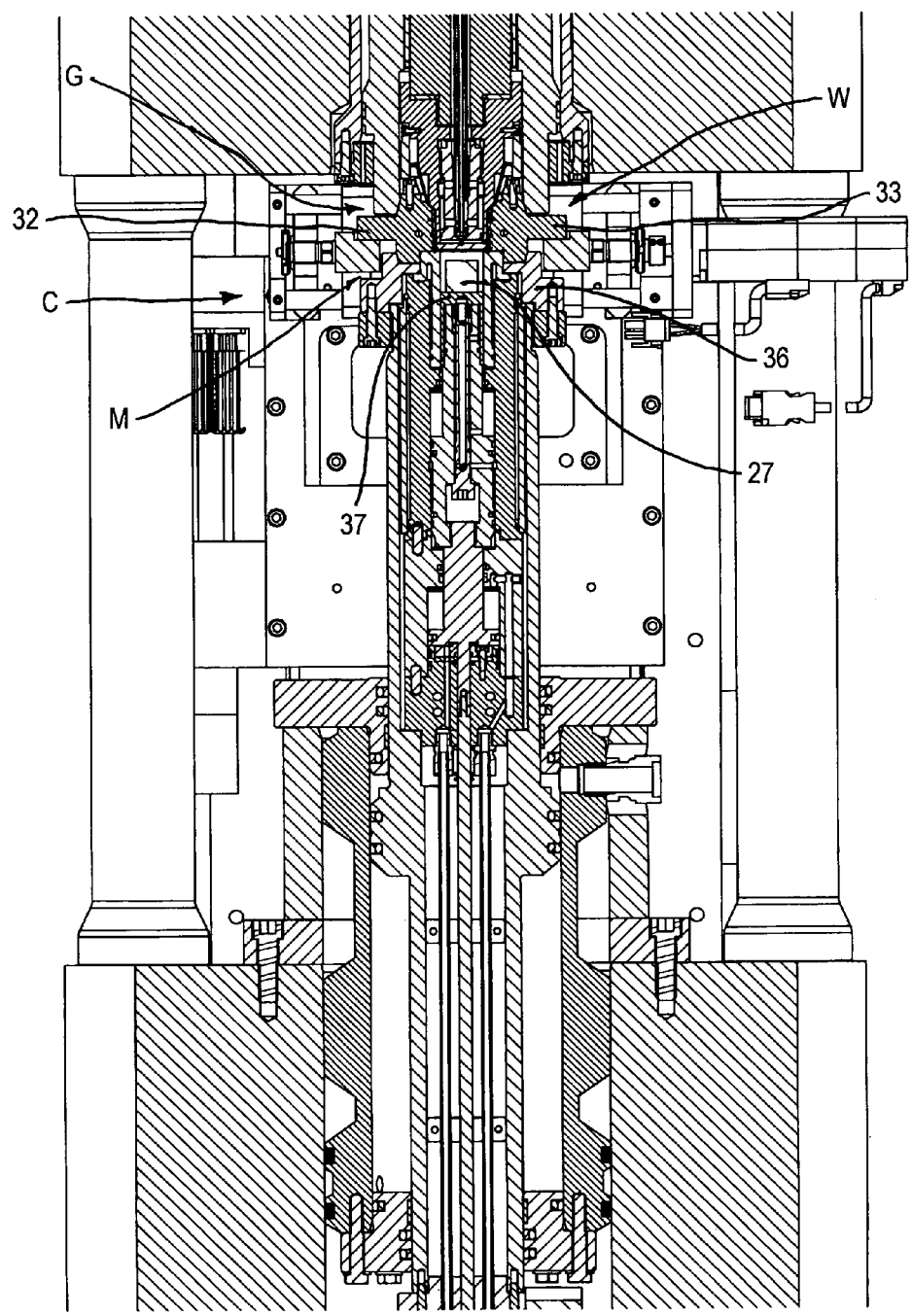
Figure 15:
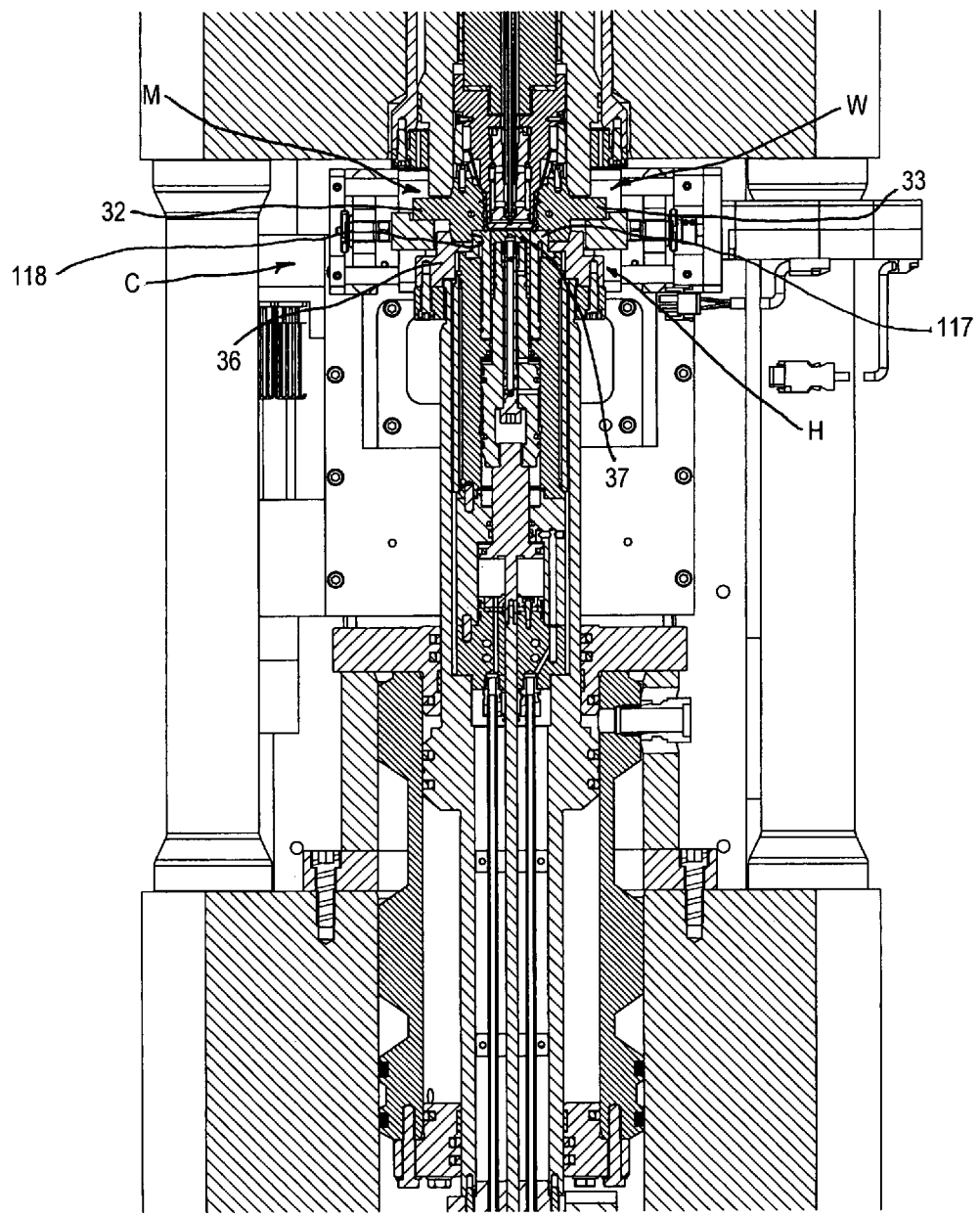
Figure 16:
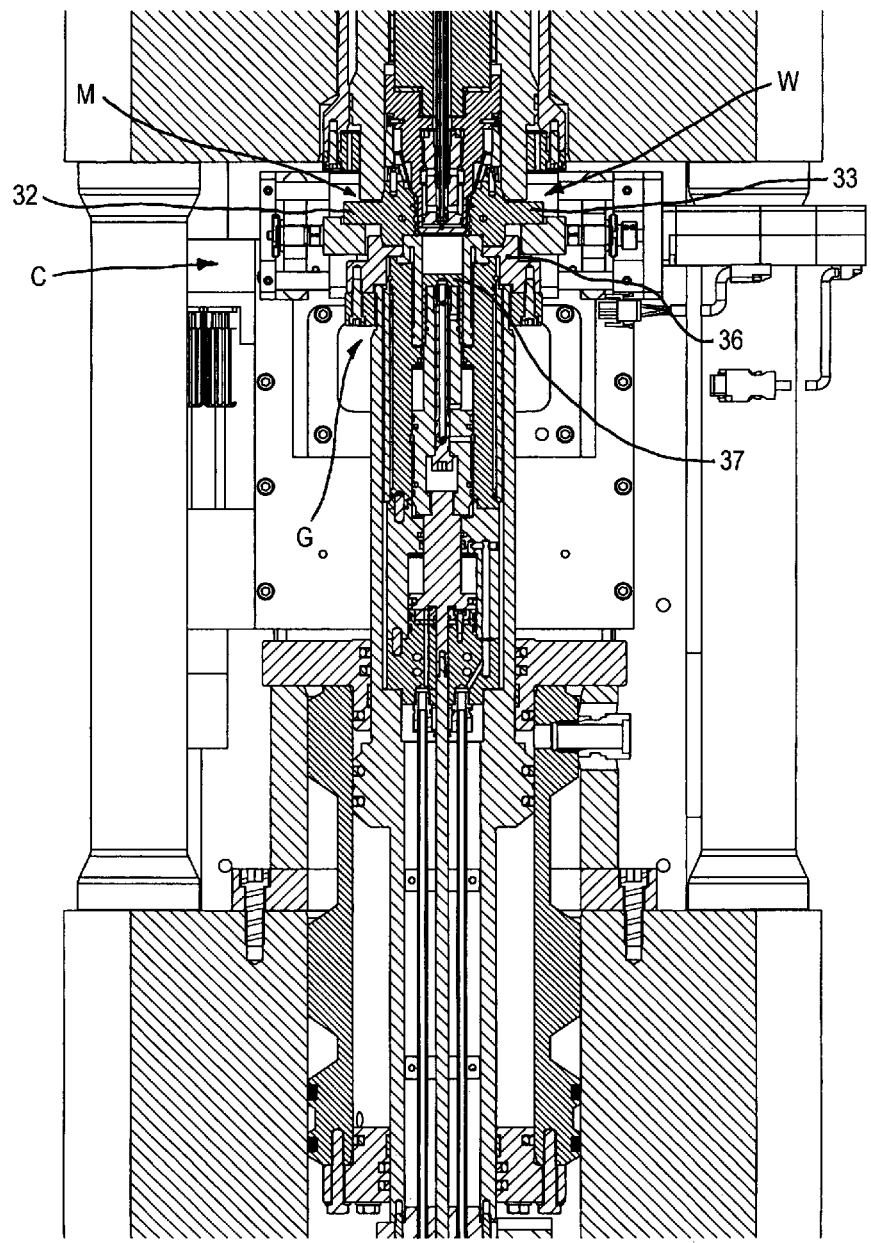

The main actuator 109 moves the second mould part 26 between a lowered position B, shown in FIGS. 8 to 13 and in FIGS. 17 to 21, in which the second mould part 26 does not interact with the compression-moulding die arrangement 25 and with the first mould part 24, and a raised position C, shown in FIGS. 14 to 16, in which the second mould part 26 interacts with the compression-moulding die arrangement 25 and with the first mould part 24.

The apparatus 100 further comprises a secondary actuator 113, for example a hydraulic actuator, arranged for moving the forming element 37 with respect to the base body 36 along the longitudinal axis X. The secondary actuator 113 comprises a secondary piston 114 that is slidable in a secondary cylinder 115 provided in the main piston 110. In particular, the forming element 37 defines an end portion of the secondary piston 114. The secondary actuator 113 moves the forming element 37 between a retracted position G, shown in FIGS. 8 to 14 and in FIGS. 16 to 21, in which the forming element 37 is received inside the seat 38 in such a way that the forming element 37 and the seat 38 define a cavity 39 arranged for receiving the dose 27, and an extended position H, shown in FIG. 15, in which the forming element 37 presses the dose 27 inside the forming chamber 40 to form a container neck element 10.

A work cycle of the apparatus 100 is disclosed with reference to FIGS. 8 to 21.

In FIG. 8 there is shown a step of the work cycle in which a dome 1, on which a container neck element 10 was compression-moulded, has been removed from the mould 23.

The second mould part 26 is in the lowered position B and the forming element 37 is in the retracted position G.

The compression-moulding die arrangement 25 is in a removal and supply position E, in which a dome 1, on which a container neck element 10 was compression-moulded, is removed from the compression-moulding die arrangement 25 by a first handling device and a further dome 1, on which a container neck element 10 has to be compression-moulded, is deposited in the compression-moulding die arrangement 25 by a second handling device. Alternatively, a single handling device may be provided that both removes and deposits the domes 1.

Figure 9:
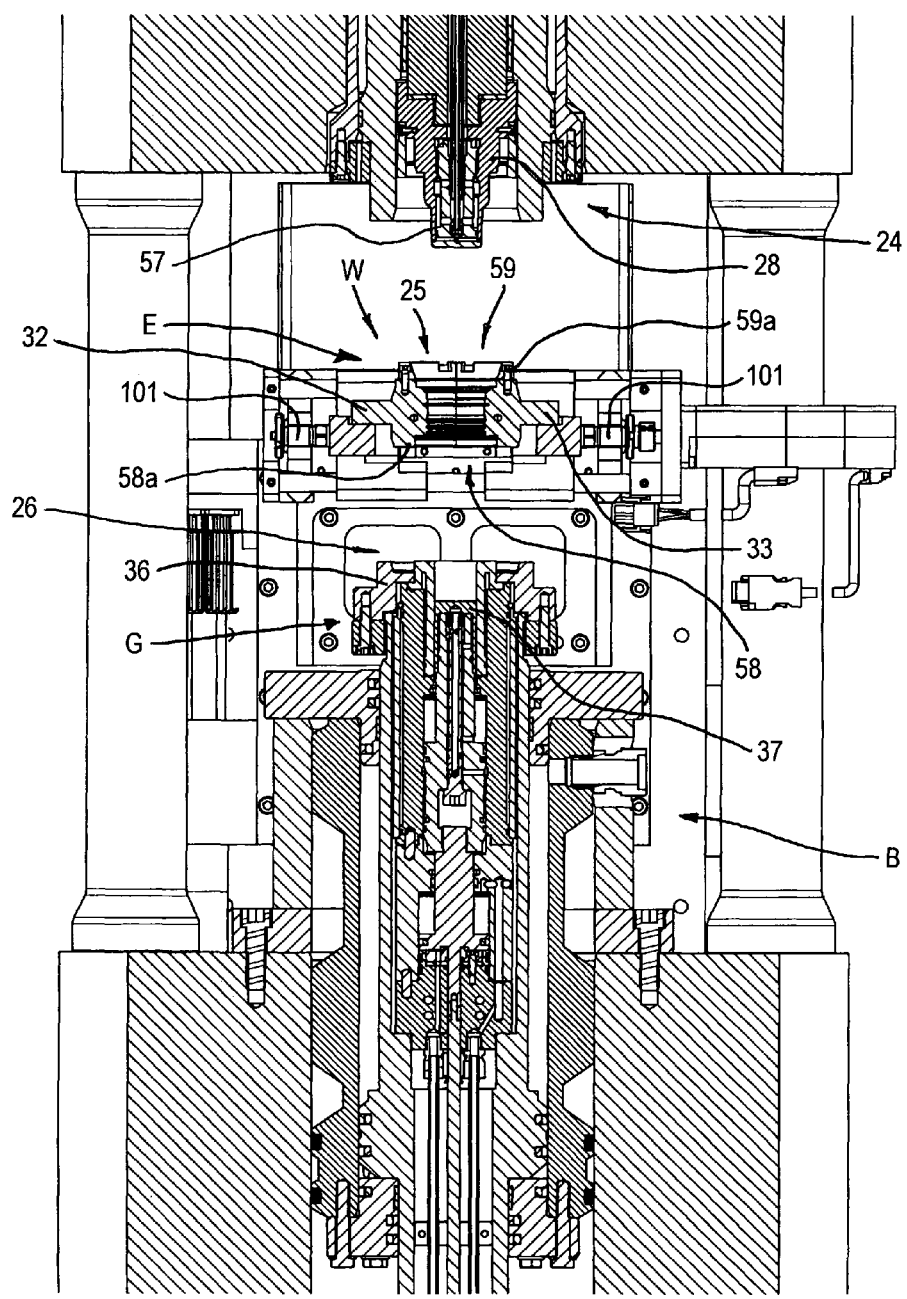

In a subsequent step of the work cycle, shown in FIG. 9, the driving arrangement 101 positions the first half mould 32 and the second half mould 33 in the closed configuration W.

Figure 10:
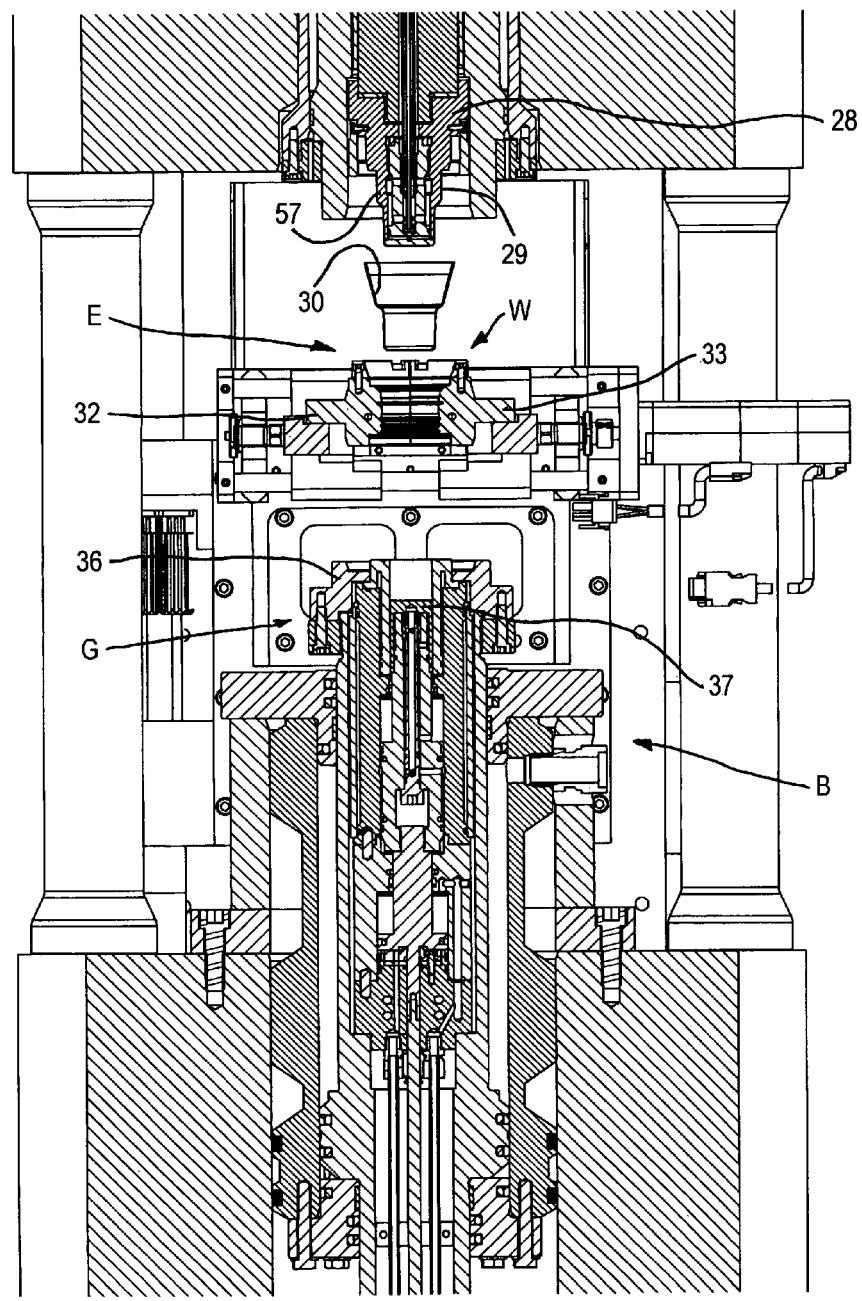
Figure 11:
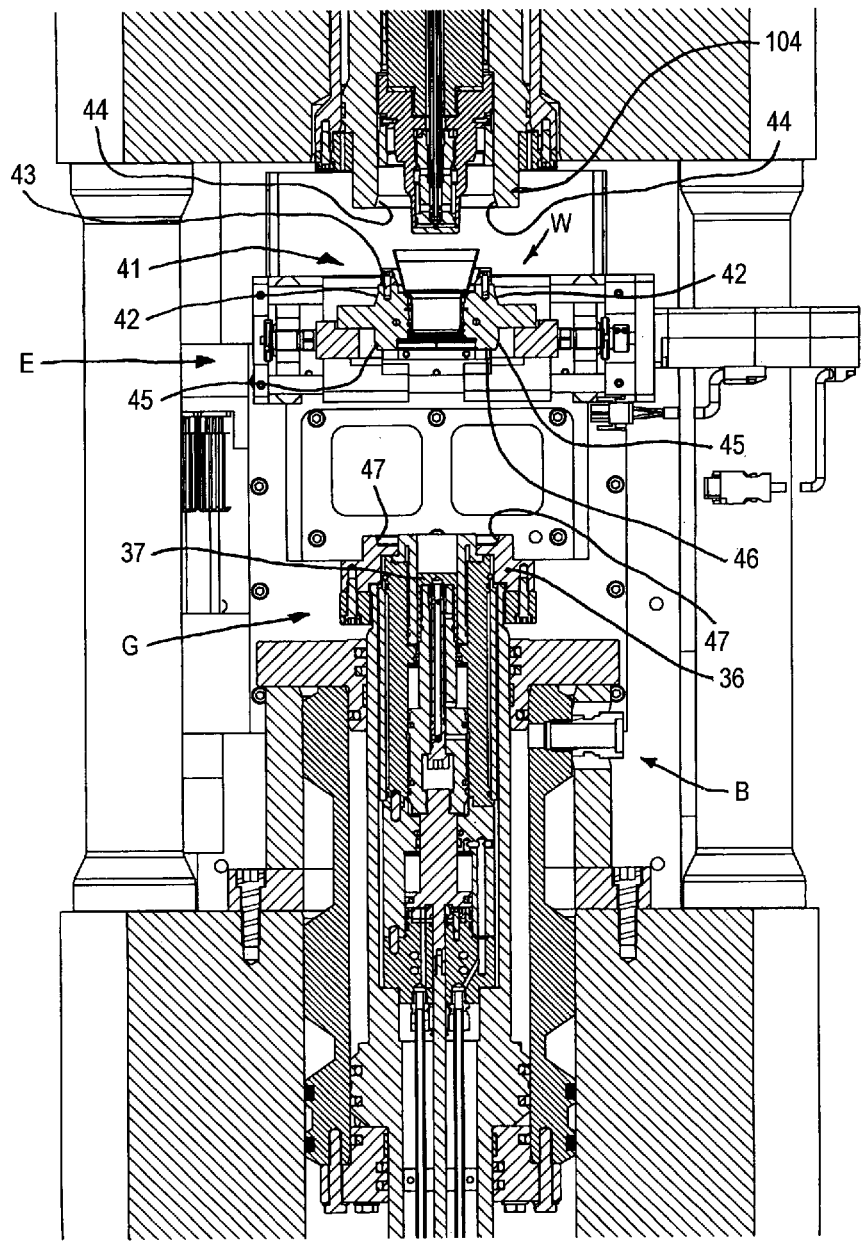

In subsequent steps of the work cycle, shown in FIGS. 10 and 11, a dome 1 is inserted into a zone defined between the first mould part 24 and the compression-moulding die arrangement 25 and is deposited in the compression-moulding die arrangement 25. Alternatively, the dome 1 can be positioned on the supporting body 28 and retained on the supporting body 28 by sucking air through the conduit 31 and/or through mechanical interference.

FIG. 12 shows a step of the work cycle in which the moving arrangement 116 moves the compression-moulding die arrangement 25 from the removal and supply position E to an insertion position D, in which the compression-moulding die arrangement 25 is placed in contact with the closing element 104.

The compression-moulding die arrangement 25, in the insertion position D, makes the dome 1 interact with the supporting body 28, in such a way that the protuberance 57 is received inside the dispensing body 5.

In the insertion position D the compression-moulding die arrangement 25 clamps the dome 1, on which the container neck element 10 has to be compression-moulded, against the first mould part 24 and defines the forming chamber 40.

In a subsequent step of the work cycle, shown in FIG. 13, a dose 27 is deposited inside the cavity 39.

Subsequently, as shown in FIG. 14, the main actuator 109 moves the second mould part 26 from the lowered position B to the raised position C. The forming element 37 is maintained in the retracted position G, in such a way that the dose 27 is contained in the cavity 39.

The driving motor of the linear guiding device of the moving arrangement 116 is deactivated—i.e. placed in an idle operational configuration—just before the base body 36 interacts with the compression-moulding die arrangement 25. In this way, the main actuator 109, through the second mould part 26, moves the compression-moulding die arrangement 25 upwards, overcoming the resistance exerted by the gas spring defined by the cylinder 107 and by the piston body 106 and by the operating fluid interposed therebetween. The compression-moulding die arrangement 25 therefore passes from the insertion position D to a forming position M.

When the second mould part 26 is in the raised position C, the base body 36 and the compression-moulding die arrangement 25 are in mutual contact in such a way that the cavity 39 and the forming chamber 40 are isolated from the external environment and are mutually connected. This ensures that there are no leaks of plastics from the mould 23 during the subsequent steps of the work cycle.

Subsequently, as shown in FIG. 15, the secondary actuator 113 moves the forming element 37 from the retracted position G to the extended position H. In this way, the dose 27 is pressed inside the forming chamber 40 to form the container neck element 10 on the dome 1.

The secondary actuator 113 is operationally associated with a valve that controls the forming element 37 both through a pressure control and a force control.

The secondary actuator 113 controls the movement of the forming element 37 with respect to the base body 36—i.e. the raising of the forming element 37—until a preset pressure value is reached inside the forming chamber 40.

In this way, the final position reached by the forming element 37 can vary by passing from one work cycle to another work cycle. The forming element 37 thus enables plastics dosing errors to be compensated—i.e. errors due to doses comprising a quantity of plastics which is greater than or lesser than a theoretically set quantity—by varying the final position thereof. Doses that are different from one another give rise to container neck elements 10 that differ only in the thickness of the further end wall 17. Further end walls 17 having thicknesses that are variable within a certain range do not prejudice the properties of the domes 1, which are therefore qualitatively acceptable. This is in particular due to the fact that the further end walls 17 have to be removed from the domes 1 at the latest at the moment of the first opening of a cap associated with the container neck element 10.

Figure 17:
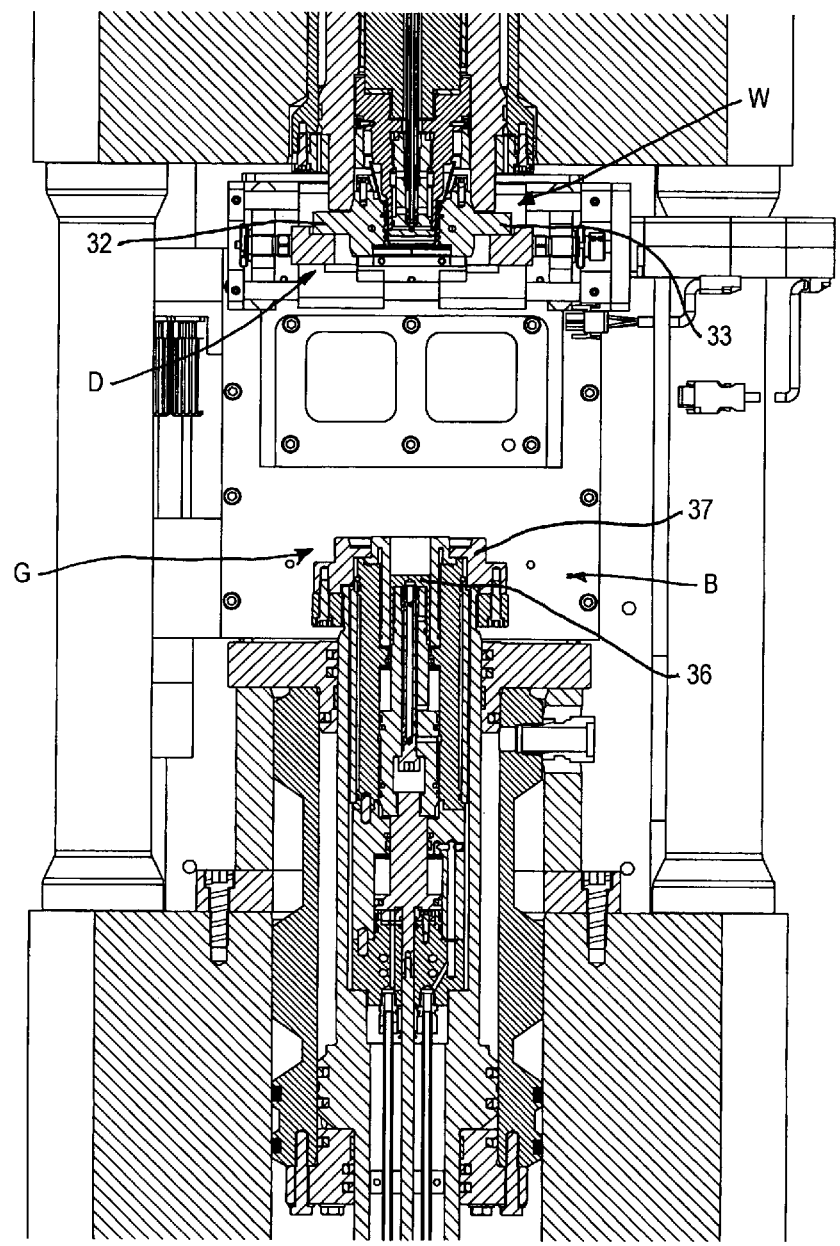

Still subsequently, the secondary actuator 113 moves the forming element 37 from the extended position H to the retracted position G, as shown in FIG. 16, and the main actuator 109 moves the second mould part 26 from the raised position C to the lowered position B, as shown in FIG. 17.

The driving motor of the linear guiding device of the moving arrangement 116 is maintained deactivated—i.e. placed in an idle operational configuration—until the main piston 110 has completed a preset stroke. In this way, the gas spring defined by the cylinder 107 and by the piston body 106 and by the operating fluid that is interposed therebetween moves the compression-moulding die arrangement 25 downwards. The compression-moulding die arrangement 25 thus moves from the forming position M to the insertion position D.

Figure 18:
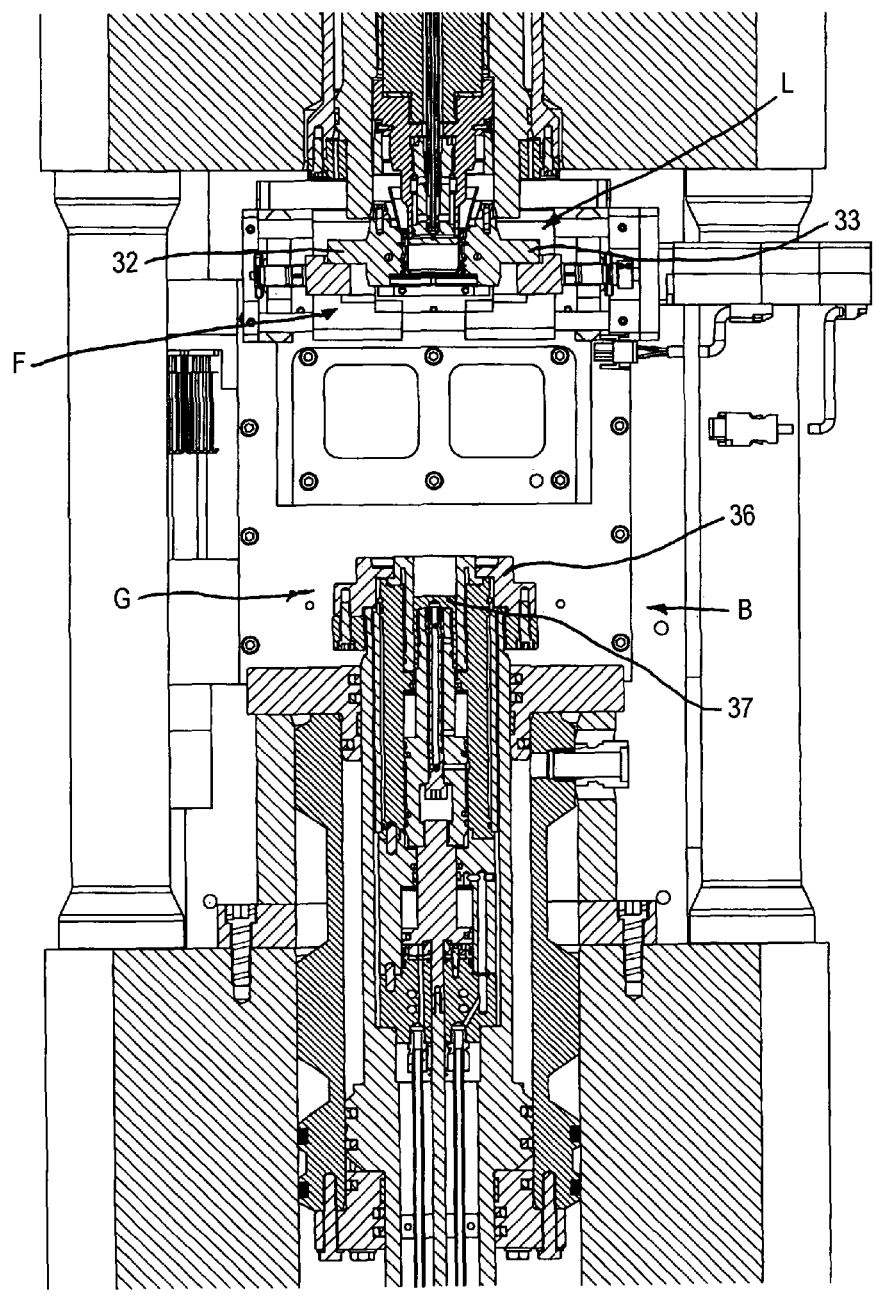

In a subsequent step of the work cycle, shown in FIG. 18, the moving arrangement 116 moves the compression-moulding die arrangement 25 from the insertion position D to an extraction position F, in which the dome 1 on which the container neck element 10 is compression-moulded is separated from the supporting body 28.

When the compression-moulding die arrangement 25 is in the extraction position F, the protuberance 57 is partially received inside the dispensing body 5.

The driving arrangement 101 moves the first half mould 32 and the second half mould 33 from the closed configuration W to a detachment configuration L, in which the dome 1 on which the container neck element 10 has been compression-moulded is detached from the first half mould 32 and from the second half mould 33.

The protuberance 57 acts as an abutting element that prevents the dome 1 from remaining attached to the first half mould 32 or to the second half mould 33 when the first half mould 32 or the second half mould 33 move away from one another.

The first half mould 32 and the second half mould 33, in the detachment configuration L, support the dome 1.

In other words, the first half mould 32 and the second half mould 33, by passing from the closed configuration W to the detachment configuration L, move away from one another by a small distance, this distance enables the dome 1 to be separated from the first half mould 32 and from the second half mould 33, but does not prevent the compression-moulding die arrangement 25 from being able to support the dome 1.

Figure 19:
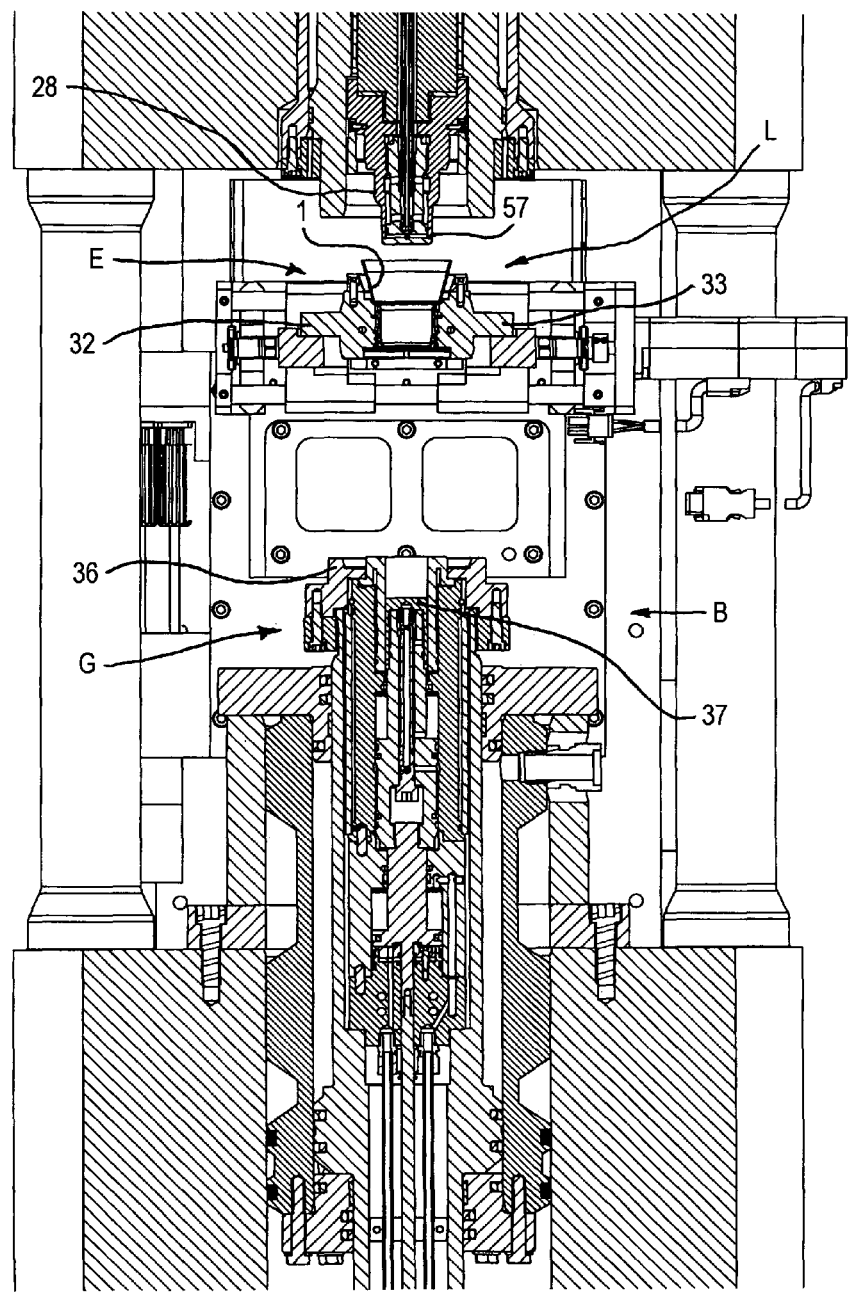

Subsequently, as shown in FIG. 19, the moving arrangement 116 moves the compression-moulding die arrangement 25 from the extraction position F to the removal and supply position E.

Still subsequently, the driving arrangement 101 moves the first half mould 32 and the second half mould 33 from the closed configuration W to the open configuration Z, as shown in FIG. 20, and the dome 1 on which the container neck element 10 has been compression-moulded is removed from the mould 23, as shown in FIG. 21.

In an embodiment that is not shown the second mould part is maintained in a fixed position and the first mould part is movable towards and away from the second mould part.

In a further embodiment that is not shown the first mould part and the second mould part are both movable.

Figure 23:
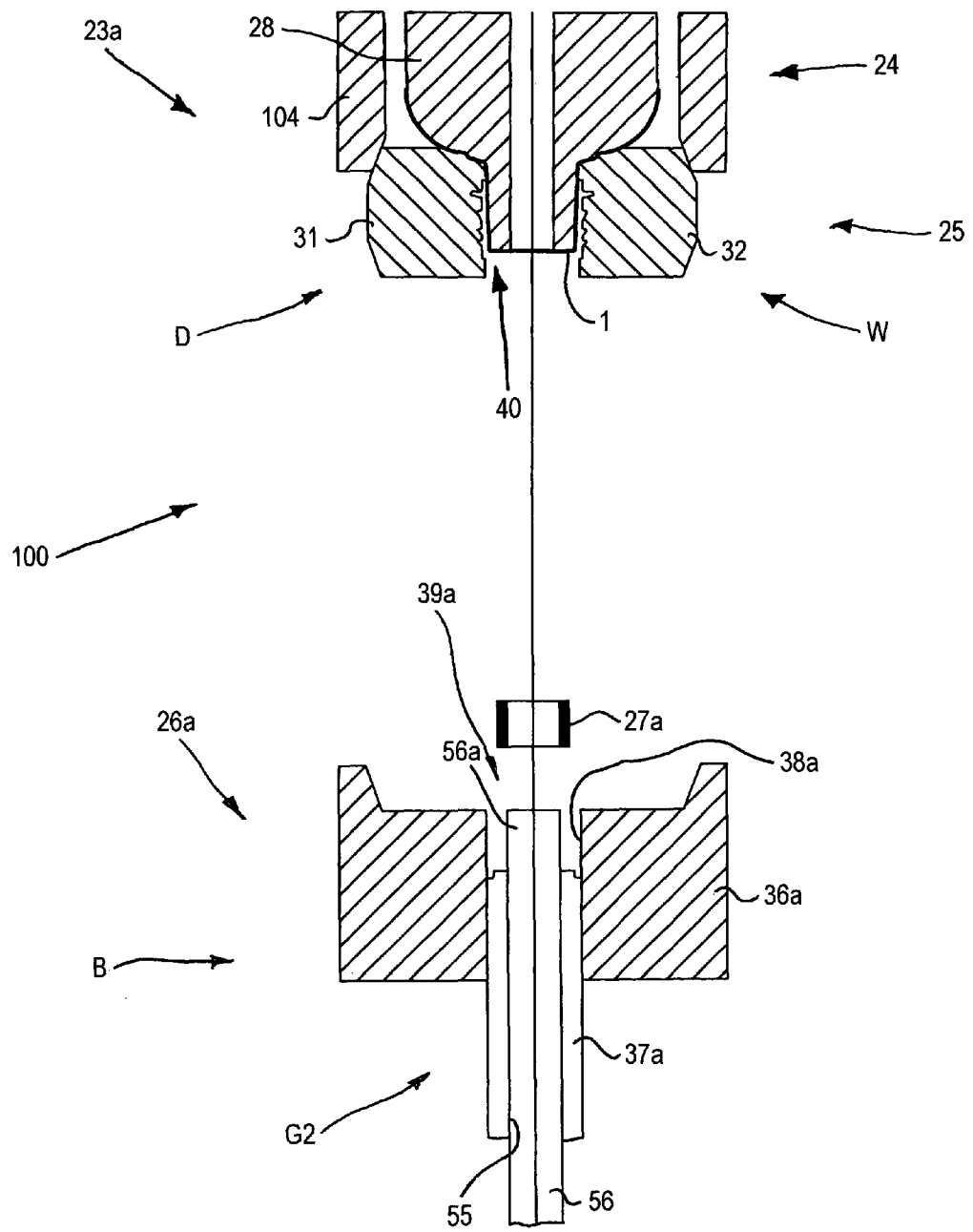
FIGS. 23 to 25 are schematic longitudinal sections of a further embodiment of an apparatus for compression-moulding plastics on an object showing subsequent steps of an operating cycle of the apparatus.
Figure 24:
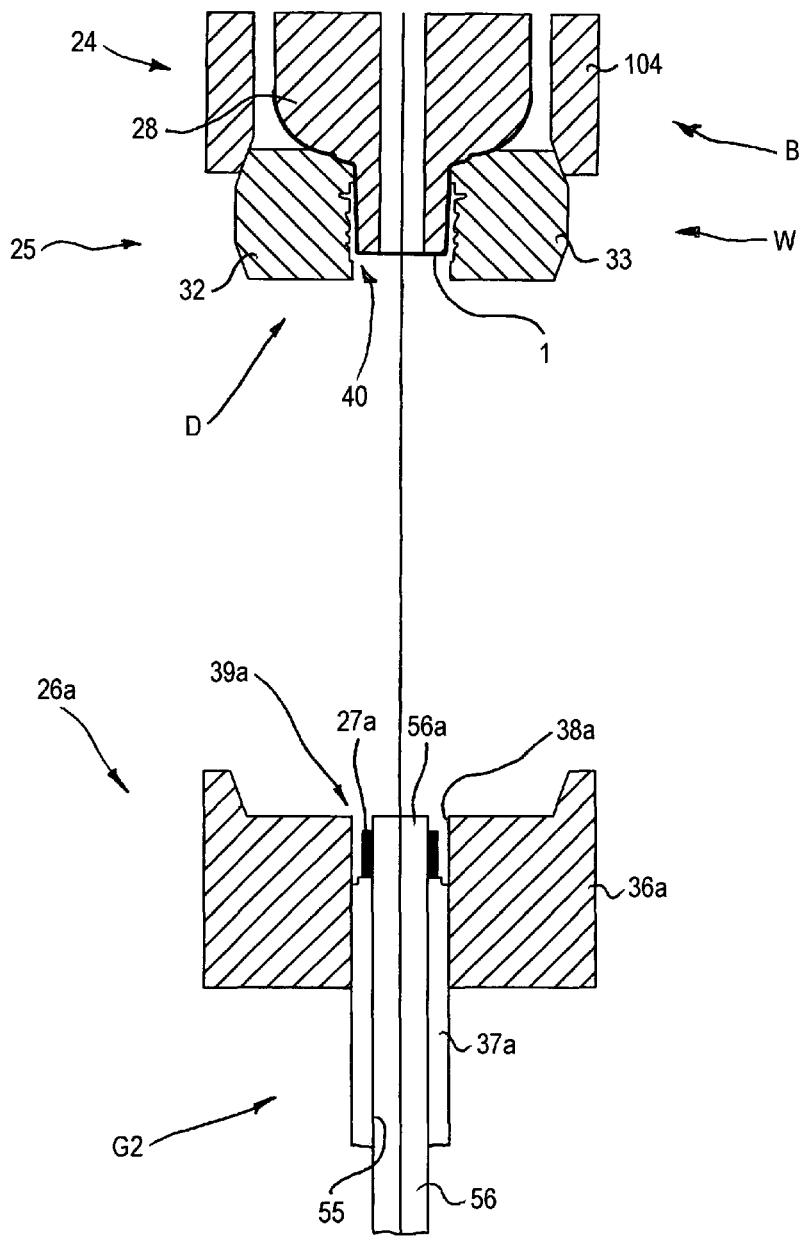
Figure 25:
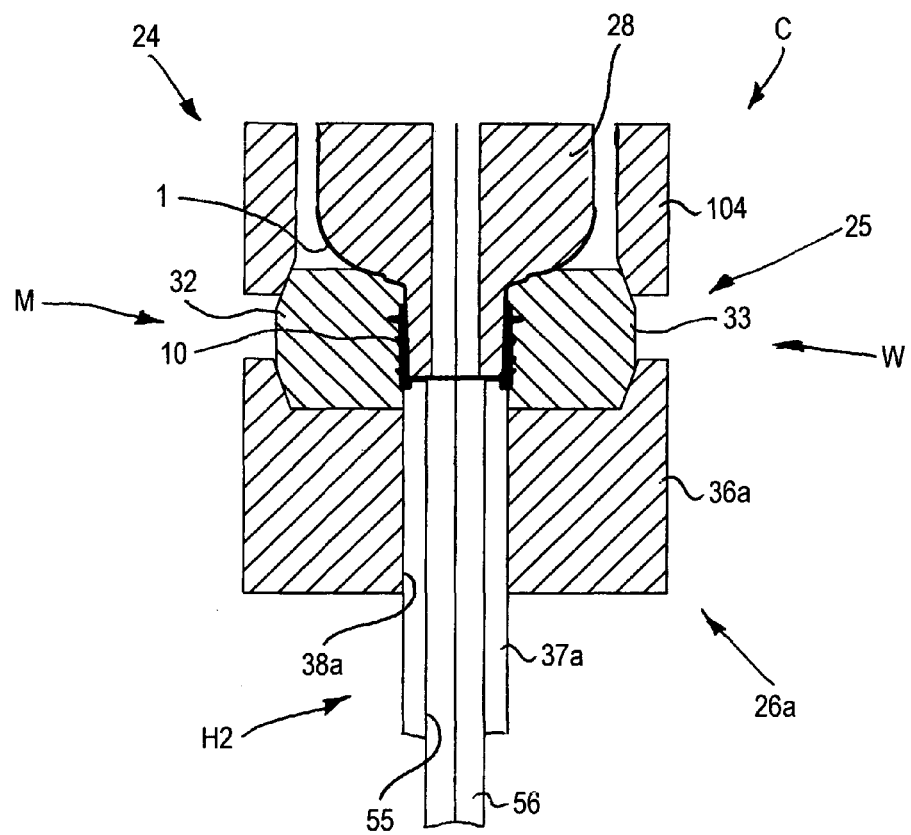

With reference to FIGS. 23 to 25, an apparatus 100 is shown schematically that is provided with a mould 23a comprising a first mould part 24 and compression-moulding die arrangement 25 of the type shown in FIGS. 7 to 22 and a second mould part 26a made according to a version.

Figure 27:
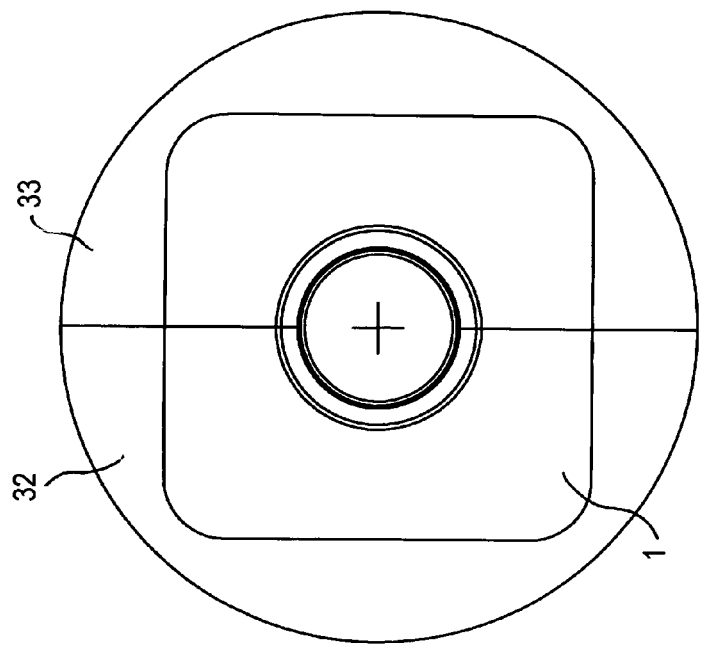
FIG. 27 is a view like that in FIG. 26 showing the die arrangement in a closed configuration.
Figure 26:
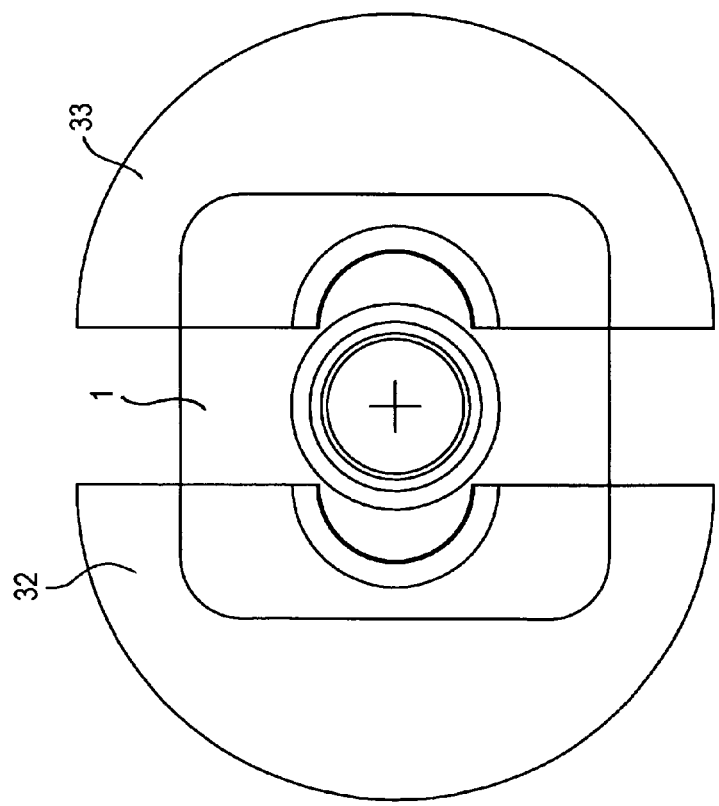
FIG. 26 is a schematic plan view of a die arrangement of an apparatus for compression-moulding plastics on an object in an open configuration.

The compression-moulding die arrangement 25 is shown schematically in FIGS. 26 and 27.

The second mould part 26a comprises a base body 36a and a forming element 37a that is slidable in a seat 38a obtained in the base body 36a.

The forming element 37a is provided with a groove 55 inside which an elongated body 56 is slidable.

The apparatus 100 comprises a secondary actuator, which is not shown, that is arranged for moving the forming element 37a between a retracted position G2, shown in FIGS. 23 and 24, in which the forming element 37a is received inside the seat 38a in such a way that the forming element 37a and the seat 38a define a cavity 39a arranged for receiving a dose 27a of plastics in a pasty state having an annular shape, and an extended position H2, shown in FIG. 25, in which the forming element 37a presses the dose 27a inside the compression-moulding die arrangement 25 to form a container neck element 10.

The apparatus 100 further comprises a further secondary actuator arranged for moving the elongated body 56 with respect to the forming element 37a.

An initial part of a work cycle of the apparatus 100 is carried out in the manner disclosed with reference to FIGS. 8 to 13.

As shown in FIG. 23, the second mould part 26 is in the lowered position B, the forming element 37 is in the retracted position G2. The compression-moulding die arrangement 25 is in the insertion position D and the first half mould 32 and the second half mould 33 are in the closed configuration W.

The dose 27a is delivered to the mould 23a.

When the forming element 37a is in the retracted position G2, an end 56a of the elongated body 56 projects from the groove 55 to the compression-moulding die arrangement 25, in such a way that the dose 27a surrounds the end 56a, as shown in FIG. 24.

Subsequently, as shown in FIG. 25, the main actuator moves the second mould part 26 from the lowered position B to the raised position C. The compression-moulding die arrangement 25 moves from the insertion position D to the forming position M.

The secondary actuator moves the forming element 37a from the retracted position G2 to the extended position H2. In this way, the dose 27a is pressed inside the forming chamber 40 to form the container neck element 10 on the dome 1.

Before the dose 27a occupies the forming chamber 40, the elongated body 56 is made to abut against the end wall 7 of the dome 1 positioned on the supporting body 28.

In this way, the elongated body 56 prevents the plastics that form the dose 27a from interacting with a central portion of the end wall 7.

The elongated body 56 thus enables container neck elements 10 to be obtained that are devoid of the further end wall 17, i.e. container neck elements 10 of the type shown in FIGS. 3 and 4.

Subsequently, a final part of a work cycle of the mould 23a is carried out in the manner disclosed with reference to FIGS. 16 to 21.

With reference to FIGS. 28 to 37, there is shown an apparatus 100 provided with a mould 123 comprising a first mould part 124 arranged for receiving a dome 1 on which a container neck element 10 has to be compression-moulded, a compression-moulding die arrangement 125 and a second mould part 126.

The second mould part 126, the compression-moulding die arrangement 125 and the first mould part 124 cooperate together so as to shape a dose 27 of plastics to obtain the container neck element 10.

The first mould part 124, the compression-moulding die arrangement 125 and the second mould part 126 are substantially aligned along a longitudinal axis Y of the mould 123.

In particular, the second mould part 126 is arranged above the compression-moulding die arrangement 125 and the compression-moulding die arrangement 125 is arranged above the first mould part 124.

The first mould part 124 comprises a supporting body 128 provided with an abutting surface 129 arranged for restingly receiving a dome 1.

The abutting surface 129 is shaped in such a way as to interact in a shapingly coupled manner with a corresponding internal surface 30 of the dome 1.

The supporting body 128 comprises a protuberance 157 arranged for penetrating inside the dispensing body 5, when the internal surface 30 rests on the abutting surface 129. When the dome 1 is positioned on the supporting body 128, the dispensing body 5 faces upwards and is arranged at a height that is greater than the connecting zone 3.

Figure 28:
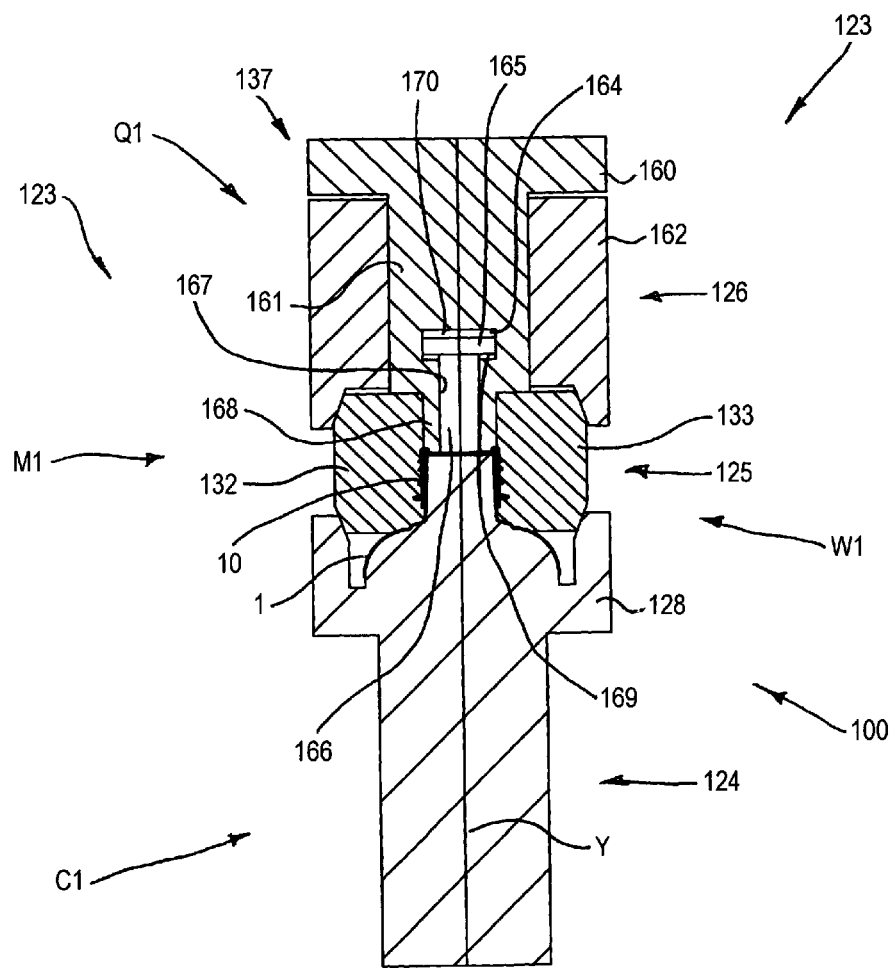
FIGS. 28 to 36 are schematic longitudinal sections of a still further embodiment of an apparatus for compression-moulding plastics on an object showing subsequent steps of an operating cycle of the apparatus.
Figure 36:
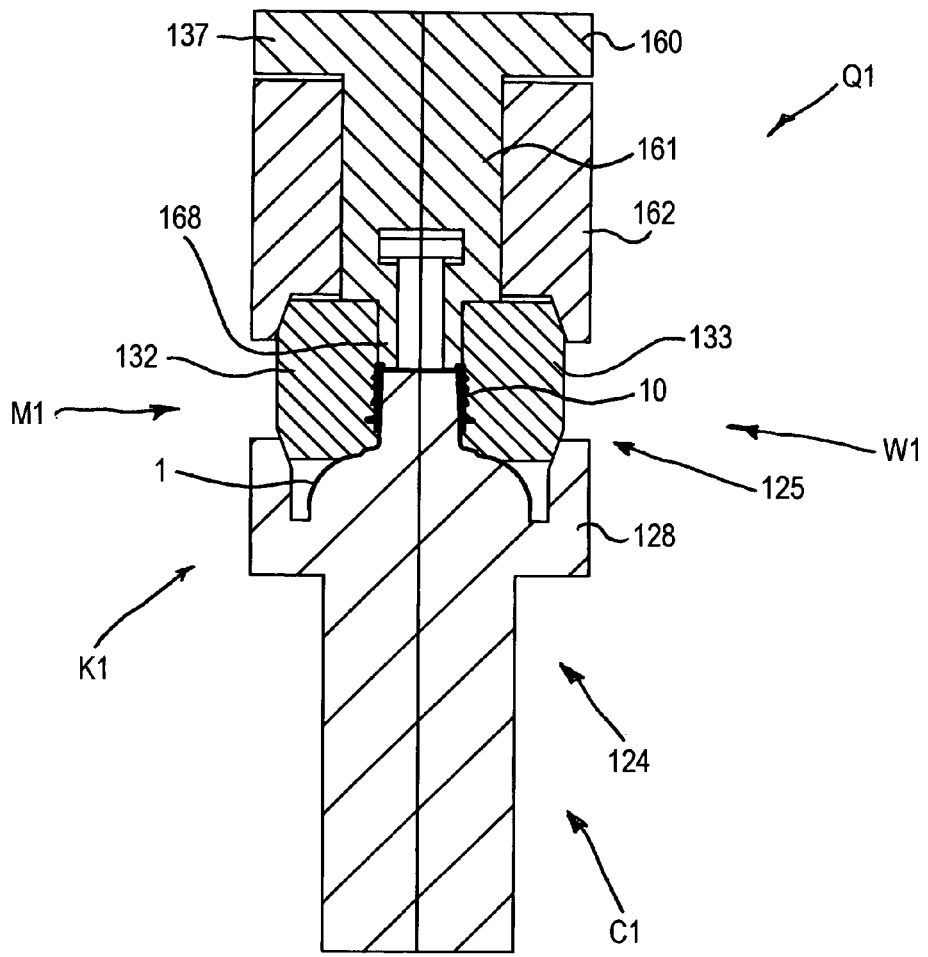

The mould 123 further comprises an actuator, for example a hydraulic actuator, arranged for moving the first mould part 124 between a lowered position B1, shown in FIGS. 29 to 34, in which the supporting body 128 receives a dome 1, and a raised position C1, shown in FIGS. 28 and 36, in which the supporting body 128 cooperates with the compression-moulding die arrangement 125 and with the second mould part 126 to shape the dose 27 to obtain the container neck element 10.

The compression-moulding die arrangement 125 comprises a first half mould 132 and a second half mould 133.

The apparatus 100 comprises a driving arrangement arranged for moving the first half mould 132 and the second half mould 133 towards and away from one another transversely with respect to the longitudinal axis Y.

Figure 29:
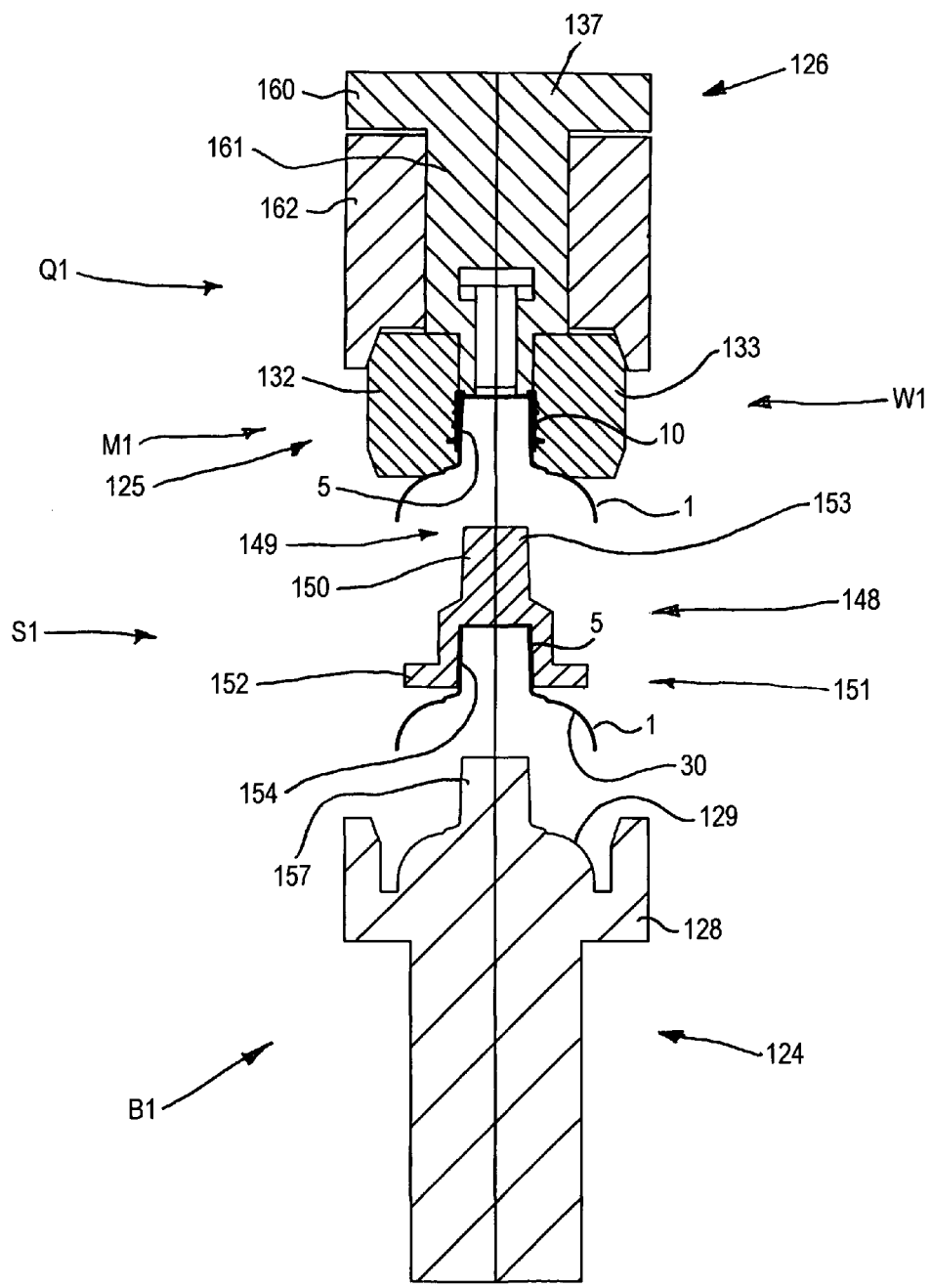
Figure 30:
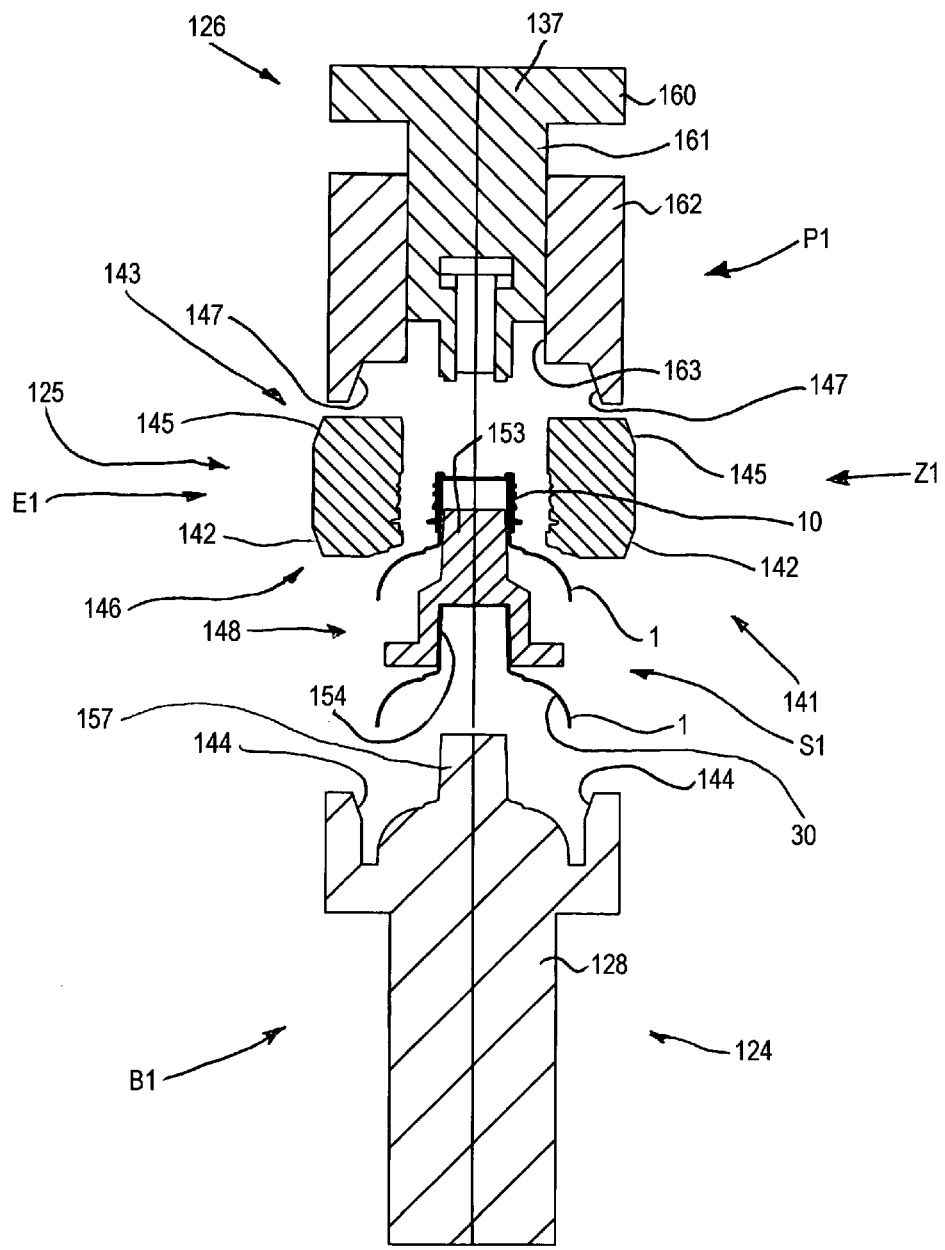
Figure 31:
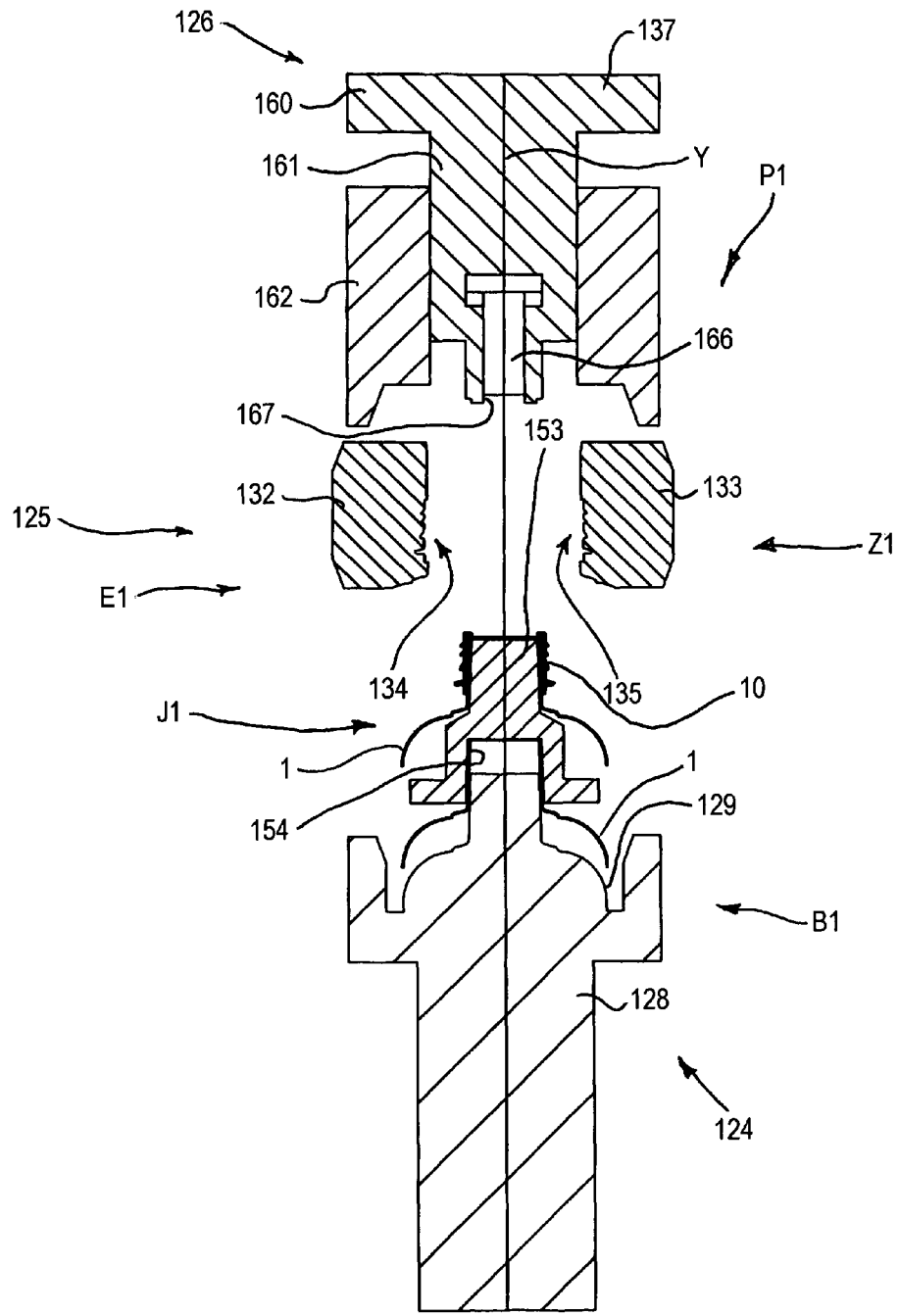

The first half mould 132 and the second half mould 133 are movable between a closed configuration W1, shown in FIGS. 28, 29 and 32 to 36, in which the first half mould 132 and the second half mould 133 are placed in mutual contact, and an open configuration Z1, shown in FIGS. 30 and 31, in which the first half mould 132 and the second half mould 133 are mutually spaced apart to enable a dome 1 on which the container neck element 10 has been formed to be removed from the compression-moulding die arrangement 125 and a further dome 1 on which a container neck element 10 has to be formed to be delivered to the compression-moulding die arrangement 125.

When the first half mould 132 and the second half mould 133 are in the closed configuration W1, in a first zone 159a of the compression-moulding die arrangement 125 a first opening 159 is defined that faces the first mould part 124 and in a second zone 158a of the compression-moulding die arrangement 125, opposite the first zone 159a, a second opening 158 is defined that faces the second mould part 126.

The second opening 158 enables a forming body 137 of the second mould part 126 to penetrate inside the compression-moulding die arrangement 125.

Similarly, the first opening 159 enables the protuberance 157—with which the dispensing body 5 is associated—to penetrate inside the compression-moulding die arrangement 125. The first half mould 132 comprises a first moulding cavity 134 and the second half mould 133 comprises a second moulding cavity 135.

When the first half mould 132 and the second half mould 133 are in the closed configuration W1, the first moulding cavity 134 and the second moulding cavity 135 cooperate with the dispensing body 5 to define a forming chamber 140 inside which the dose 27 is given the shape of the container neck element 10.

The mould 123 further comprises a moving arrangement arranged for moving the compression-moulding die arrangement 125 along the longitudinal axis Y. The compression-moulding die arrangement 125 can assume a forming position M1, shown in FIGS. 28, 29 and 36, in which the compression-moulding die arrangement 125 cooperates with the first mould part 124 and with the second mould part 126 to shape the dose 27 to obtain the container neck element 10, a delivery position E1, shown in FIGS. 30 to 32, in which the compression-moulding die arrangement 125 is spaced apart from the first mould part 124 and from the second mould part 126 to deliver a dome 1 on which the container neck element 10 has been moulded, and a locking position I1, shown in FIGS. 33 and 34, in which the compression-moulding die arrangement 125 presses a further dome 1 on which a container neck element 10 has to be formed against the first mould part 124.

The compression-moulding die arrangement 125 comprises a closure promoting arrangement 141 arranged for maintaining the first half mould 132 and the second half mould 133 in the closed configuration W1.

The closure promoting arrangement 141 comprises a first conical surface element 142 obtained in an end zone 143 of the first half mould 132 and of the second half mould 133 and arranged for cooperating with a further first conical surface element 144 obtained in the first mould part 124.

The closure promoting arrangement 141 further comprises a second conical surface element 145 obtained in a further end zone 146 of the first half mould 132 and of the second half mould 133, opposite the end zone 143, and arranged for cooperating with a further second conical surface element 147 obtained in the second mould part 126.

The forming body 137 is provided with a first member 160 that is further from the compression-moulding die arrangement 125 and with a second member 161 fixed to the first member 160 and nearer the compression-moulding die arrangement 125.

The second member 161 comprises a forming appendage 168 arranged for interacting with the dose 27.

The second mould part 126 further comprises a sleeve 162 provided with a seat 163 in which the second member 161 is received.

In the sleeve 162 the further second conical surface element 147 is obtained.

The forming body 137 is maintained in a fixed position, the sleeve 162 being slidable along the second member 161.

The sleeve 162 is movable between a rest position P1, shown in FIGS. 30 to 35, in which the sleeve 162 is further from the first member 160, and an operating position Q1, shown in FIGS. 28, 29 and 36, in which the sleeve 162 is nearer the first member 160. The second mould part 126 may comprise an elastic device, which is not shown, which induces the sleeve 162 to assume the rest configuration P1. The elastic device may be of the pneumatic spring type, as disclosed with reference to FIGS. 7 to 22.

The second mould part 126 further comprises a chamber arrangement 164 obtained in the second member 161 and inside which a piston 165 is movable.

The piston 165 defines in the chamber arrangement 164 a first chamber 169 and a second chamber 170, each of which can be supplied with an operating fluid through a conduit, which is not shown.

To the piston 165 a stem 166 is fixed that extends to the compression-moulding die arrangement 125 through a hole 167 obtained in the second member 161 and such as to pass through the forming appendage 168.

The piston 165 and the chamber arrangement 164 cooperate to define a further actuator that drives the stem 166.

A work cycle of the apparatus 100 is disclosed with reference to FIGS. 28 to 36.

In FIG. 28 a step of the work cycle is shown in which a container neck element 10 has been compression-moulded on a dome 1.

The dome 1 is maintained in the mould 123 for a period of time during which the container neck element 10 cools and the shape thereof is stabilised.

The first mould part 124 is in the raised position C1, the compression-moulding die arrangement 125 is in the forming position M1, the first half mould 132 and the second half mould 133 are in the closed configuration W1, the sleeve 162 is in the operating position Q1.

Subsequently, as shown in FIG. 29, the actuator moves the first mould part 124 from the raised position C1 to the lowered position B1.

The compression-moulding die arrangement 125 is in the forming position M1.

The sleeve 162 is in the operating position Q1.

The first half mould 132 and the second half mould 133 are in the closed configuration W1 and retain the dome 1 on which a container neck element 10 has been compression-moulded.

In FIG. 29 a handling device 148 is further shown comprising a first end 149, facing the compression-moulding die arrangement 125, at which a first handling element 150 is obtained, the first handling element 150 being arranged for removing from the first half mould 132 and from the second half mould 133 the dome 1 on which a container neck element 10 has been compression-moulded.

The handling device 148 further comprises a second end 151, opposite the first end 149 and facing the first mould part 124, at which a second handling element 152 is obtained that is arranged for delivering to the first mould part 124 a further dome 1 on which the container neck element 10 has to be compression-moulded.

The handling device 148 is introduced between the first mould part 124 and the compression-moulding die arrangement 125 and assumes a raised removal configuration S1, shown in FIGS. 29 and 30.

The first handling element 150 comprises a protruding element 153—substantially shaped like the protuberance 157—which, in the raised removal configuration S1 is aligned with the dome 1 on which a container neck element 10 was compression-moulded in such a way that the protruding element 153 and the dispensing body 5- and the container neck element 10 that surrounds the dispensing body 5—are substantially coaxial.

The second handling element 152 comprises a seat 154 that partially receives a further dome 1 on which the container neck element 10 has to be compression-moulded.

In the raised removal configuration S1, the further dome 1 on which the container neck element 10 has to be compression-moulded is spaced apart from the first mould part 124. Subsequently, as shown in FIG. 30, the first mould part 124 is in the lowered position B1.

The compression-moulding die arrangement 125 passes from the forming position M1 to the delivery position E1.

The elastic device moves the sleeve 162 from the operating position Q1 to the rest position P1.

The driving arrangement moves the first half mould 132 and the second half mould 133 from the closed configuration W1 to the open configuration Z1.

The dome 1 on which the container neck element 10 was moulded is released by the first half mould 132 and by the second half mould 133, reaches—for example by gravity—the handling device 148 and engages the protruding element 153.

In the work cycle step shown in FIG. 31, the first mould part 124 is in the lowered position B1, the compression-moulding die arrangement 125 is in the delivery position E1 and the sleeve is in the rest position P1.

The first half mould 132 and the second half mould 133 are in the open configuration Z1. Subsequently, the driving arrangement moves the first half mould 132 and the second half mould 133 from the open configuration Z1 to the closed configuration W1.

The handling device 148 is moved along the longitudinal axis Y in such a way as to assume a lowered releasing position J1, in which the seat 154 delivers the further dome 1 on which the container neck element 10 has to be compression-moulded to the first mould part 124.

Figure 32:
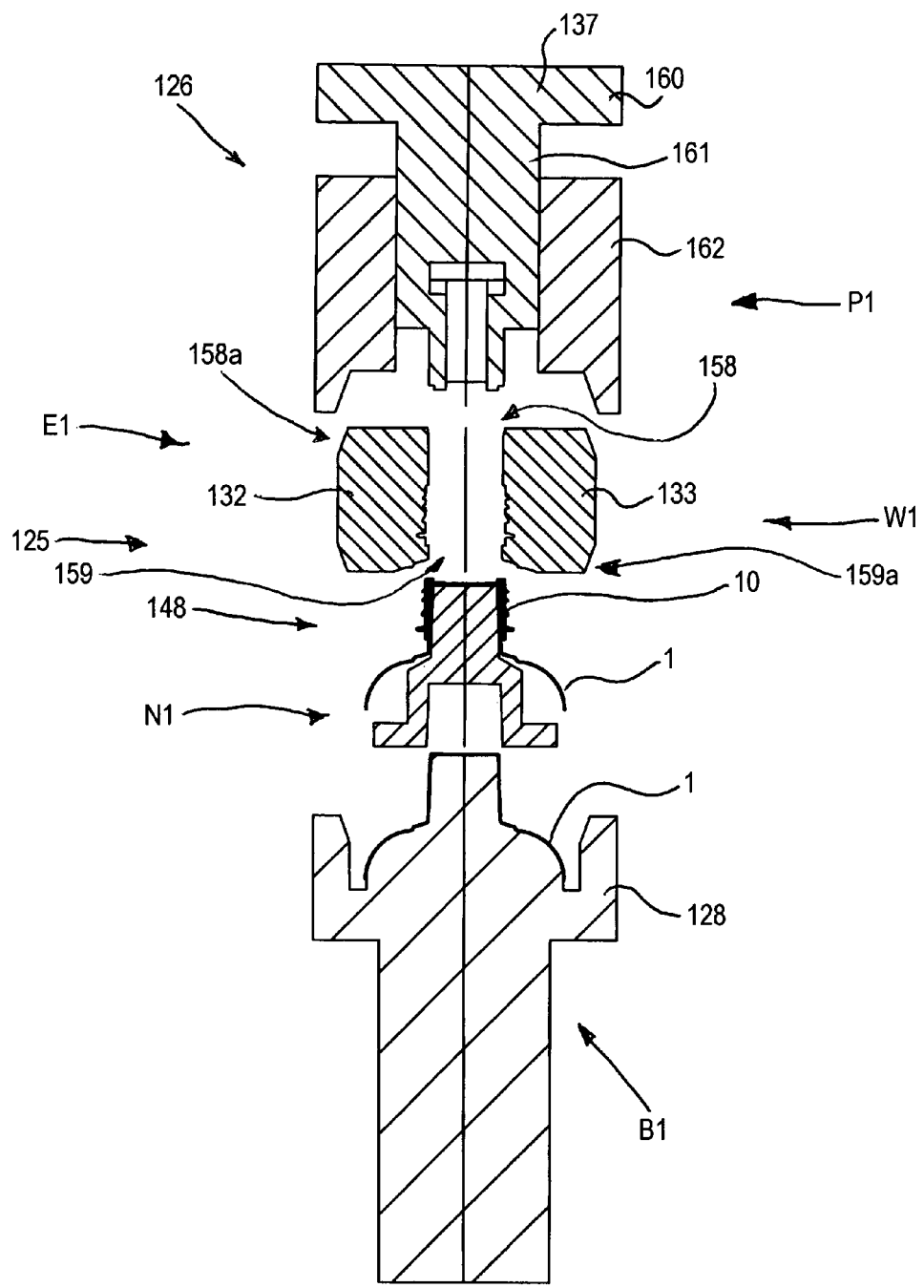

In the work cycle step shown in FIG. 32, the first mould part 124 is in the lowered position B1, the compression-moulding die arrangement 125 is in the delivery position E1 and the sleeve 162 is in the rest position P1.

The handling device 148 is moved along the longitudinal axis Y in such a way as to assume an intermediate moving position N1 in which the handling device 148—and the dome 1 on which a container neck element 10 was compression-moulded—is extracted from a zone interposed between the first mould part 124 and the compression-moulding die arrangement 125.

The handling device 148, when it is in the intermediate moving position N1, can be moved transversely with respect to the longitudinal axis Y without interfering with the first mould part 124 and with the compression-moulding die arrangement 125.

In an embodiment of the mould 123 which is not shown, the handling device can always be maintained at the same vertical height.

In this case, the compression-moulding die arrangement 125 and the first mould part 124 are moved along the longitudinal axis Y to, respectively, deliver the dome 1 on which a container neck element 10 was compression-moulded and remove the further dome 1 on which the container neck element 10 has to be compression-moulded.

Figure 33:
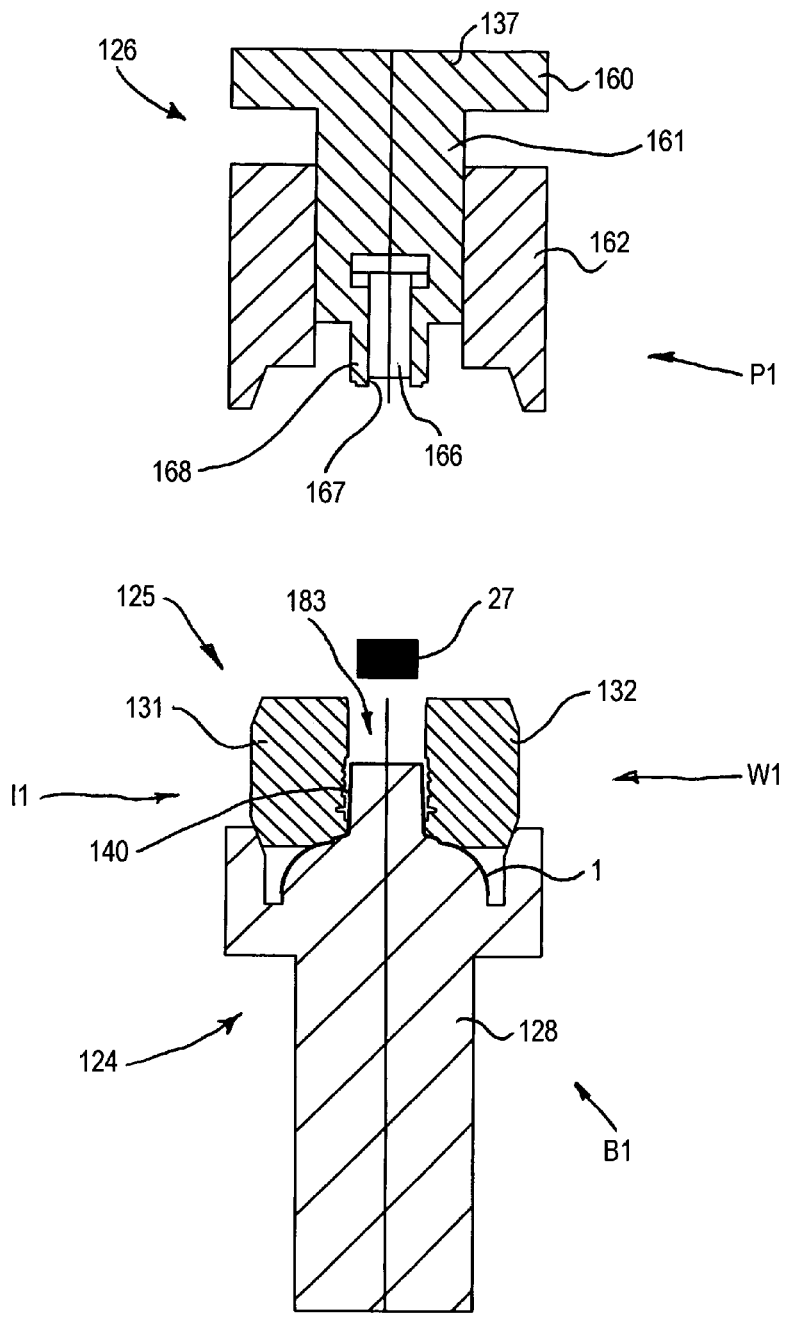
Figure 34:
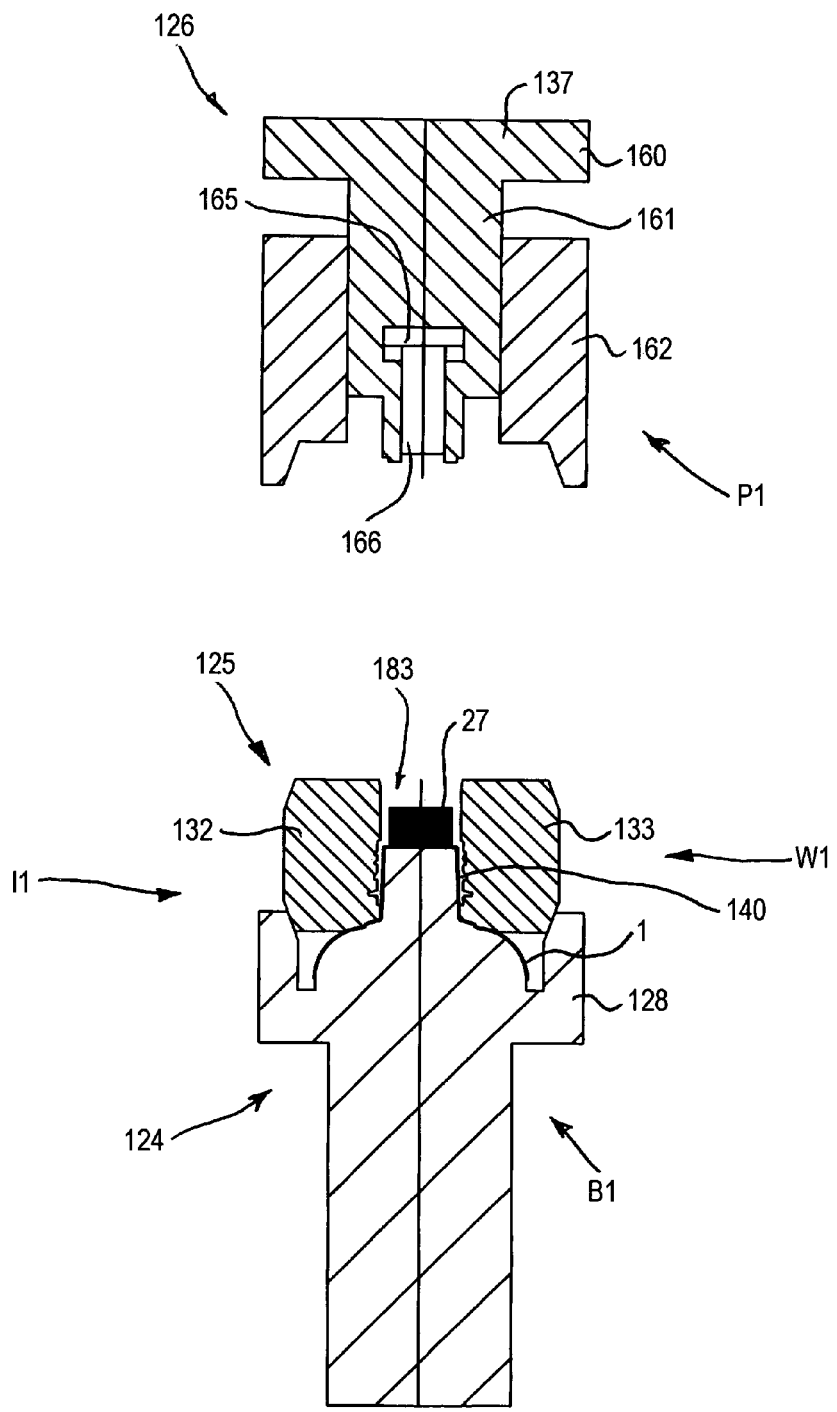

In subsequent steps of the work cycle shown in FIGS. 33 and 34, the first mould part 124 is in the lowered position B1, the first half mould 132 and the second half mould 133 are in the closed configuration W1 and the sleeve 162 is in the rest position P1.

The further moving arrangement moves the compression-moulding die arrangement 125 from the delivery position E1 to the locking position I1.

The driving arrangement maintains the first half mould 132 and the second half mould 133 in the closed configuration W1.

The compression-moulding die arrangement 125 and the first mould part 124 define a further cavity 183 arranged for receiving the dose 27.

In the locking position I1 the compression-moulding die arrangement 125 clamps the further dome 1, on which the container neck element 10 has to be compression-moulded, against the first mould part 124 and defines the forming chamber 140.

A supplying device, which is not shown, delivers a dose 27 to the mould 123, the dose 27 being received in the further cavity 183.

Figure 35:
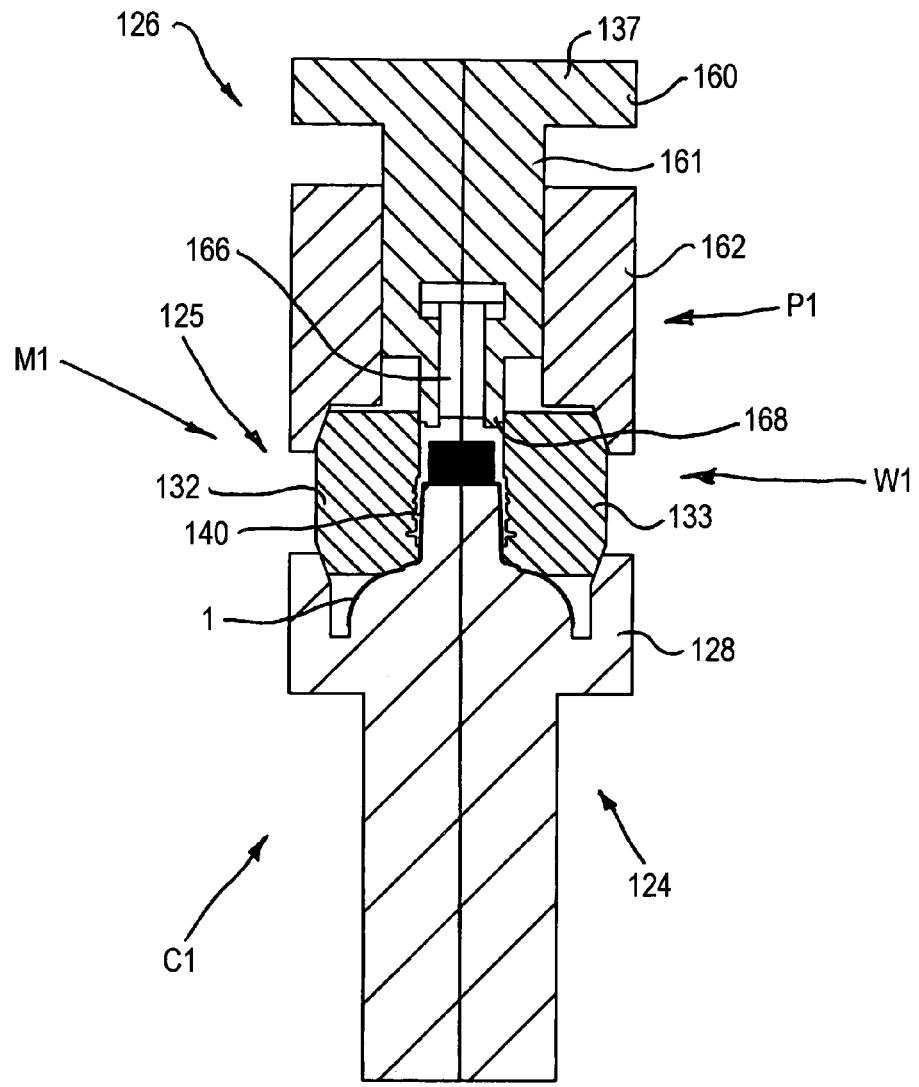

Subsequently, as shown in FIGS. 34 and 35, the actuator moves the first mould part from the lowered position B1 to the raised position C1. The compression-moulding die arrangement 125 moves from the locking position I1 to the forming position M1. Subsequently, as shown in FIG. 36, the compression-moulding die arrangement 125 interacts with the sleeve 162 and, by overcoming the resistance of the elastic device, moves the sleeve 162 from the rest position P1 to the operating position Q1.

The dose 27, moved from the first mould part 124, interacts with the second mould part 126.

The forming appendage 168 pushes the dose 27 inside the forming chamber 40 to shape the dose 27.

The mould 123 assumes an operational configuration K1 in which both the forming body 137 and the protuberance 157 extend inside the compression-moulding die arrangement 125—respectively through the second opening 158 and the first opening 159- to compression-mould the dose 27.

By suitably checking the quantity of operating fluid present in the first chamber 169 and in the second chamber 170 and the pressure of the operating fluid in the first chamber 169 and in the second chamber 170 it is possible to vary the position of the stem 166.

Figure 37:
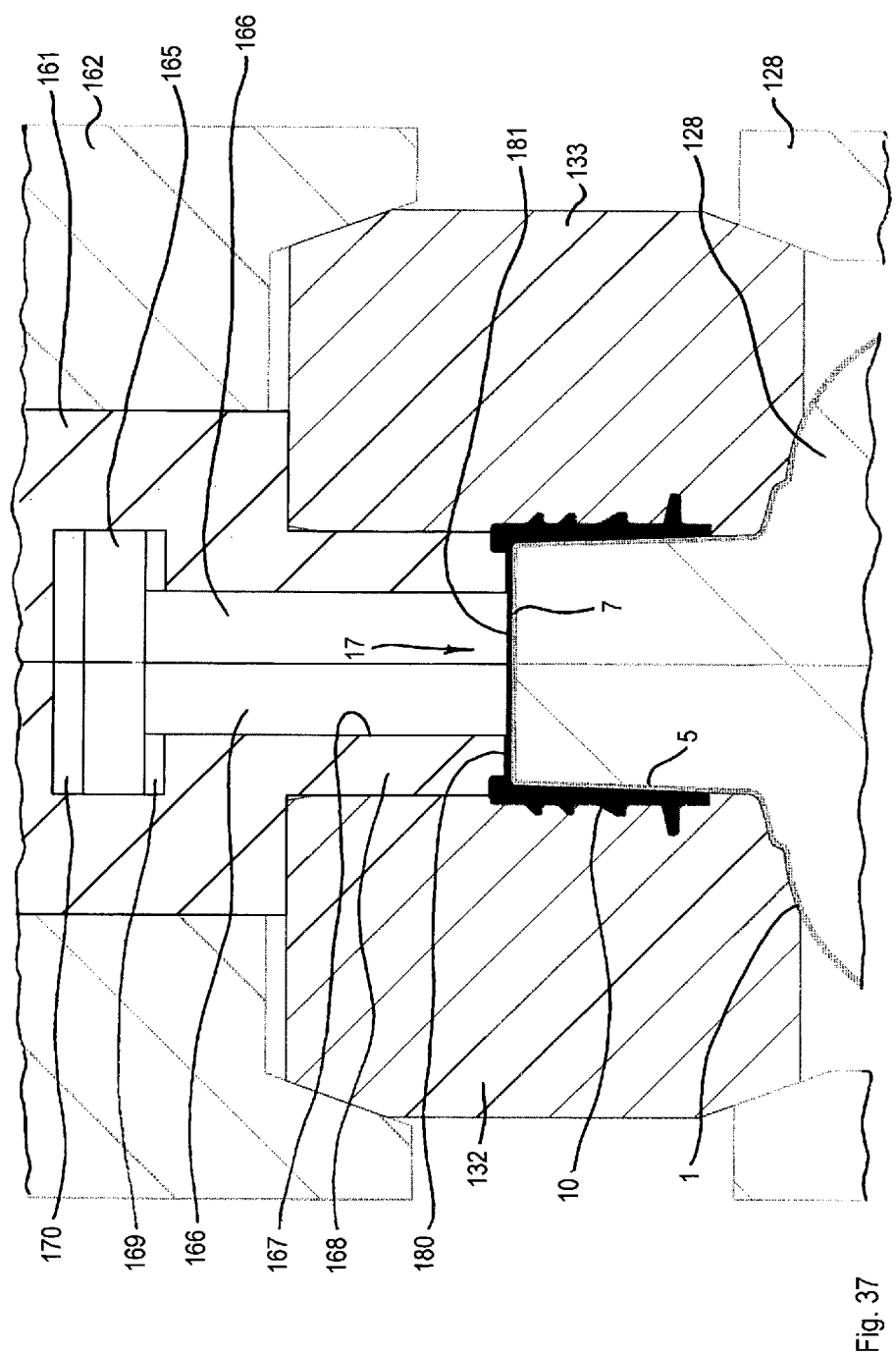
FIG. 37 is an enlarged detail of FIG. 36.

The stem 166 can be completely received in the hole 167, or protrude partially from the hole 167, as shown in FIG. 37.

The stem 166 enables domes 1 to be obtained, one of which is shown in FIG. 6 as well as in FIG. 37, provided with a container neck element 10 comprising a further end wall 17 having a non-uniform thickness.

In particular, the further end wall 17 comprises a peripheral annular zone 180 having a substantially constant thickness and a central zone 181 having a thickness that may assume values that are different from one dome to the other.

The further end wall 17 can be welded, at the peripheral annular zone 180, to a cap that is screwable on a threaded container neck element.

In addition, at the peripheral annular zone 180 the further line of intended separation 18 can be made.

Unlike the peripheral annular zone 180, the central zone 181 does not undergo any further processing after compression moulding.

As a result, a difference in the thickness of the central zone 181—albeit of a very slight amount—that is detectable by comparing domes made in various work cycles does not constitute a defect of the domes.

The stem 166 enables plastics dosing errors and dimensional differences in the thickness of the sheet material from which the dome 1 was obtained by thermoforming to be compensated.

In particular, if in the mould 123 a dose is deposited that is smaller than a preset amount, the stem 166 is projected to the outside of the hole 167—as shown in FIG. 37—to ensure effective compression of the plastics and thus correct forming.

In this case, the container neck element 10 comprises a further end wall 17 in which the central zone 181 has less thickness than that of the peripheral annular zone 180.

If a dose is deposited in the mould 123 that is greater than a preset amount, the stem 166 is pushed inside the hole 167 in such a way that the excess of plastics can be received in the hole 167.

In this case, the container neck element 10 comprises a further end wall 17 in which the central zone 181 has a greater thickness than that of the peripheral annular zone 180.

Figure 38:
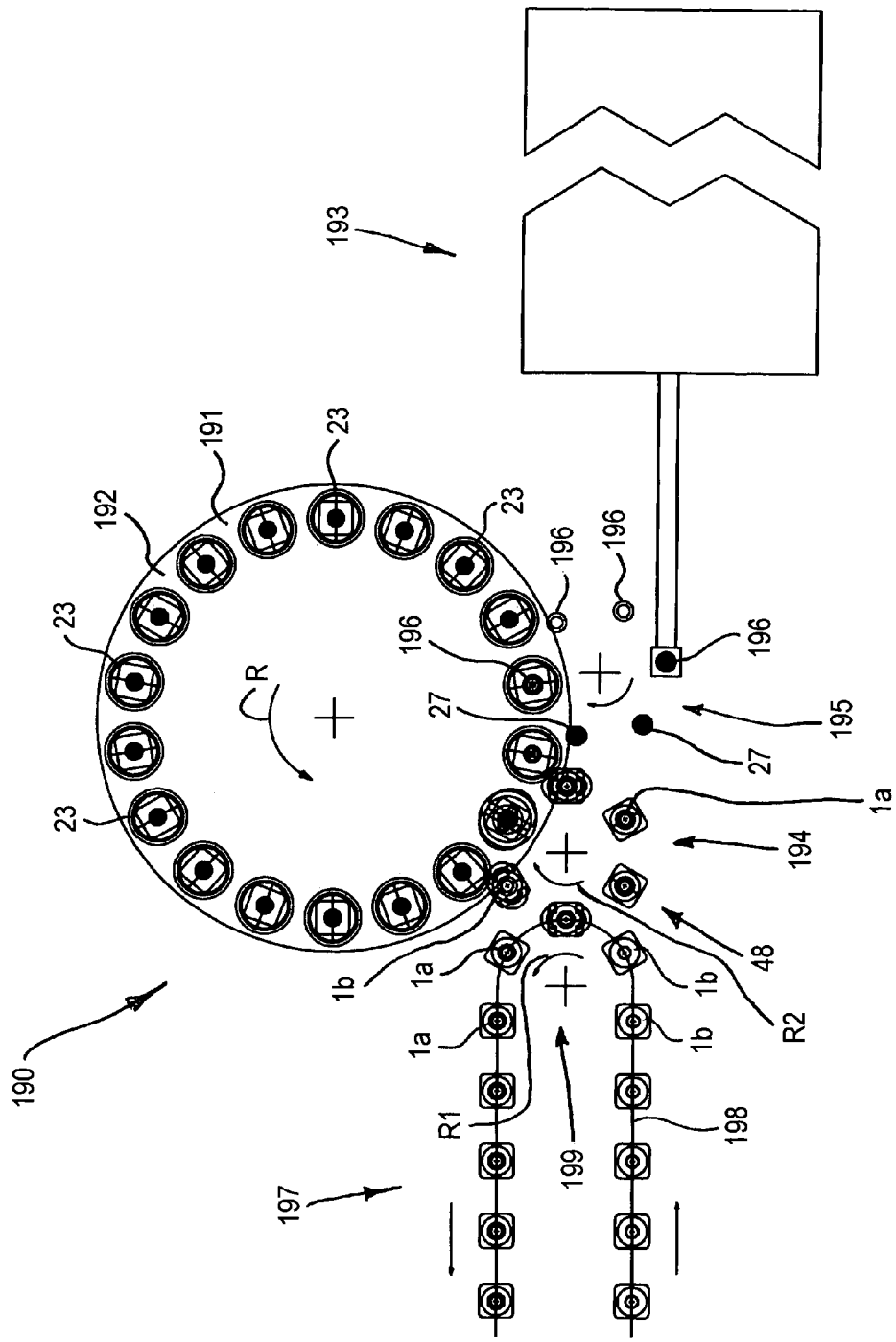
FIG. 38 is a schematic plan view of a machine for compression-moulding plastics on objects.
Figure 39:
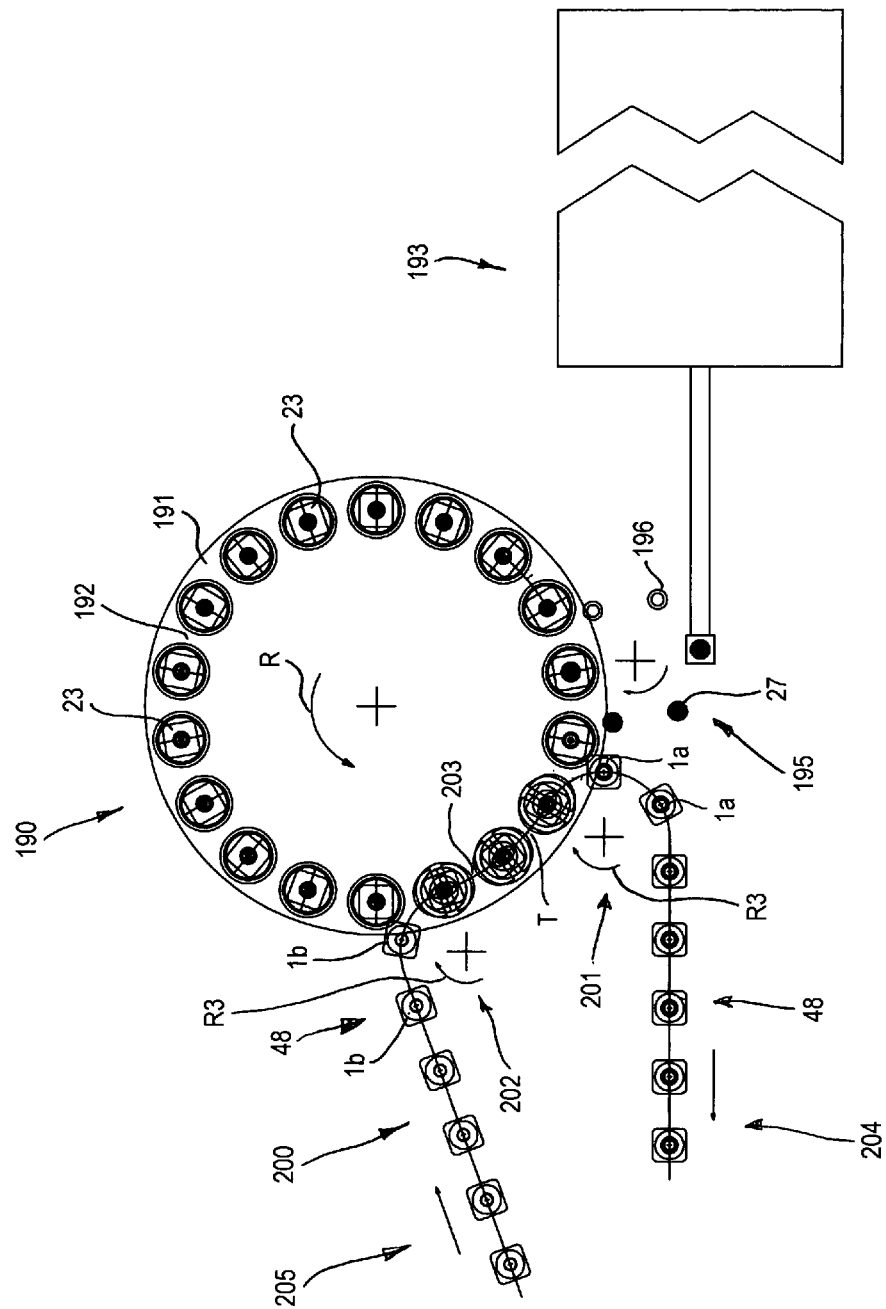
FIG. 39 is a view like that in FIG. 38 showing a version of the machine.
Figure 40:
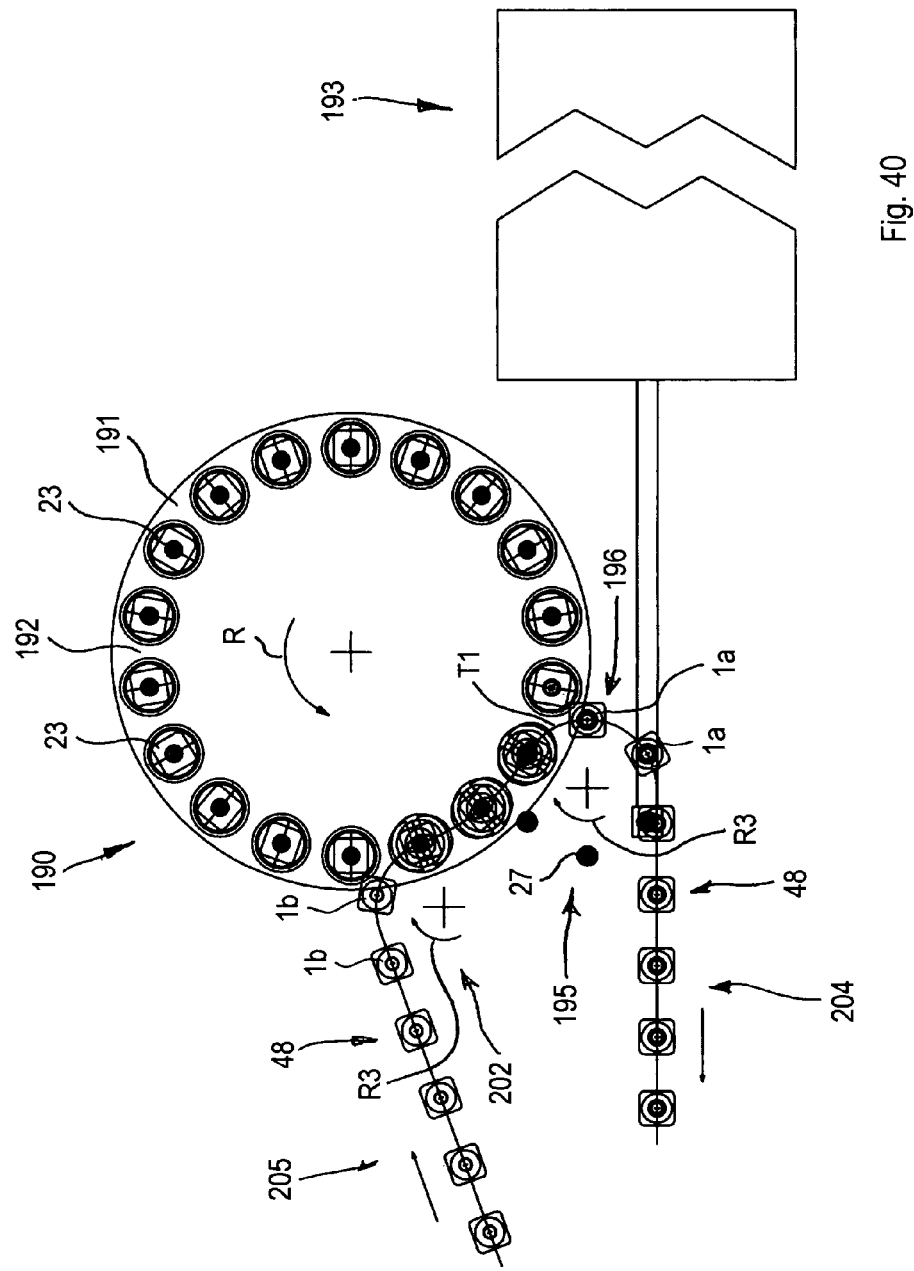
FIG. 40 is a view like that in FIG. 38 showing a further version of the machine.

With reference to FIGS. 38 to 40, some embodiments of a machine 190 for compression-moulding plastics on objects are shown comprising a rotatable forming carousel 191 that supports a plurality of apparatuses 100, i.e. a plurality of moulds, of the same type as those disclosed above.

Subsequently, in order not to complicate the description, reference will be made to moulds 23 of the type disclosed with reference to FIGS. 7 to 22.

Everything that is affirmed with reference to the moulds 23 has to be considered to refer also to the moulds 23a in FIGS. 23 to 25 and to the moulds 123 in FIGS. 28 to 37 and to the moulds 501 that will be disclosed below with reference to FIGS. 44 to 50 and to the moulds 501a that will be disclosed below with reference to FIGS. 51 to 53.

The moulds 23 are mounted in a peripheral zone 192 of the forming carousel 191.

The moulds 23 are positioned at substantially constant angular intervals on the forming carousel 191.

An extruder 193 is further provided which is arranged for dispensing doses of plastics in a pasty state with which the forming carousel 191 is supplied.

Subsequently, in order not to complicate the description, reference will be made to doses 27 of the type disclosed with reference to FIGS. 7 to 22 and to FIGS. 28 to 37. Everything that is affirmed with reference to the doses 27 has to be considered to refer also to the doses 27a in FIGS. 23 to 25.

The machine 190 further comprises a supplying carousel 195 arranged for removing the doses 27 from the extruder 193 and delivering the doses 27 to the moulds 23.

The supplying carousel 195 comprises a plurality of grasping elements 196 arranged peripherally on the supplying carousel 195.

The grasping elements 196 are positioned at substantially constant angular intervals on the supplying carousel 195.

With reference to FIG. 38, an embodiment of the machine 190 is shown comprising, in addition to the forming carousel 191 and to the supplying carousel 195, a transferring carousel 194 positioned laterally with respect to the forming carousel 191 and arranged for supporting a plurality of handling devices 48.

The handling devices 48 are mounted in a peripheral region of the transferring carousel 194.

The handling devices 48 are positioned at substantially constant angular intervals on the transferring carousel 194.

The machine 190 further comprises a conveying device 197, provided with a flexible conveying element 198, arranged laterally with respect to the transferring carousel 194 and partially wound, near the transferring carousel 194, on a rotating body 199.

The transferring carousel 194 is rotated in a direction R1.

The rotating body 199 is rotated in a further direction R2, opposite the direction R1.

In operation, each handling device 48 of the transferring carousel 194 delivers to the flexible conveying element 198 a dome 1a on which a container neck element 10 was compression-moulded and removes from the flexible conveying element 198 a dome 1b on which a container neck element 10 has to be compression-moulded.

Subsequently, the handling device 48 delivers to a mould 23 the further dome 1b on which a container neck element 10 has to be compression-moulded and removes from the mould 23 another dome 1a on which a container neck element 10 was compression-moulded.

Still subsequently, the supplying carousel 195—arranged downstream of the transferring carousel 194 with respect to a rotation direction R of the forming carousel 191—deposits a dose 27 in the mould 23 to which the dome 1b was delivered on which a container neck element 10 has to be compression-moulded.

Still subsequently, whilst the forming carousel 191 rotates, the container neck element 10 is compression-moulded according to what is disclosed with reference to FIGS. 7 to 22, or to FIGS. 23 to 25, or to FIGS. 28 to 37, or to FIGS. 42 to 50, or to FIGS. 51 to 53.

With reference to FIG. 39, there is shown a further embodiment of the machine 190 comprising, in addition to the forming carousel 191 and to the supplying carousel 195, a flexible conveying arrangement 200—provided, for example, with a belt conveying element, or with a chain conveying element—positioned laterally with respect to the forming carousel 191 and arranged for supporting a plurality of handling devices 48. The flexible conveying arrangement 200 comprises a first portion 204 provided with handling elements 48 that move away from the forming carousel 191 domes 1a on which a container neck element 10 was compression-moulded and a second portion 205 provided with handling elements 48 that move towards the forming carousel 191 domes 1b on which a container neck element 10 has to be compression-moulded.

The flexible conveying arrangement 200 is partially wound, near the transferring carousel 194, on a first rotating body 201 and on a second rotating body 202.

The forming carousel is rotated in a rotation direction R.

The first rotating body 201 and the second rotating body 202 are rotated in a further rotation direction R3, opposite the rotation direction R.

The first rotating body 201 and the second rotating body 202 are shaped in such a way that a further portion 203 of the flexible conveying arrangement 200—interposed between the first portion 204 and the second portion 205—is arranged along a part of the trajectory T defined by the moulds 23 when the forming carousel 191 is rotated.

In this way, an interval of time of considerable length is provided during which a handling device 48, after being inserted between the first mould part 24 and the compression-moulding die arrangement 25 of a mould 23, can remove from the mould 23 a dome 1a on which a container neck element 10 was compression-moulded and can deliver to the mould 23 a further dome 1b on which a container neck element 10 has to be compression-moulded.

Subsequently, the supplying carousel 195—arranged downstream of the flexible conveying arrangement 200 with respect to the rotation direction R—deposits a dose 27 in the mould 23 to which the further dome 1b was delivered on which a container neck element 10 has to be compression-moulded.

Still subsequently, whilst the forming carousel 191 rotates, the container neck element 10 is compression-moulded according to what is disclosed with reference to FIGS. 7 to 22, or to FIGS. 23 to 25, or to FIGS. 28 to 37, or to FIGS. 42 to 50, or to FIGS. 51 to 53.

With reference to FIG. 40, a further embodiment of the machine 190 is shown that differs from the embodiment of the machine 190 in FIG. 39 in that there is provided a supplying carousel 195 that, instead of being arranged downstream of the flexible conveying arrangement 200 with respect to the rotation direction R, is interposed between the first portion 204 of the flexible conveying arrangement 200 and the second portion 205 of the flexible conveying arrangement 200.

In particular, a zone of the conveying arrangement 200 is arranged along a further trajectory T1 defined by the grasping elements 196 when the supplying carousel 195 is rotated.

In an embodiment, the supplying carousel 195 is arranged coaxially to, or substitutes, the first rotating body 201.

In operation, the supplying carousel 195 delivers a dose 27 to a mould 23 immediately after a dome 1a—on which a container neck element 10 was compression-moulded—has been removed from the mould 23a and a further dome 1b has been delivered on which a container neck element 10 has to be compression-moulded.

In an embodiment that is not shown, there is provided a removing carousel for removing from a mould 23 a dome 1 on which a container neck element 10 was compression-moulded, an inserting carousel arranged for delivering to the mould 23 a further dome 1 on which a container neck element 10 have to be compression-moulded and a further transferring carousel arranged for depositing in the mould 23 a dose of plastics 27.

In another embodiment that is not shown, there is provided a single moving carousel configured so as to remove from a mould 23 a dome 1 on which a container neck element 10 has been compression-moulded, delivering to the mould 23 a further dome 1 on which a container neck element 10 has to be compression-moulded and depositing in the mould 23 a dose of plastics 27.

In a further embodiment that is not shown, the forming carousel 191 comprises a plurality of moving elements arranged for moving the domes 1. The moving elements are supported by the forming carousel 191 and are movable with respect to the forming carousel 191, for example along a direction arranged substantially radially with respect to the forming carousel 191.

In particular, the forming carousel 191 comprises a number of moving elements that is the same as the number of moulds 23, a moving element corresponding to each mould 23. Each moving element can be shaped as an arm having at one end a gripping element arranged for grasping a dome 1.

During operation, each moving element removes a dome 1 from a conveying device and delivers the dome 1 to a corresponding mould 23, before, or after, a dose 27 has been deposited in the mould 23.

Subsequently, the dose 27 is compression-moulded on the dome 1 to obtain a container neck element 10.

Still subsequently, the dome 1 on which the container neck element 10 was obtained is extracted from the mould 23 by a removal device and delivered to a further conveying device.

Alternatively, each moving element can remove from the mould 23 operationally associated therewith the dome 1 on which the container neck element 10 was obtained and deliver the dome 1 to the further delivering device.

Still alternatively, each moving element can remove from the mould 23 operationally associated therewith the dome 1 on which the container neck element 10 was obtained and move the dome 1 to a peripheral zone of the forming carousel 191 at which the dome 1 is collected by a removal device. In this way, the dome 1 can be removed from the forming carousel 191 more easily than is the case when it is extracted from the mould 23 directly by the removal device.

Figure 41:
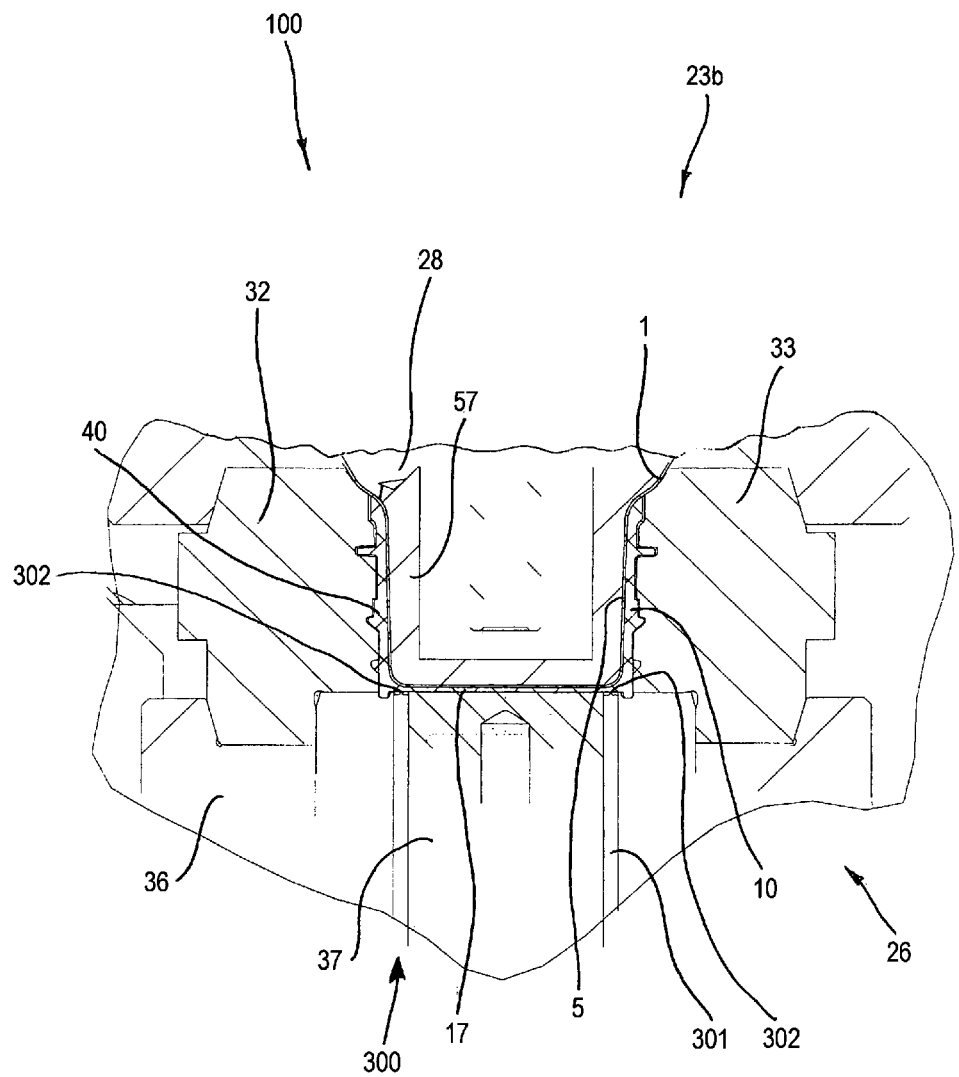
FIG. 41 is a longitudinal section of an embodiment of an apparatus for compression-moulding plastics on an object.

With reference to FIG. 41 there is shown an apparatus 100 comprising a mould 23b that constitutes a version of the mould 23 disclosed with reference to FIGS. 7 to 22.

The mould 23b is provided with a second mould part 26 comprising a weakening arrangement 300.

The weakening arrangement 300 comprises a tubular element 301 that surrounds the forming element 37 and is slidable with respect to the forming element 37. A movement promoting device is provided that moves the tubular element 301 with respect to the forming element 37.

The movement promoting device may comprise a hydraulic, or pneumatic, or electric actuator that moves the tubular element 301 towards or away from the supporting body 28.

Alternatively, the movement promoting device may comprise a hydraulic, or pneumatic, or electric actuator that moves the tubular element 301 towards the supporting body 28 and an elastic device that moves the tubular element away from the supporting body 28.

Still alternatively, the movement promoting device may comprise a hydraulic, or pneumatic, or electric actuator that moves the tubular element 301 towards the supporting body 28. The tubular element 301 is subsequently moved away from the supporting body—as far as a dead point condition—by a dose 27 inserted inside the apparatus 100 during a subsequent operating cycle.

The tubular element 301 is provided, at an end facing the compression-moulding die arrangement 25 and the second mould part 24, with a ridge 302 that deforms the plastics in a pasty state in the chamber 40 to make in the further end wall 17 a portion of reduced thickness, i.e. a portion having lesser thickness with respect to the thickness of a remaining part of the further end wall 17, this portion of reduced thickness defining the further line of intended separation 18, shown, for example, in FIG. 5.

In this way, it is possible to make the further line of intended separation 18 during the moulding step of the container neck element 10, in particular, whilst the dome 1 is still inside the mould 23b.

This enables the work cycle and the production system to be simplified, inasmuch as it is not necessary to provide a weakening station arranged downstream of the apparatus 100 in which an incision is made in the further end wall 17, in particular a non-through incision, to obtain the further line of intended separation 18.

Figure 42:
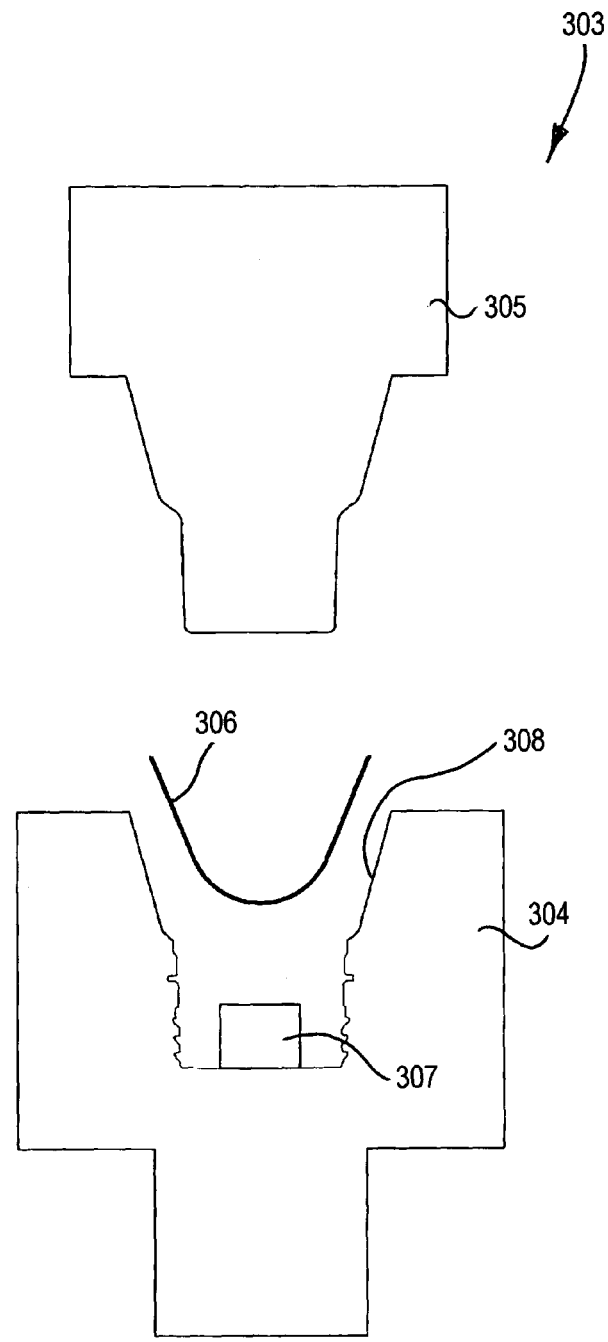
FIG. 42 is a longitudinal section of an apparatus for pressing together a sheet of plastics and a dose of plastics.

With reference to FIG. 42 a method is disclosed to obtain a dome 1 provided with a container neck element 10 in which there is provided simultaneously pressing, into a compression-moulding mould 303 provided with a female half mould 304 and with a male half mould 305 that are mutually movable towards and away from one another, a sheet of plastics 306 and a dose of plastics 307.

The sheet of plastics 306 may comprise at least a barrier layer to gases and/or to light. The sheet of plastics is not previously formed, for example by thermoforming, before being inserted into the compression-moulding mould 303.

The method provides depositing the dose of plastics 307 in a cavity 308 of the female half mould 304. Subsequently, there is provided inserting the sheet of plastics 306 into the cavity 308, or possibly interposing the sheet of plastics 306 between the female half mould 304 and the male half mould 305. Still subsequently, there is provided closing the compression-moulding mould 303 so that the female half mould 304 and the male half mould 305 cooperate to form the dome 1 and the container neck element 10.

According to a first embodiment of the method, the sheet of plastics 306 has a thickness that is equal to a final thickness of the dome 1 that has to be obtained. In this case, the dose of plastics 307 forms the container neck element 10.

According to a second embodiment of the method, the sheet of plastics 306 has a lesser thickness than a final thickness of the dome 1 that has to be obtained. In this case, the dose of plastics 307, in addition to forming the container neck element 10, forms a layer that covers, at least partially, an external surface of the dome 1.

Figure 43:
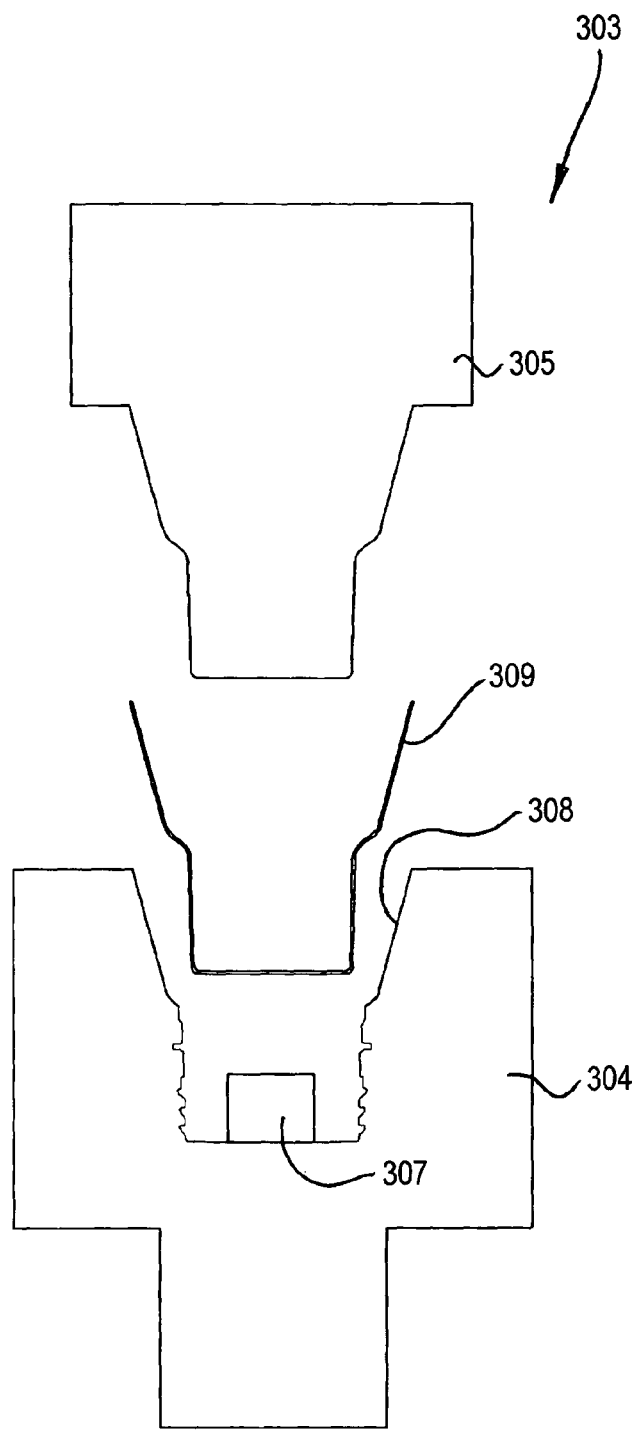
FIG. 43 is a longitudinal section of an apparatus for pressing together a sheet of plastics and a dose of plastics made according to a further version.

With reference to FIG. 43 a further method is disclosed to obtain a dome 1 provided with a container neck element 10 in which there is provided simultaneously pressing, in the compression-moulding mould 303 disclosed with reference to FIG. 42, a semifinished product made of plastics 309 and a dose of plastics 307.

The semifinished product made of plastics 309 is obtained by forming, for example by thermoforming, plastics. The semifinished product made of plastics 309 may comprise at least a barrier layer to gases and/or to light.

The semifinished product made of plastics 309 has a lesser thickness than a final thickness of the dome 1 that has to be obtained.

The method provides depositing the dose of plastics 307 in a cavity 308 of the female half mould 304. Subsequently, there is provided inserting the semifinished product made of plastics 309 into the cavity 308. Still subsequently, there is provided closing the compression-moulding mould 303 so that the female half mould 304 and the male half mould 305 cooperate to form the dome 1 and the container neck element 10. The dose of plastics 307, in addition to forming the container neck element 10, forms a layer that covers, at least partially, an external surface of the dome 1. In other words, part of the plastics that form the dose 307 is distributed on the semifinished product made of plastics 309 in such a way as to obtain a dome 1 provided with the container neck element 10 and having a final thickness of desired extent.

The methods disclosed with reference to FIGS. 42 and 43 can also be actuated by using a mould 23 disclosed with reference to FIGS. 7 to 22, or a mould 23a disclosed with reference to FIGS. 23 to 25, or a mould 123 disclosed with reference to FIGS. 28 to 37, or a mould 23b disclosed with reference to FIG. 41, or a mould 501 that will be disclosed below with reference to FIGS. 44 to 50, or a mould 501a that will be disclosed below with reference to FIGS. 51 to 53.

The doses of plastics that have to be compression-moulded on the dome 1 to obtain the container neck element 10—and possibly at least a portion of an external layer of the dome 1—can be obtained by grinding and heating wastes generated by production of the domes 1, or of the sheets of plastics 306, or of the semifinished products made of plastics 309. In particular, it is possible to thermoform portions of a sheet material to obtain the domes 1, or the semifinished products made of plastics 309, and subsequently separate the domes 1, or the semifinished products made of plastics 309, from further portions of the sheet material that have not been subjected to thermoforming.

This enables a considerable economic benefit to be obtained inasmuch as the aforesaid wastes—for example the portions of sheet material that have not been subjected to thermoforming and which should be scrapped—can be recycled completely. The barrier material to gases and/or to light, if present, does not adversely affect the possibility that the wastes is used to make the container neck element 10, or part of the dome 1, in the manner disclosed above.

With reference to FIGS. 44 to 50 there is shown an apparatus 500 for compression-moulding plastics on objects, in particular an apparatus for compression-moulding a container neck element 10—provided with a threaded portion 11—on a dome 1.

The apparatus 500 comprises a mould 501 provided with a male half mould 502 and with a female half mould 503, which are movable towards and away from one another along a moving direction D1, and with a supporting and retaining arrangement 504 arranged for supporting a dome 1 and for maintaining the dome 1 coupled with a punch 518 of the male half mould 502.

The male half mould 502, the supporting and retaining arrangement 504 and the female half mould 503 are aligned along the moving direction D1, the supporting and retaining arrangement 504 being interposed between the male half mould 502 and the female half mould 503.

The punch 518 is shaped in such a way as to engage a hollow zone 506 of the dome 1. The female half mould 503 comprises a plurality of female mould portions 505 that are movable between a forming configuration A1, shown in FIGS. 45 to 49, in which the female mould portions 505 define a mould cavity 517 that receives a dose of plastics 507 and forms the dose of plastics 507, and a release configuration A2, shown in FIGS. 44 and 50, in which the female mould portions 505 enable a dome 1 to be removed on which the dose 507 was compression-moulded to obtain a container neck element 10.

The apparatus 500 comprises an actuating device 508 arranged for moving the female mould portions 505 from the forming configuration A1 to the release configuration A2, and vice versa.

The female mould portions 505 can comprise a first half mould 509 and a second half mould 510 hinged on a supporting element 511.

Figure 44:
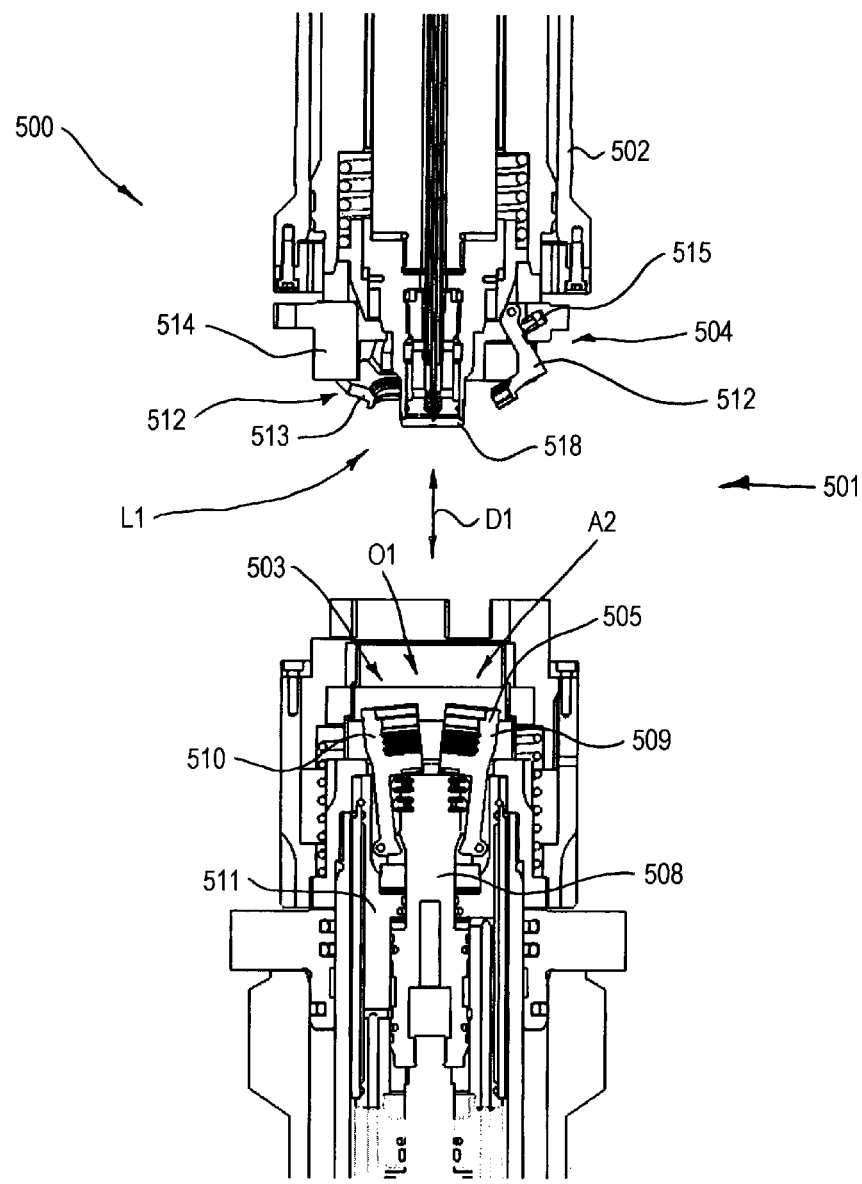
FIGS. 44 to 50 are schematic longitudinal sections of a further embodiment of an apparatus for compression-moulding plastics on an object showing subsequent steps of an operating cycle of the apparatus.
Figure 45:
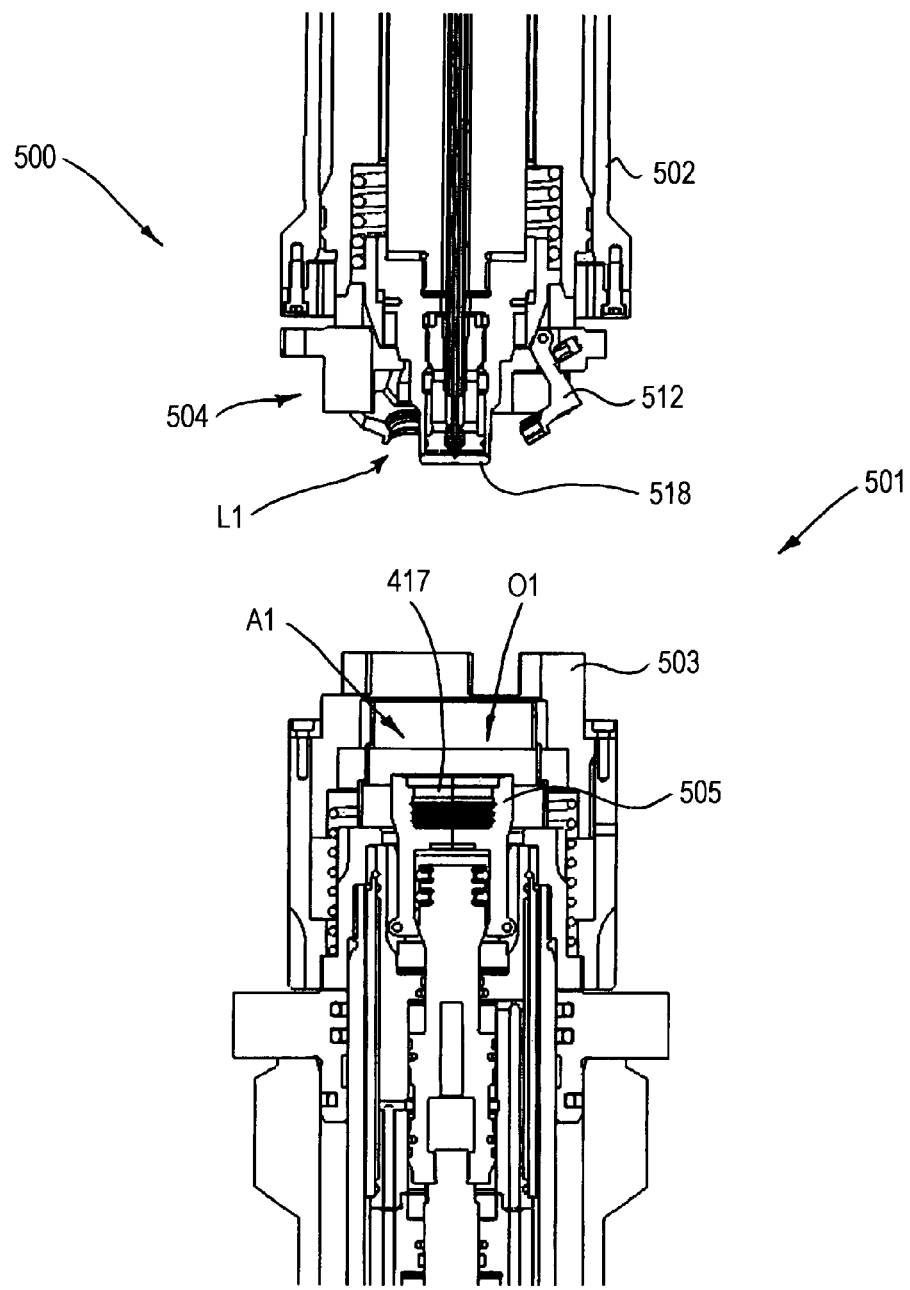
Figure 46:
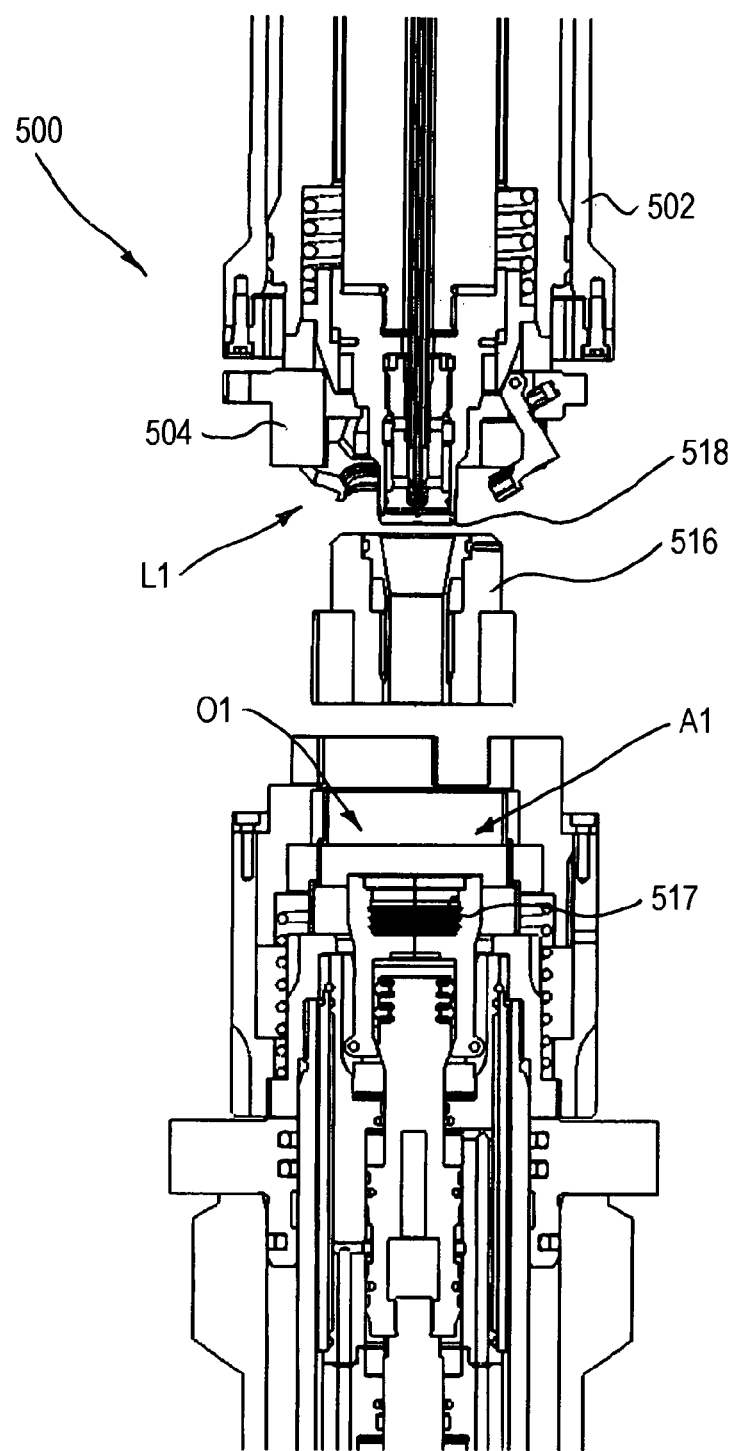

The supporting and retaining arrangement 504 comprises a plurality of supporting and retaining elements 512 that are movable between an open position L1, shown in FIGS. 44 to 46, in which the supporting and retaining elements 512 enable a dome 1 to be removed from the punch 518, and a closed position L2, shown in FIGS. 47 to 50, in which the supporting and retaining portions 512 lock a dome 1 on the punch 518.

The apparatus 1 comprises a driving arrangement 515 arranged for moving the supporting and retaining elements 512 from the open position L1 to the closed position L2.

The supporting and retaining elements 512 may comprise a plurality of angular sectors 513 hinged on a supporting body 514.

A work cycle of the apparatus 500 is disclosed with reference to FIGS. 44 to 50.

In FIG. 44 there is shown a work cycle step in which a dome 1 on which a container neck element 10 has been formed has been extracted from the mould 501. The female half mould 503 is distant from the male half mould 502, the female mould portions 505 are in the release configuration A2 and the supporting and retaining elements 512 are in the open position L1.

In subsequent work cycle steps, shown in FIGS. 45 and 46, the actuating device 508 moves the female mould portions 505 from the release configuration A2 to the forming configuration A1. A transferring element 516 deposits a dose 507 inside the mould cavity 517.

Figure 47:
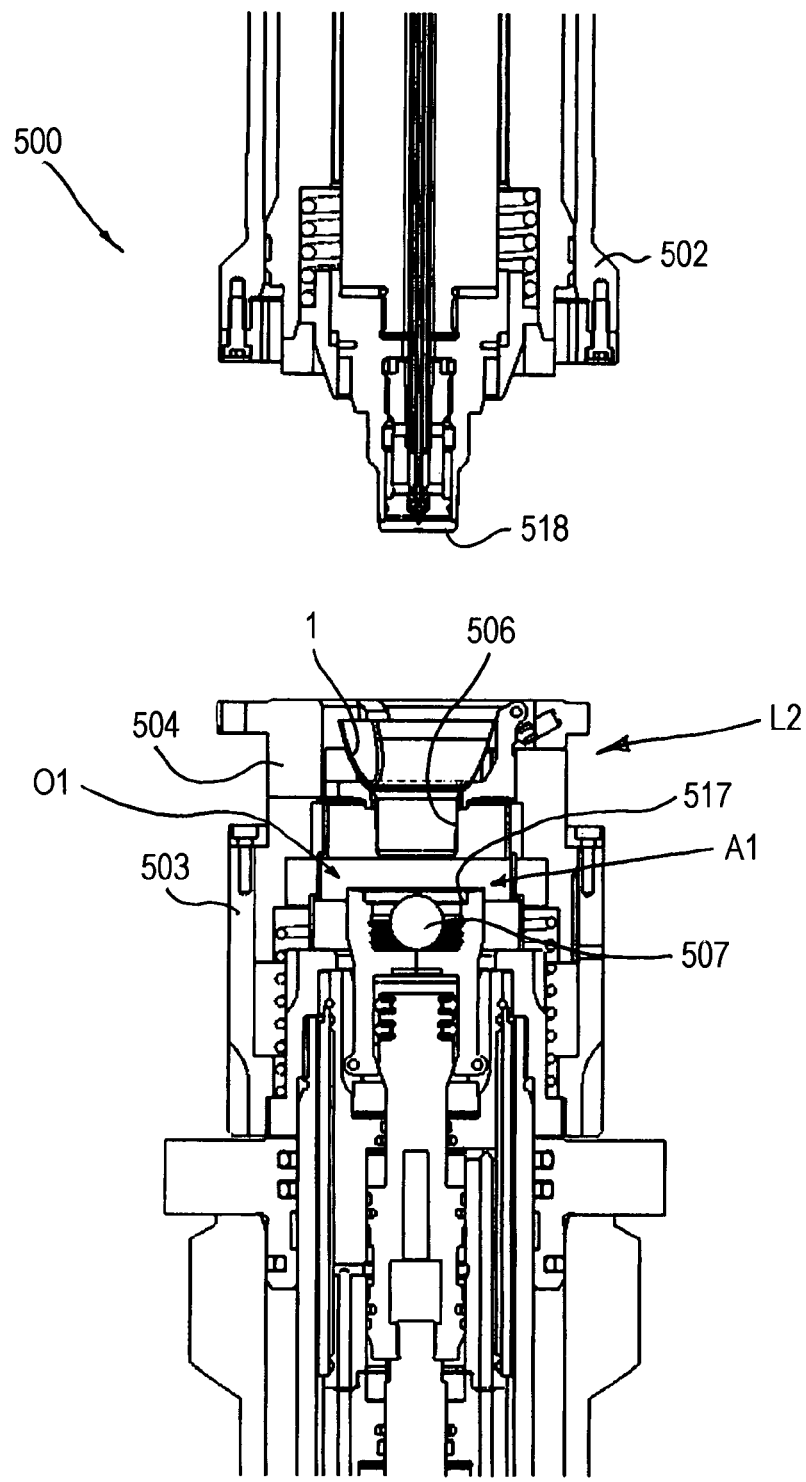

Subsequently, as shown in FIG. 47, the driving arrangement 515 moves the supporting and retaining elements 512 from the open position L1 to the closed position L2 and a dome 1 is delivered to the supporting and retaining arrangement 504 by a distributing device that is not shown.

The supporting and retaining arrangement 504 moves along the moving direction D1 until it comes to abut on an upper zone of the female half mould 503.

Figure 48:
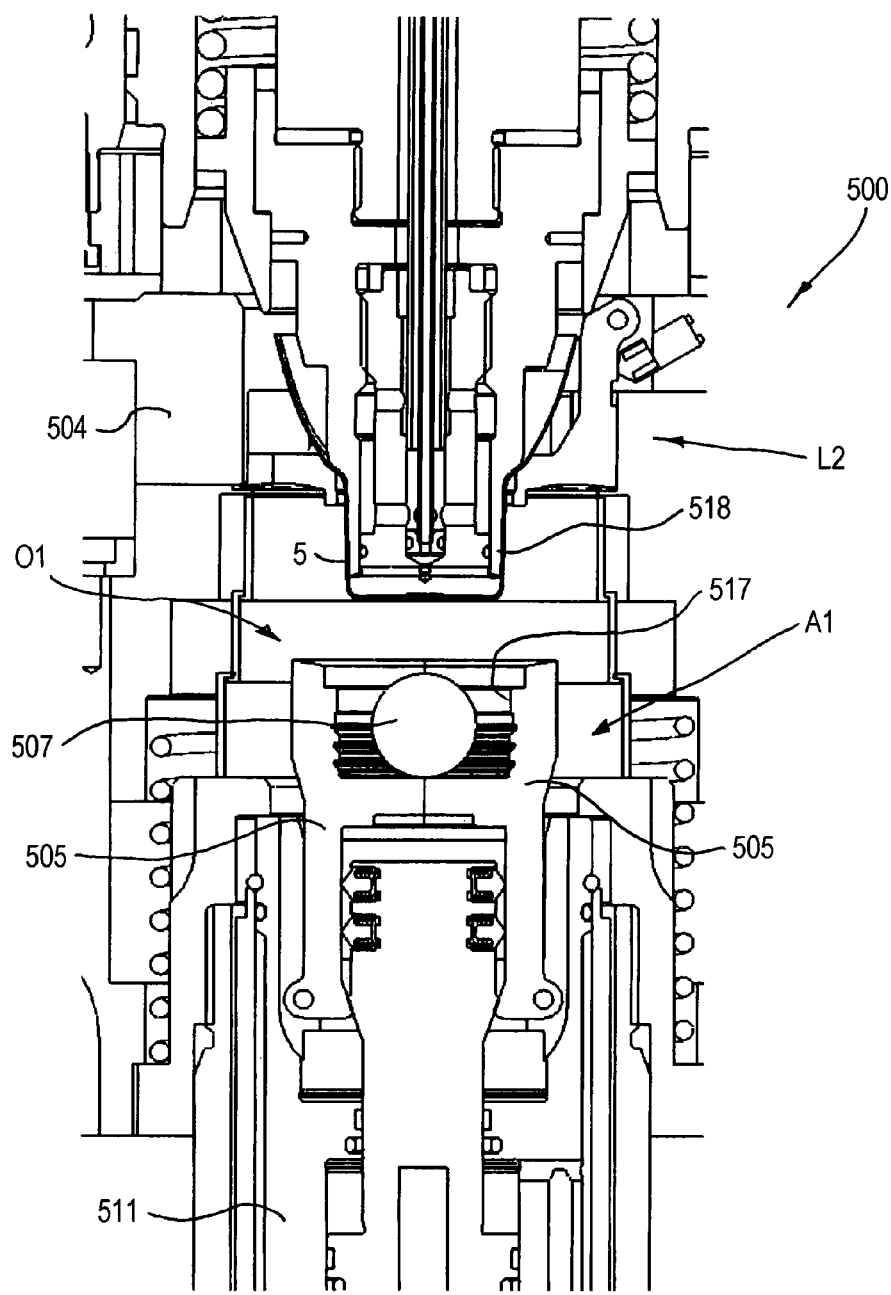

In a subsequent work cycle step, shown in FIG. 48, the female half mould—and the supporting and retaining arrangement 504—are moved towards the male half mould 502 until the punch 518 penetrates inside the hollow zone 506 and the supporting and retaining arrangement 504 clamps the dome 1 against the punch 518.

In particular, the punch 518 can be shaped so as to engage an inner wall of the dispensing body 5 in a shapingly coupled manner.

Figure 49:
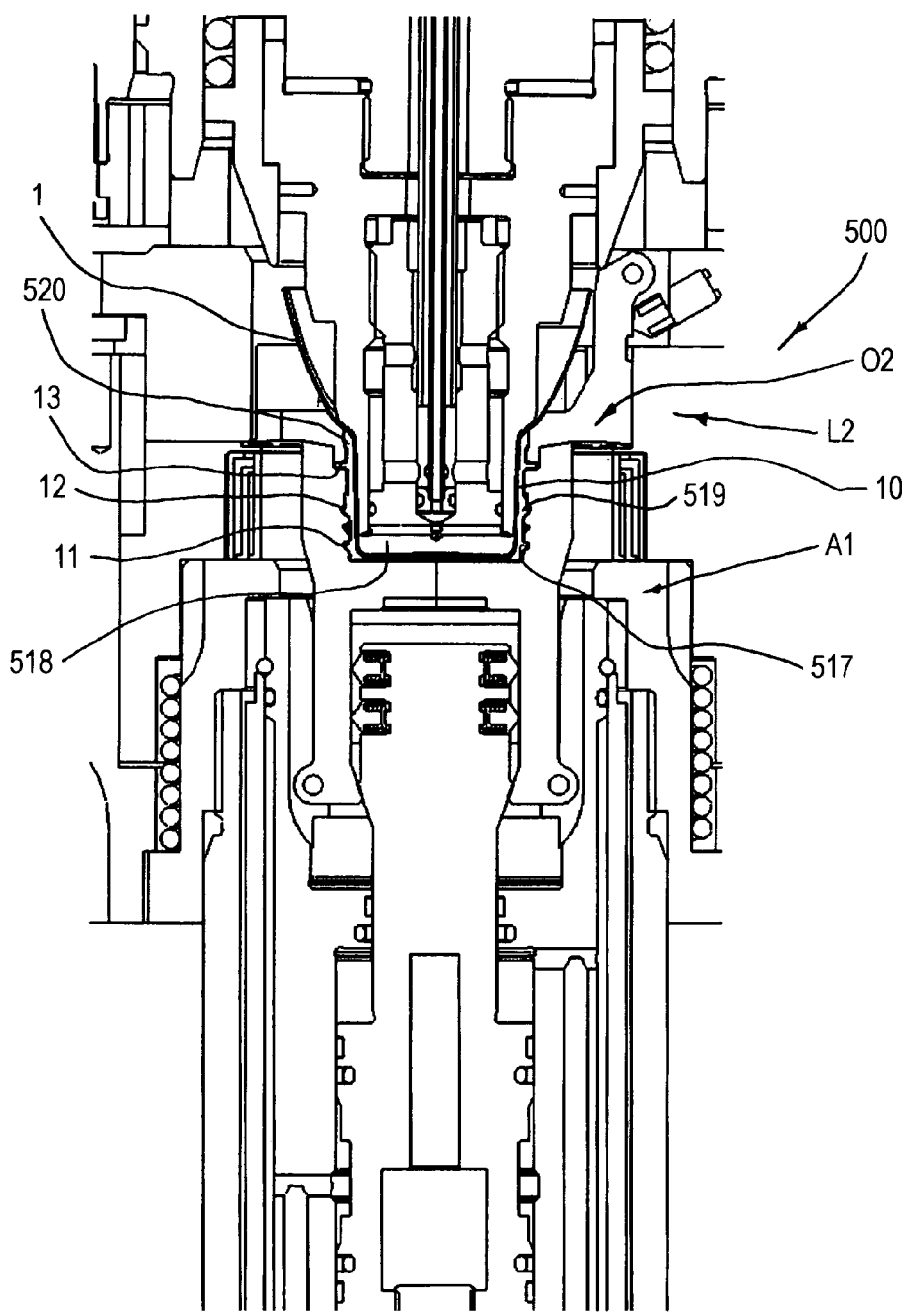
Figure 50:
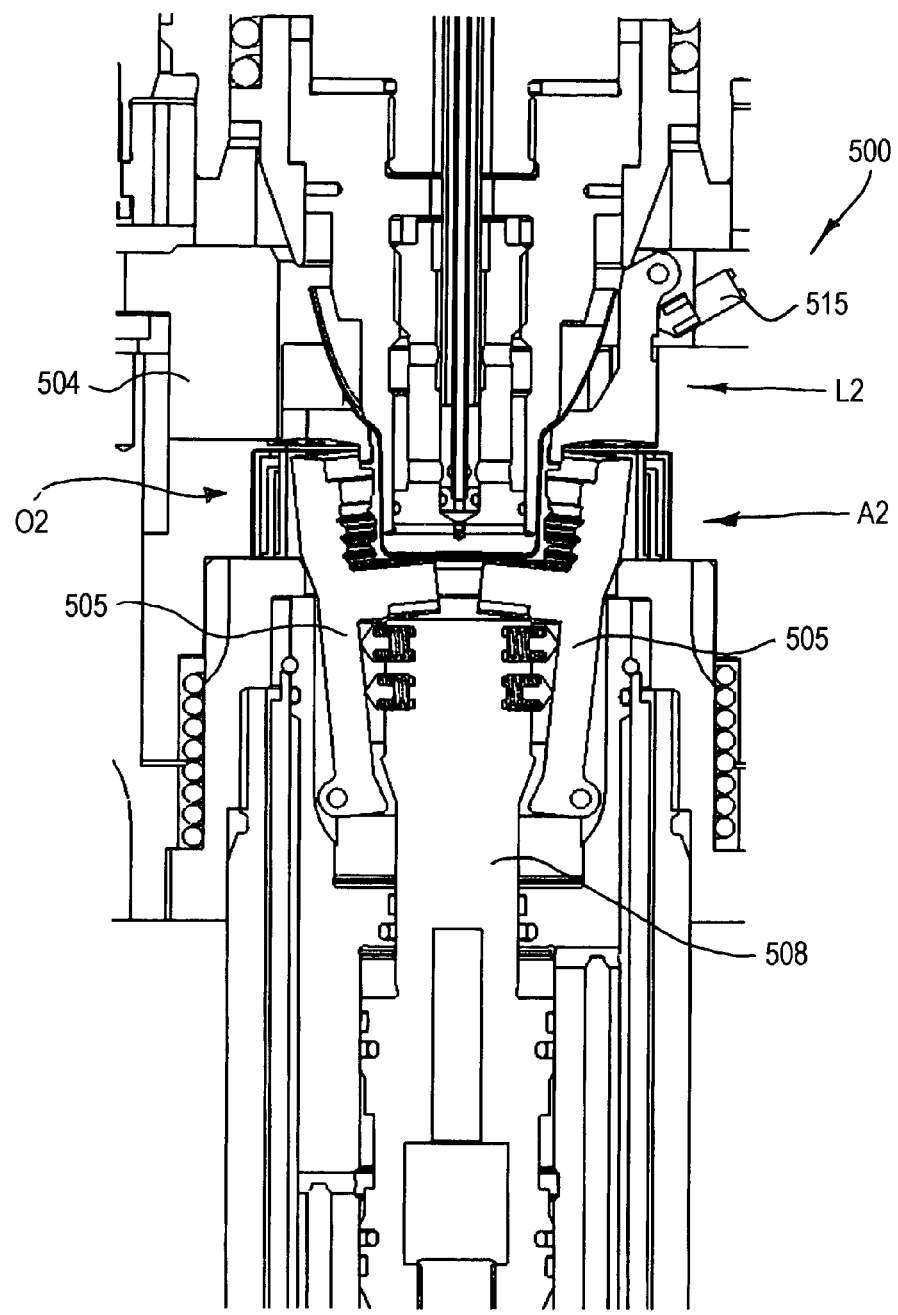

Still subsequently, as shown in FIG. 49, the mould cavity 517 is moved from a lowered position O1, shown in FIGS. 44 to 48, in which the mould cavity 517 is far from the punch 518, to a raised position O2, shown in FIGS. 49 and 50, in which the punch 518, and the dome 1 adhering thereto, are received inside the mould cavity 517.

The mould cavity 517, the supporting and retaining arrangement 504 and the punch 518 cooperate to define a moulding chamber 519 that receives the dispensing body 5 and inside which the dose 507 is pressed to assume the shape of the container neck element 10.

In particular, the mould cavity 517 cooperates with the punch 518 to define a prevalent portion of the moulding chamber 519 that forms the further end wall 17, if present, the threaded portion 11, and the bead 12 and a part of the annular ridge 13 of the container neck element 10. The mould cavity 517 cooperates with the supporting and retaining arrangement 504 to define a remaining portion of the moulding chamber 519 that forms a further part of the annular ridge 13 and an end zone 520 of the container neck element 10. In a subsequent work cycle step, shown in FIG. 50, the actuating device moves the female mould portions 505 from the forming configuration A1 to the release configuration A2.

Subsequently, the female half mould 503 is moved away from the male half mould 502, whilst the supporting and retaining elements 512—which are in the closed position L2—continue to maintain the dome 1 in contact with the punch 518.

Still subsequently, the driving arrangement 515 moves the supporting and retaining elements 512 from the closed position L2 to the open position L1 so that the dome 1 on which the container neck element 10 was obtained can be removed from the punch 518. With reference to FIGS. 51 to 53 there is shown an apparatus 500a provided with a mould 501a that differs from the mould shown in FIGS. 44 to 50 by the fact that the female half mould 503 comprises a single portion of female mould 505a that defines the mould cavity 517, rather than a plurality of female mould portions 505.

The mould 501a differs from the mould shown in FIGS. 44 to 50 also through the fact that the supporting and retaining arrangement 504 comprises a single supporting and retaining element 512a, shaped as a tubular body, rather than a plurality of supporting and retaining elements 512.

In an embodiment that is not shown the supporting and retaining arrangement 504 comprises a plurality of supporting and retaining elements.

A work cycle of the apparatus 500a comprises a plurality of steps similar to those disclosed with reference to FIGS. 44 to 50.

Below, with reference to FIGS. 51 to 53, there are thus disclosed only some of the steps of the aforesaid work cycle.

Figure 51:
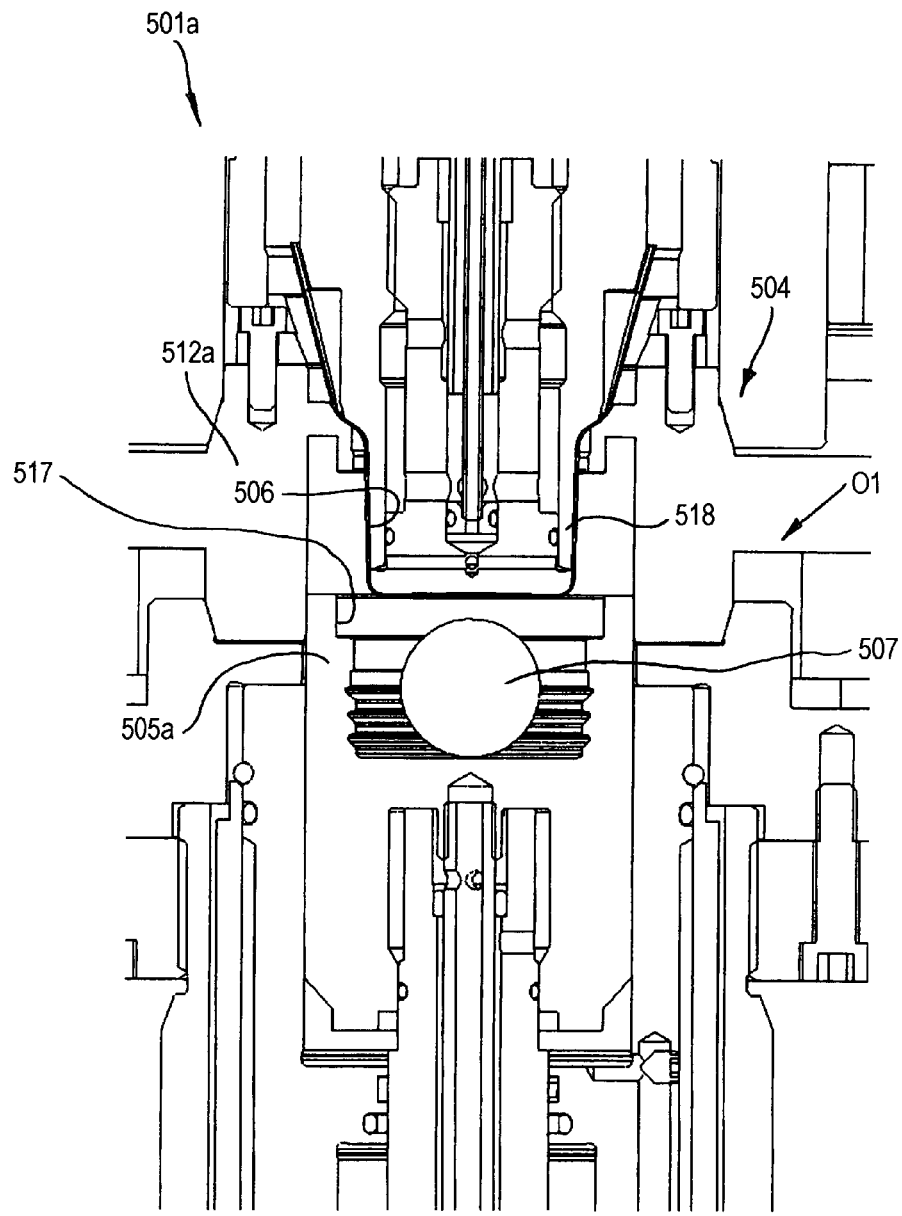
FIGS. 51 to 53 are schematic longitudinal sections of a still further embodiment of an apparatus for compression-moulding plastics on an object showing subsequent steps of an operating cycle of the apparatus.

In FIG. 51 there is shown a work cycle step in which the mould cavity 517 that contains the dose of plastics 507 is in the lowered position O1. The punch is received inside the hollow zone 506 and the supporting and retaining arrangement 504 clamps the dome 1 against the punch 518.

Figure 52:
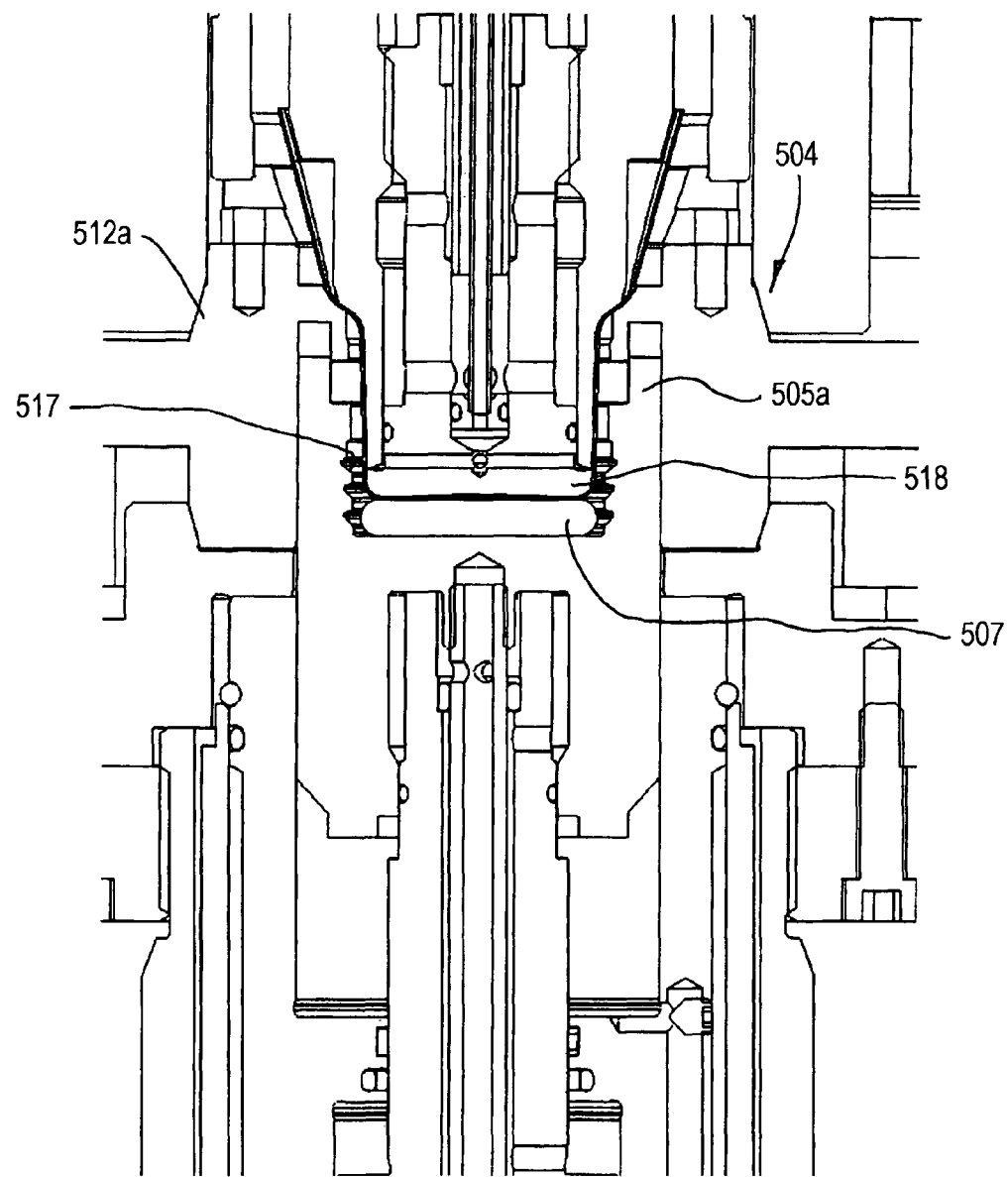

In the work cycle step shown in FIG. 52, the mould cavity 517 is moved from the lowered position O1 towards the raised position O2. The dose of plastics 507 starts to be pressed between the punch 518 and the mould cavity 517.

Figure 53:
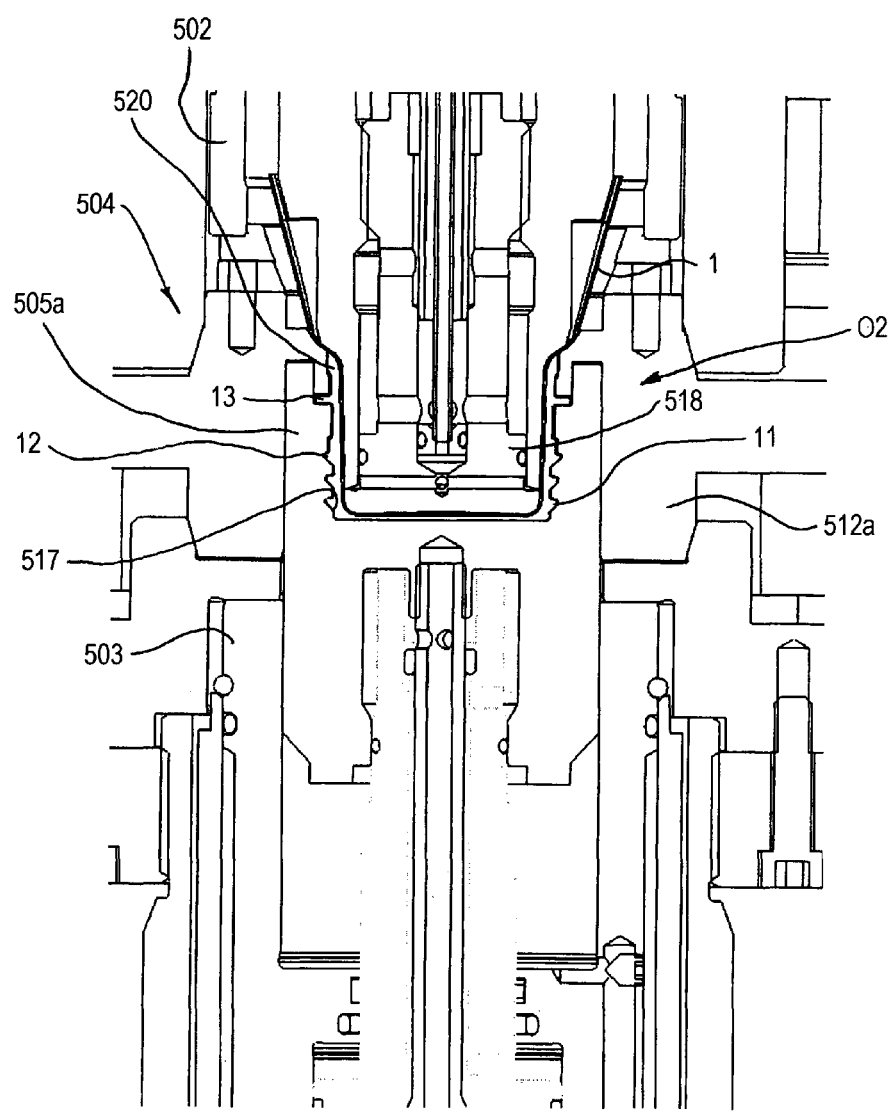
Figure 54:
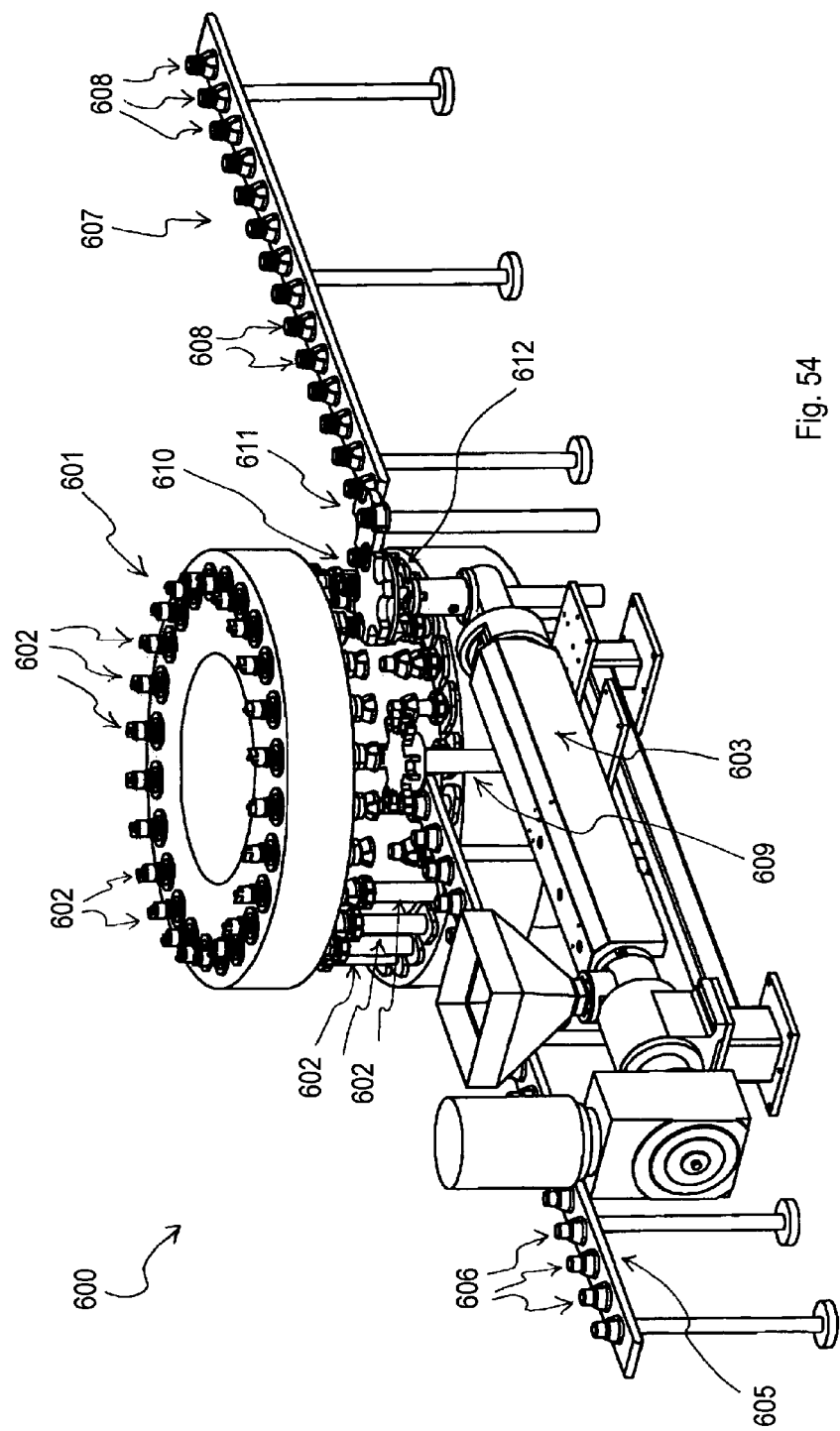
FIG. 54 is a view of still another embodiment of the machine for compression-moulding plastics on objects.
Figure 55:
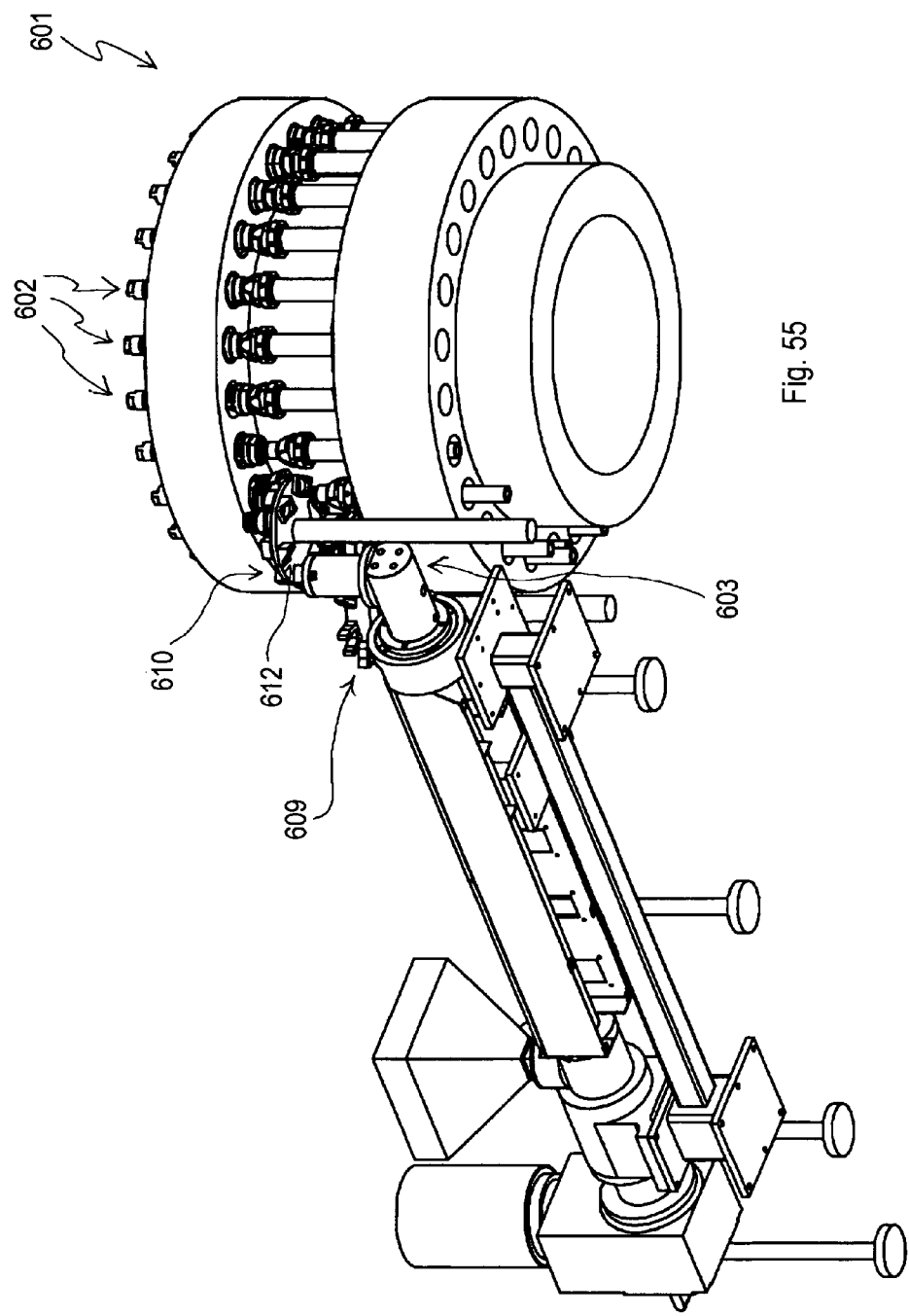
FIG. 55 is a partial bottom view of the machine in FIG. 54.
Figure 56:
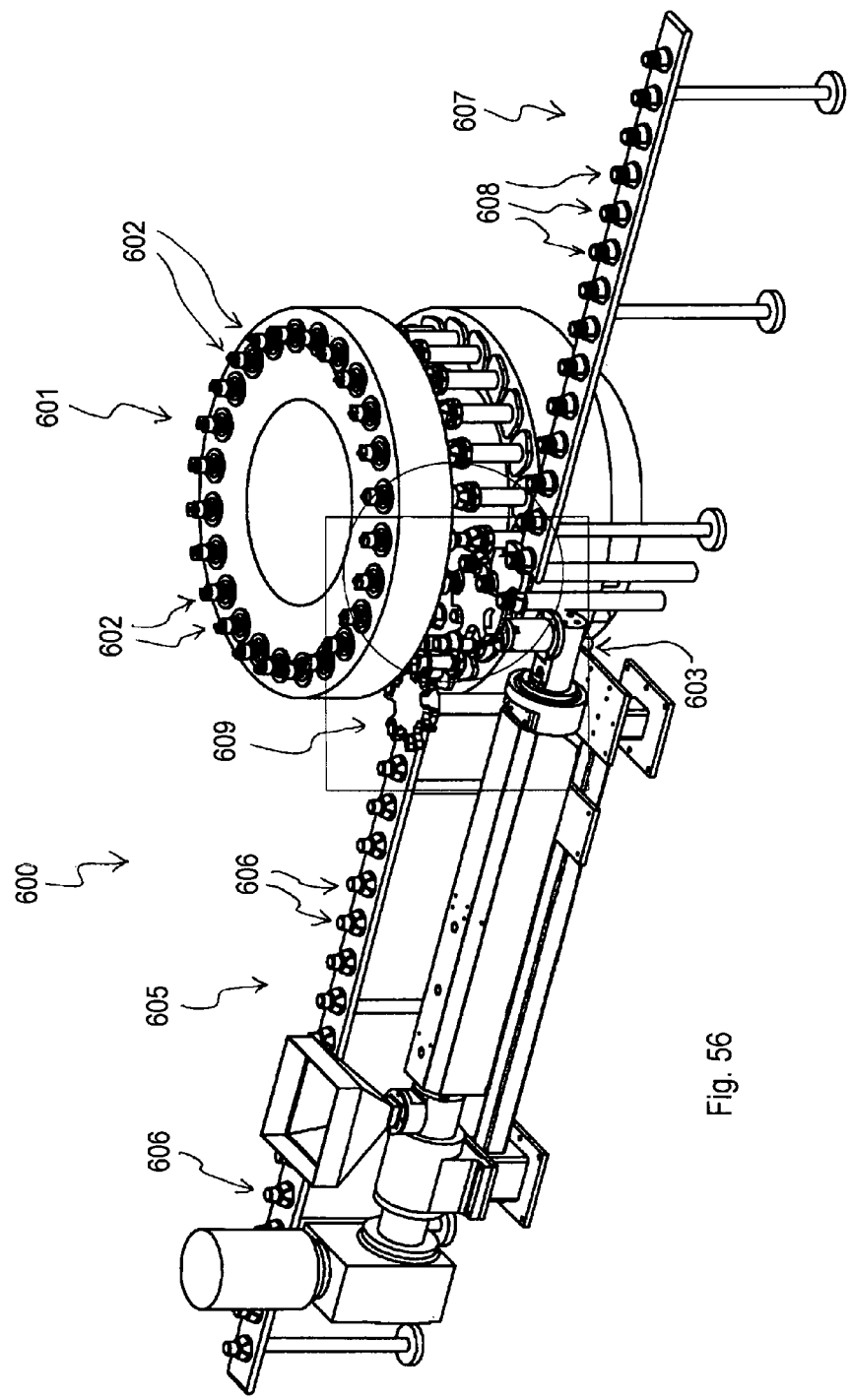
FIG. 56 is a view of the machine in FIG. 54 from another perspective.
Figure 57:
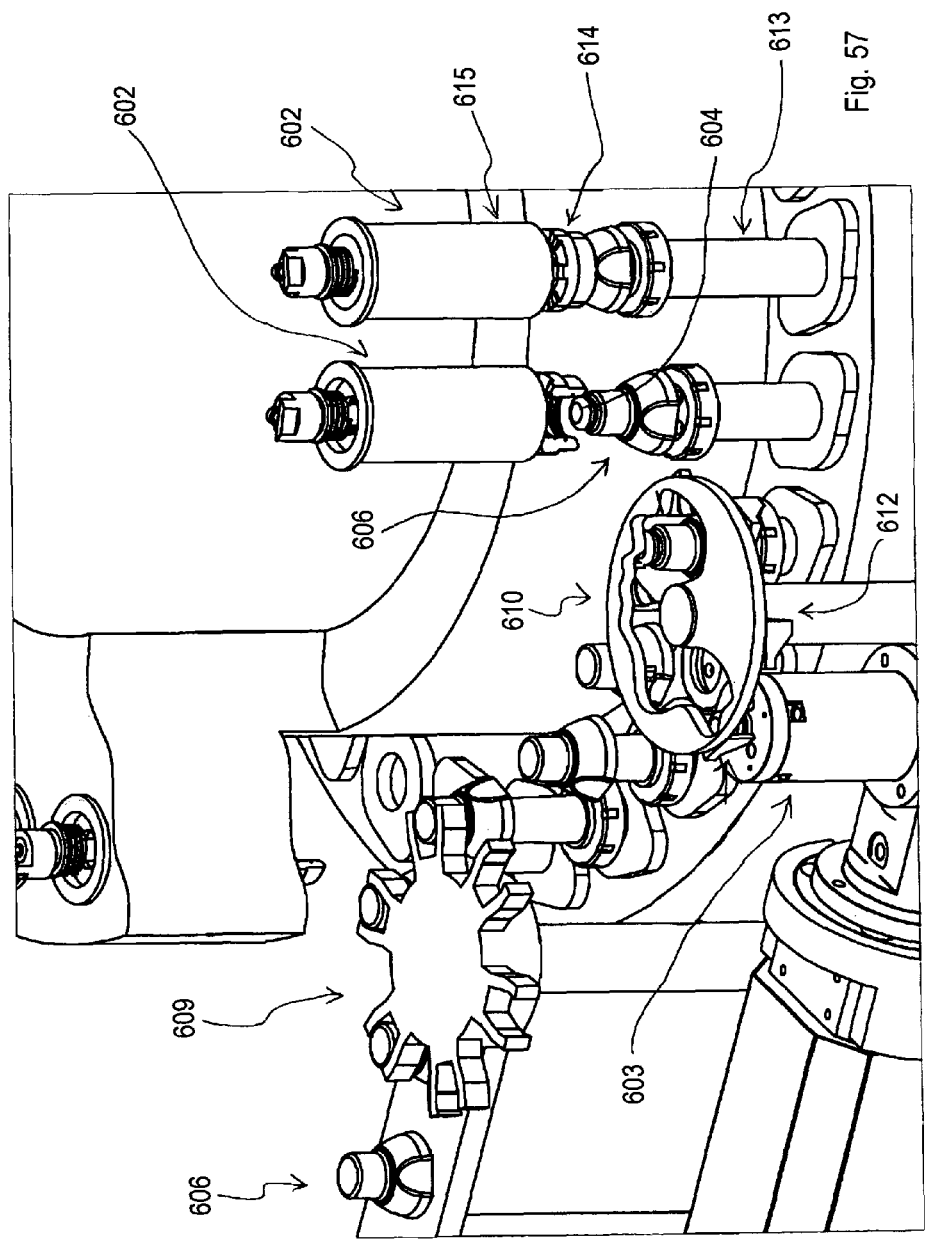
FIG. 57 is an enlarged detail of FIG. 56.
Figure 58:
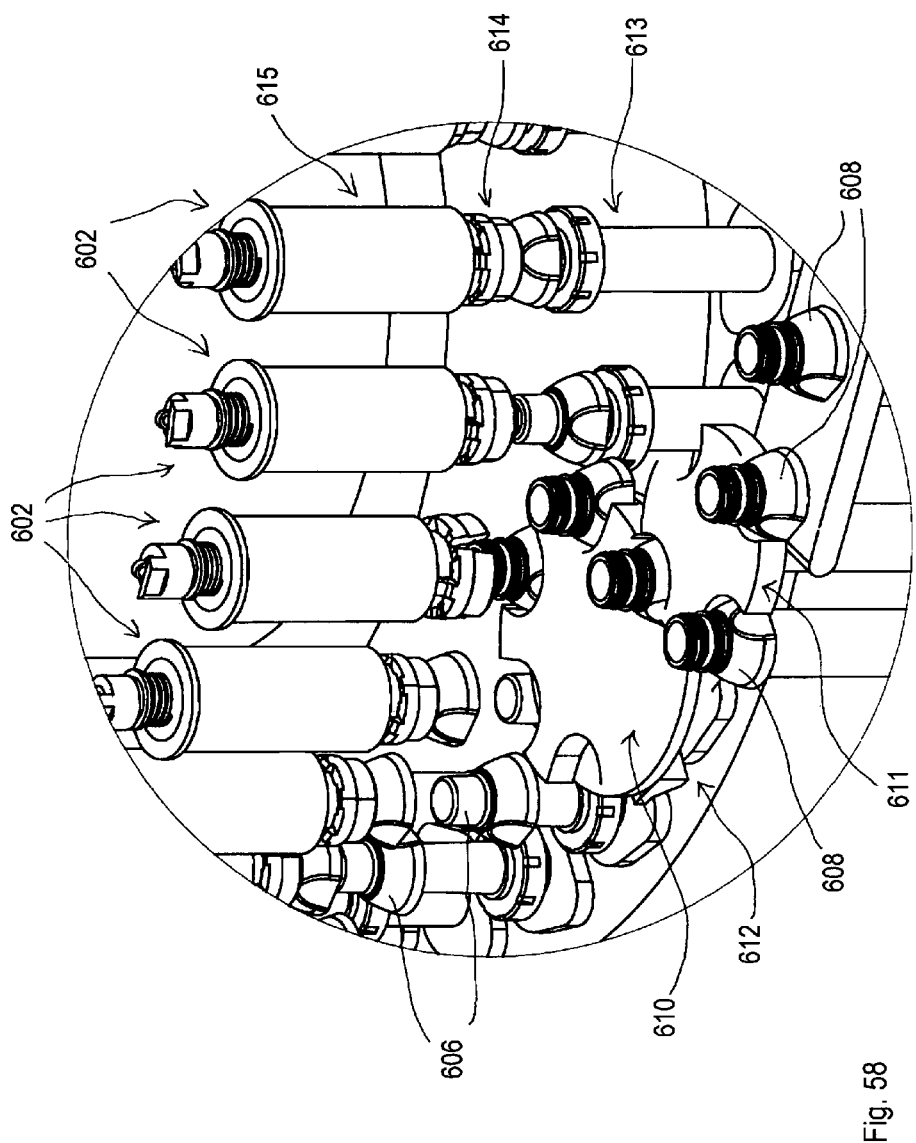
FIG. 58 is another detail of FIG. 56.

In a subsequent work cycle step, shown in FIG. 53, the mould cavity 517 has reached the raised position O2 and the dose of plastics has been shaped so as to form the container neck element 10 on the dome 1.

Subsequently, the female half mould 503 is moved away from the male half mould 502. The container neck element 10—in particular the threaded portion 11 and the annular bead 12—are forced to exit the mould cavity 517. The container neck element 10—in particular the threaded portion 11 and the annular bead 12—undergo a limited elastic deformation that enables the container neck element 10 to be extracted from the mould cavity 517.

As part of the annular ridge 13 is formed by the supporting and retaining arrangement 504—together with the mould cavity 517—the annular ridge 13 does not constitute an undercut element that prevents the container neck element 10 from being extracted from the mould cavity 517.

With reference to FIGS. 54 to 58, there is illustrated a machine 600 for compression-moulding plastics on objects comprising a rotatable forming carousel 601 that supports a plurality of moulding apparatuses 602 mounted in a peripheral zone of the rotatable forming carousel 601.

The moulding apparatuses 602 are positioned at substantially constant angular intervals on the forming carousel 601. Each moulding apparatus 602 operates with a work cycle that is repeated at each revolution of the forming carousel 601.

An extruder 603 is arranged for dispensing a continuous flow of plastics in pasty state from which doses 604 of plastics are taken that are supplied, one after another, to the forming carousel 601.

A supplying conveyor 605 is arranged for conveying to the forming carousel 601a series of domes 606, arranged one after another, on each of which a container neck element will be compression-moulded. A removing conveyor 607 is arranged for removing from the forming carousel 601a series of overmoulded domes 608, arranged one after another, on each of which a container neck element has been compression-moulded.

A first transferring carousel 609 is arranged for transferring each dome 606 from an outlet end of the supplying conveyor 605 to a respective moulding apparatus 602.

A second transferring carousel 610 is arranged for transferring each overmoulded dome 608 from a respective moulding apparatus 602 to an inlet end of the removing conveyor 607.

A third transferring carousel 611 can be interposed, as in the illustrated example, between the second transferring carousel 610 and the inlet end of the removing conveyor 607 to transfer the overmoulded domes 608.

A lower part 612 of the second transferring carousel 610 is configured for periodically removing a dose 604 of plastics from the extruder 603 and transferring the dose 604 to a respective moulding apparatus 602.

Each of the aforesaid transferring carousels 609, 610 and 611 has a substantially known structure and operating mode and therefore such carousels will not be disclosed in greater detail.

In FIGS. 59 to 62 there is illustrated the operation of a single moulding apparatus 602. Each moulding apparatus 602 has a first mould part 613 arranged for receiving a dome 606 with the concavity of the dome 606 facing downwards, a die arrangement 614 for defining at least a part of a cavity for compression-moulding an overmoulded element on the dome 606, and a second mould part 615 that cooperates with the first mould part 613 and the die arrangement 614 for compression-moulding the overmoulded element. The die arrangement 614 is optionally configured, as in the illustrated example, to define a threaded part of the overmoulded element.

The second transferring carousel 610 is configured to deposit each dose 604 above a respective dome 606 carried by the first mould part 613 that is arranged below the second mould part 615. The dose 604 made of plastics in pasty state can adhere to the upper wall of the dome 606 and thus move integrally therewith.

The die arrangement 614 comprises two or more die elements 616 mounted on the second mould part 615. The die elements 616 can be coupled with the second mould part 615 with the possibility of assuming an open configuration (or delivery/release configuration shown in FIGS. 61 and 65) in which the die elements 616 facilitate the insertion and the removal of the first mould part 613 inside the die arrangement 614, and a closed configuration (or forming configuration shown in FIGS. 59, 60, 62 and 63, 64, 66) in which the die elements 616 define at least partially the aforesaid forming cavity, with the possibility of retaining in position the overmoulded dome 608 even when the first (lower) mould part 613 is far from the second (upper) mould part 615 and from the die arrangement 614. In the specific example, each of the die elements 616 is coupled with the second mould part 615 by a rotating pivot connection with the possibility of opening and closing (enlarging and tightening) around the first mould part 613. The die elements 616, in the specific case, are three, arranged angularly at 120° around a (vertical) axis of reciprocal movement between the first and the second mould part 613 and 615.

The second (upper) mould part 615 has a punch element 617 that is axially movable for compression-moulding the dose 604, i.e. the overmoulding on the dome 606 to obtain the overmoulded dome 608.

An operating sequence of a single moulding apparatus 602 of the forming carousel 601 shown in FIGS. 59 to 62 (enlarged in FIGS. 63 to 66) will now be disclosed in greater detail.

Figures 59, 60:
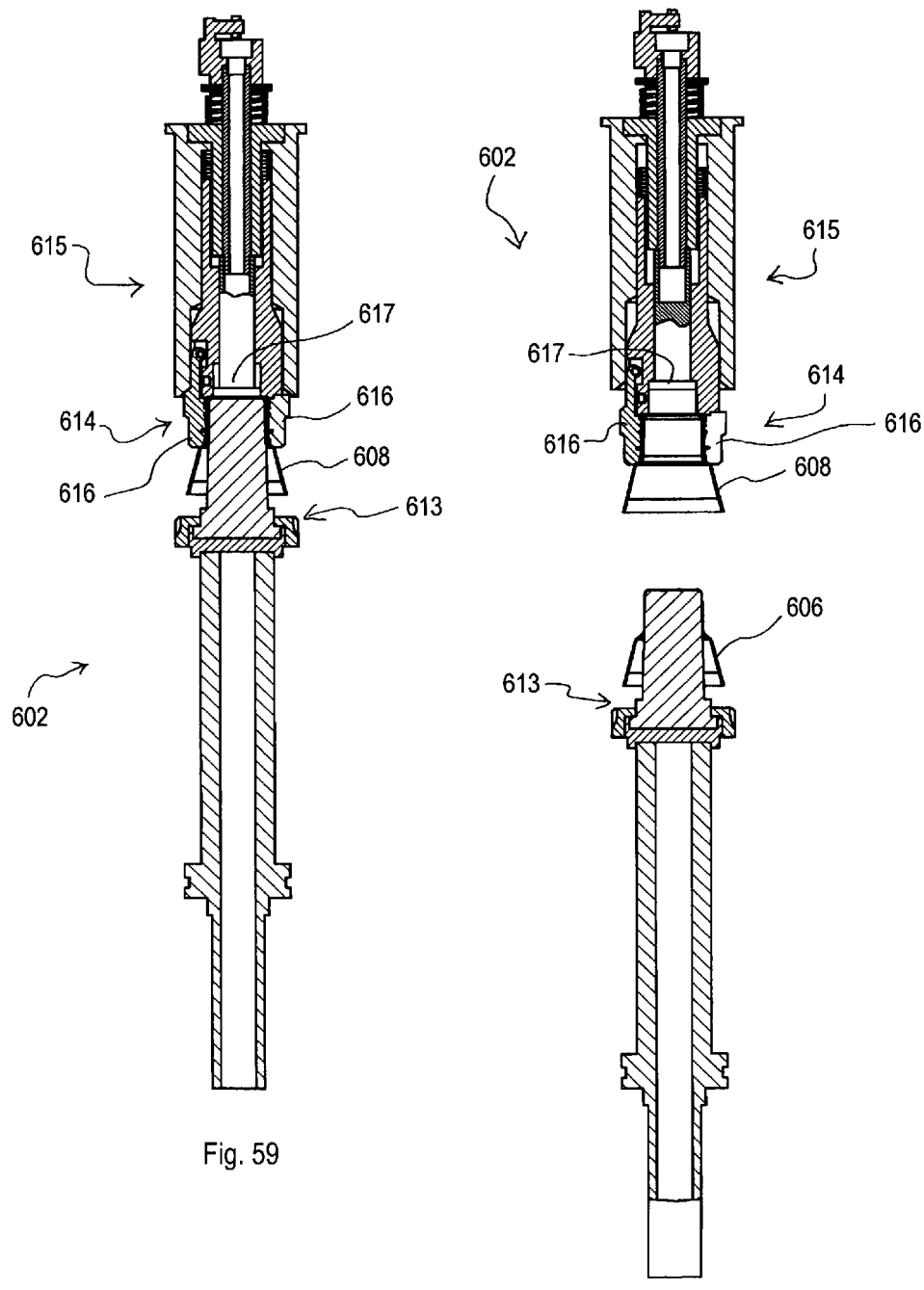
Figure 63:
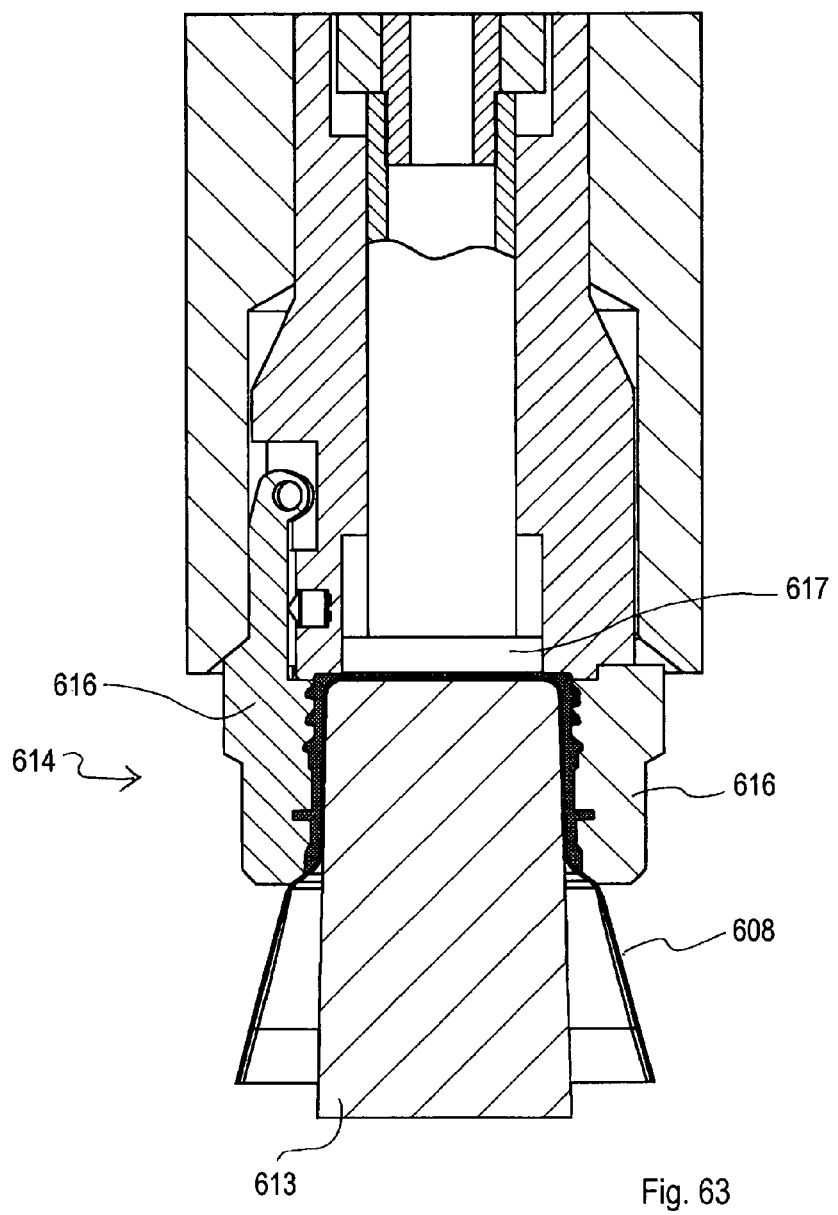
Figure 66:
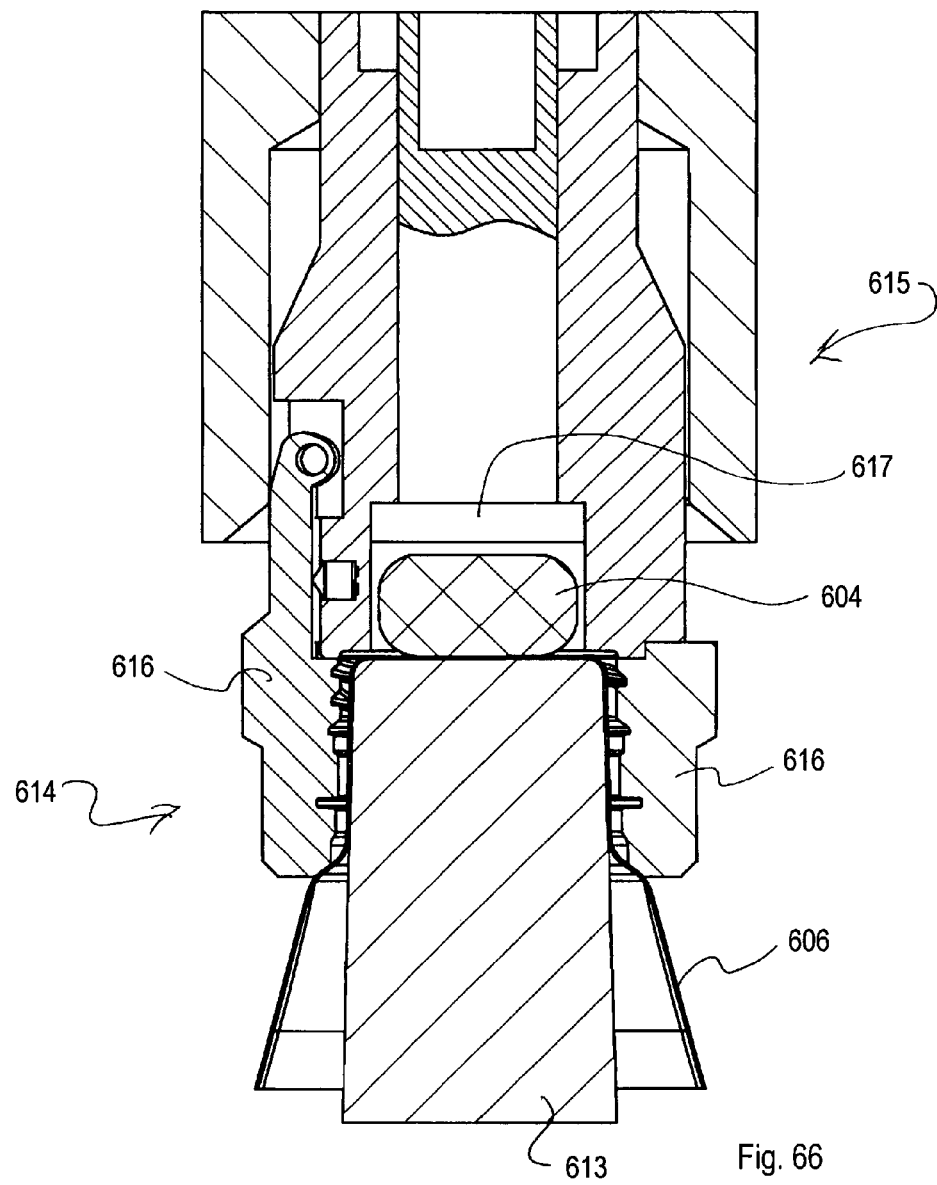

FIG. 59 (or FIG. 63) shows the compression-moulding step in which the dose 604 was formed in the forming cavity to make the overmoulded dome 608. The punch element 617 is in a (lowered) forming position, the die arrangement 614 is in the (closed) forming configuration and the first mould part 613 is in a (raised) forming position.

In FIG. 60 (or in FIG. 64) there is shown a subsequent step in which an overmoulded dome 608 is retained by the die arrangement 614 carried by the second (upper) mould part 615 whilst the first mould part 613 is lowered and has received a dome 606 from the first transferring carousel 609. The die arrangement 614 is still in the (closed) forming configuration in which it retains the overmoulded dome 608. The distance (in the reciprocal movement direction of the mould parts 613 and 615 that in the specific case is the vertical direction) between the first (lower) mould part 613 and the second (upper) mould part 615 bearing the die arrangement 614 is such as to generate an empty space in which the first transferring carousel 609 can act to position a dome 606 to be overmoulded on the first mould part 613 (whilst the already overmoulded dome 608 is still associated with the second mould part 615 of the moulding apparatus 602). FIG. 61 (or FIG. 65) shows a subsequent step in which a lower part 612 of the second transferring carousel 610 (not shown for the sake of greater clarity in FIG. 61) has laid a dose 604 on the dome 606 that is carried by the first mould part 613 whilst an upper part of the second transferring carousel 610 has further received (shortly before, a little after or almost simultaneously to the placing of the dose 604) the overmoulded dome 608 released by the second mould part 615 (the release being achieved through the fact that the die arrangement 614 has assumed the open configuration).

FIG. 62 (or FIG. 66) lastly shows a step that prepares and precedes compression-moulding, in which the first and the second mould part 613 and 615 have move towards one another (for example by raising of the first mould part 613) and the die arrangement 614 has moved to the closed configuration defining the forming cavity (the die elements 616 being closed after the dome 606 that bears the dose 604 has been taken to the forming configuration). It should be noted that the dose 604 is in a resting relation but also in an adhering relation to the dome 606. The adhesion ensures movement of the dose 604 integrally with the dome 606 from the moment of placing the dose on the dome (FIG. 61) to the moment preceding actual forming (FIG. 62) in which the punch element 617 is ready to be lowered and to compress the dose 604. The adhesion effect is due to the pasty state of the plastics with which the dose 604 is made.

The moulding apparatus 602 illustrated in the example in FIGS. 54 to 66 could be provided with a first mould part and/or with a die arrangement and/or with a second mould part as in one or more of the examples of moulding apparatuses shown previously (such as, for example, in the apparatus shown in FIGS. 28 to 37, with the die arrangement controlled according to the method disclosed with reference to FIGS. 59 to 66).

The invention claimed is:

1. A molding method, comprising the steps of
(a) delivering an object to a first mold portion, wherein said object comprises a container portion provided with a dispensing element and said container portion comprises a dome including a connecting region for connection with a container body and from which said dispensing element extends, said object including a concave portion and being delivered to said first mold portion with its concave portion facing downwardly;

(b) placing a dose of plastics material on said object which has been delivered to said first mold portion, said dose placing step including removing said dose from a continuous flow of plastics material in a pasty state dispensed from an extruder and transferring said dose on said object while in the pasty state;
(c) moving said first mold portion bearing said object and a second mold portion toward each other, said dose adhering to said object;
(d) at least partially surrounding said object with a die so that said second mold portion and said die define a cavity around said object; and
(e) compression-molding said dose around said object in said cavity to form said dose into a container neck element on said dispensing element, said container neck element including a threaded portion.

2. A molding method as defined in claim 1, wherein after said dose placing step, said first mold portion and said die are moved toward each other.

3. A molding method as defined in claim 1, wherein said die is arranged above said object during said dose placing step.

4. A method as defined in claim 1, wherein said second mold portion is arranged above said first mold portion during said dose placing step.

5. A method as defined in claim 1, wherein said first mold portion is moved at least partially upwardly toward said second mold portion.

6. A method as defined in claim 1, wherein during said mold portion moving step, said die is in an open configuration for receiving said object and said dose, and wherein before said compression molding step, said die moved to a closed configuration to define said cavity.

7. A method as defined in claim 1, wherein said moving step at least partially precedes said surrounding step.

* * * * *